US012551289B2

(12) United States Patent
Moctezuma de la Barrera et al.

(10) Patent No.: US 12,551,289 B2
(45) Date of Patent: Feb. 17, 2026

(54) TRACKER-BASED SURGICAL NAVIGATION

(71) Applicant: MAKO Surgical Corp., Weston, FL (US)

(72) Inventors: José Luis Moctezuma de la Barrera, Freiburg (DE); Harald Hoppe, Achern (DE)

(73) Assignee: MAKO Surgical Corp., Weston, FL (US)

(*) Notice: Subject to any disclaimer, the term of this patent is extended or adjusted under 35 U.S.C. 154(b) by 409 days.

(21) Appl. No.: 17/558,642

(22) Filed: Dec. 22, 2021

(65) Prior Publication Data
US 2022/0175464 A1 Jun. 9, 2022

Related U.S. Application Data

(63) Continuation of application No. PCT/US2020/040099, filed on Jun. 29, 2020.
(Continued)

(51) Int. Cl.
A61B 34/20 (2016.01)
A61B 90/00 (2016.01)
G06T 7/73 (2017.01)

(52) U.S. Cl.
CPC ............. *A61B 34/20* (2016.02); *A61B 90/39* (2016.02); *G06T 7/73* (2017.01); *A61B 2034/2057* (2016.02)

(58) Field of Classification Search
CPC . A61B 34/20; A61B 90/39; A61B 2034/2057; A61B 2034/2055; A61B 2090/3937; A61B 2090/3983; G06T 7/73
See application file for complete search history.

(56) References Cited

U.S. PATENT DOCUMENTS 2,017,007 A 10/1935 Liedle
3,891,842 A 6/1975 Strusinski
(Continued)

FOREIGN PATENT DOCUMENTS

DE 1125275 B 3/1962
DE 9306771 U1 7/1993
(Continued)

OTHER PUBLICATIONS

An Accurate Recognition of Infrared Retro-Reflective Markers in Surgical Navigation. J Med Syst. Apr. 2, 20194;43(6): 153. (Year: 2019).*
(Continued)

*Primary Examiner* — Joseph M Santos Rodriguez
*Assistant Examiner* — Steven Maldonado
(74) *Attorney, Agent, or Firm* — Howard & Howard Attorneys PLLC

(57) ABSTRACT

Systems and methods for tracking an object in a workspace. A tracker is disposed relative to the object and includes a predefined geometry of markers having first and second marker arrangements, each including three markers in a collinear relationship. A camera with a view of the tracker generates an image comprising blobs, where a subset of the blobs is directly generated from the markers of the tracker, and a remainder is not. Blob groups each including three of the blobs and satisfying a collinear criterion are identified as candidates for having been directly generated by the marker arrangements. The subset of blobs is differentiated from the remainder of blobs based on the blob groups and the predefined marker geometry, and the differentiated subset of blobs is assigned to the markers of the tracker. The pose of the tracker in the workspace is then estimated based on the assigned blobs.

25 Claims, 23 Drawing Sheets

Related U.S. Application Data

(60) Provisional application No. 62/899,739, filed on Sep. 12, 2019, provisional application No. 62/871,077, filed on Jul. 5, 2019, provisional application No. 62/868,831, filed on Jun. 28, 2019.

(56) References Cited

U.S. PATENT DOCUMENTS

| | | |
|---|---|---|
| 5,198,877 A | 3/1993 | Schulz |
| 5,295,483 A | 3/1994 | Nowacki et al. |
| 5,603,318 A | 2/1997 | Heilbrun et al. |
| 5,768,443 A | 6/1998 | Michael et al. |
| 5,792,147 A | 8/1998 | Evans et al. |
| 5,817,105 A | 10/1998 | Van Der Brug |
| 5,828,770 A | 10/1998 | Leis et al. |
| 5,954,648 A | 9/1999 | Van Der Brug |
| 5,978,521 A | 11/1999 | Wallack et al. |
| 6,006,126 A | 12/1999 | Cosman |
| 6,061,644 A | 5/2000 | Leis |
| 6,137,893 A | 10/2000 | Michael et al. |
| 6,141,104 A | 10/2000 | Schulz et al. |
| 6,165,181 A | 12/2000 | Heilbrun et al. |
| 6,167,295 A | 12/2000 | Cosman |
| 6,405,072 B1 | 6/2002 | Cosman |
| 6,442,416 B1 | 8/2002 | Schultz |
| 6,497,134 B1 | 12/2002 | Faul et al. |
| 6,529,758 B2 | 3/2003 | Shahidi |
| 6,633,328 B1 | 10/2003 | Byrd et al. |
| 6,675,040 B1 | 1/2004 | Cosman |
| 6,724,922 B1 | 4/2004 | Vilsmeier |
| 6,724,930 B1* | 4/2004 | Kosaka ............ G06V 10/757 382/154 |
| 6,792,135 B1 | 9/2004 | Toyama |
| 6,795,571 B2 | 9/2004 | Kusch |
| 6,837,432 B2 | 1/2005 | Tsikos et al. |
| 6,915,008 B2 | 7/2005 | Barman et al. |
| 6,937,745 B2 | 8/2005 | Toyama |
| 7,224,472 B2 | 5/2007 | Bauch et al. |
| 7,492,930 B2 | 2/2009 | Eitner et al. |
| 7,499,806 B2 | 3/2009 | Kermani et al. |
| 7,561,731 B2 | 7/2009 | Wallace et al. |
| 7,561,733 B2 | 7/2009 | Vilsmeier et al. |
| 7,623,250 B2 | 11/2009 | Moctezuma de la Barrera et al. |
| 7,725,162 B2 | 5/2010 | Malackowski et al. |
| 7,726,564 B2 | 6/2010 | Goldbach |
| 7,728,280 B2 | 6/2010 | Feilkas et al. |
| 7,760,909 B2 | 7/2010 | Manus |
| 7,771,436 B2 | 8/2010 | Moctezuma De La Barrera et al. |
| 8,096,163 B2 | 1/2012 | Goldbach |
| 8,111,904 B2 | 2/2012 | Wallack et al. |
| 8,126,260 B2 | 2/2012 | Wallack et al. |
| 8,155,479 B2 | 4/2012 | Hoffman et al. |
| 8,181,878 B2 | 5/2012 | Nunnink et al. |
| 8,244,495 B2 | 8/2012 | Goldbach et al. |
| 8,300,906 B2 | 10/2012 | Voelker |
| 8,494,614 B2 | 7/2013 | Markowitz et al. |
| 8,743,222 B2 | 6/2014 | Hamalainen |
| 8,791,901 B2 | 7/2014 | Mallinson |
| 8,792,963 B2 | 7/2014 | Zhao et al. |
| 9,008,757 B2 | 4/2015 | Wu |
| 9,019,349 B2 | 4/2015 | Richardson |
| 9,060,714 B2 | 6/2015 | Bajcsy et al. |
| 9,094,615 B2 | 7/2015 | Aman et al. |
| 9,119,655 B2 | 9/2015 | Bowling et al. |
| 9,119,670 B2 | 9/2015 | Yang et al. |
| 9,232,924 B2 | 1/2016 | Liu et al. |
| 9,463,073 B2 | 10/2016 | Gill et al. |
| 9,498,231 B2 | 11/2016 | Haider et al. |
| 9,513,113 B2 | 12/2016 | Yang et al. |
| 9,566,120 B2 | 2/2017 | Malackowski et al. |
| 9,699,445 B2 | 7/2017 | Hoffman et al. |
| 9,707,043 B2 | 7/2017 | Bozung |
| 9,734,419 B1 | 8/2017 | Ye et al. |
| 9,773,312 B2 | 9/2017 | Lee |
| 9,788,906 B2 | 10/2017 | Piron et al. |
| 10,004,564 B1 | 6/2018 | Beck |
| 10,013,777 B2 | 7/2018 | Mariampillai et al. |
| 10,038,888 B2 | 7/2018 | Hoffman et al. |
| 10,178,368 B2 | 1/2019 | Zhao et al. |
| 10,219,811 B2 | 3/2019 | Haider et al. |
| 10,363,102 B2 | 7/2019 | Abovitz et al. |
| 10,368,039 B2 | 7/2019 | Derenne et al. |
| 10,499,996 B2 | 12/2019 | de Almeida Barreto |
| 10,905,496 B2 | 2/2021 | Zuhars et al. |
| 11,007,018 B2 | 5/2021 | Breisacher et al. |
| 11,103,313 B2 | 8/2021 | Marti et al. |
| 2002/0188194 A1 | 12/2002 | Cosman |
| 2003/0040879 A1 | 2/2003 | Jutras et al. |
| 2003/0210812 A1 | 11/2003 | Khamene et al. |
| 2005/0099601 A1 | 5/2005 | MacDougall et al. |
| 2005/0105101 A1 | 5/2005 | Duling et al. |
| 2007/0016008 A1 | 1/2007 | Schoenefeld |
| 2007/0081695 A1* | 4/2007 | Foxlin ............ G06T 7/73 382/103 |
| 2007/0173790 A1 | 7/2007 | Moctezuma De La Barrera et al. |
| 2007/0253541 A1 | 11/2007 | Sukovic et al. |
| 2008/0004633 A1 | 1/2008 | Arata et al. |
| 2008/0107305 A1 | 5/2008 | Vanderkooy et al. |
| 2008/0123820 A1 | 5/2008 | Kendrick et al. |
| 2009/0163930 A1 | 6/2009 | Aoude et al. |
| 2009/0248036 A1 | 10/2009 | Hoffman et al. |
| 2010/0168763 A1 | 7/2010 | Zhao et al. |
| 2010/0268067 A1 | 10/2010 | Razzaque et al. |
| 2011/0015521 A1 | 1/2011 | Faul |
| 2011/0025853 A1 | 2/2011 | Richardson |
| 2011/0054449 A1 | 3/2011 | Tien et al. |
| 2011/0157373 A1 | 6/2011 | Ye et al. |
| 2011/0235889 A1 | 9/2011 | Spahn |
| 2012/0002084 A1 | 1/2012 | Weissman et al. |
| 2013/0335417 A1 | 12/2013 | McQueston et al. |
| 2014/0125771 A1 | 5/2014 | Grossmann et al. |
| 2014/0128881 A1 | 5/2014 | Tyc et al. |
| 2014/0200621 A1 | 7/2014 | Malackowski et al. |
| 2014/0232832 A1 | 8/2014 | Sander |
| 2014/0276943 A1 | 9/2014 | Bowling et al. |
| 2014/0340524 A1 | 11/2014 | Holz |
| 2014/0375822 A1 | 12/2014 | Jain et al. |
| 2015/0110347 A1 | 4/2015 | Suzuki |
| 2015/0141755 A1 | 5/2015 | Tesar |
| 2015/0223725 A1 | 8/2015 | Engel et al. |
| 2015/0297313 A1 | 10/2015 | Reiter et al. |
| 2015/0332465 A1 | 11/2015 | Schmidt et al. |
| 2016/0125592 A1* | 5/2016 | Becker ............ B23K 9/126 348/90 |
| 2016/0125594 A1 | 5/2016 | Becker et al. |
| 2016/0166335 A1 | 6/2016 | Roger et al. |
| 2016/0191887 A1 | 6/2016 | Casas |
| 2016/0199148 A1 | 7/2016 | Maracaja-Neto |
| 2016/0275703 A1 | 9/2016 | Mariampillai et al. |
| 2016/0335766 A1 | 11/2016 | Ambwani et al. |
| 2017/0007150 A1 | 1/2017 | Jeon et al. |
| 2017/0026560 A1 | 1/2017 | Whitehouse et al. |
| 2017/0071508 A1 | 3/2017 | Kaiser et al. |
| 2017/0086941 A1 | 3/2017 | Marti et al. |
| 2017/0165008 A1 | 6/2017 | Finley |
| 2017/0196641 A1 | 7/2017 | Jagga et al. |
| 2017/0245946 A1 | 8/2017 | Tabandeh et al. |
| 2017/0265949 A1 | 9/2017 | Crawford et al. |
| 2017/0281283 A1 | 10/2017 | Siegler et al. |
| 2017/0304007 A1 | 10/2017 | Piron et al. |
| 2017/0325897 A1 | 11/2017 | Saacs et al. |
| 2017/0325898 A1 | 11/2017 | Isaacs et al. |
| 2017/0340406 A1 | 11/2017 | Hendriks et al. |
| 2018/0068441 A1 | 3/2018 | Yu et al. |
| 2018/0125586 A1 | 5/2018 | Sela et al. |
| 2018/0140197 A1 | 5/2018 | Wang et al. |
| 2018/0168841 A1* | 6/2018 | Swayze ............ A61B 90/37 |
| 2018/0185100 A1 | 7/2018 | Weinstein et al. |
| 2018/0200001 A1 | 7/2018 | Erbe |
| 2018/0308263 A1 | 10/2018 | Mariampillai et al. |
| 2019/0000564 A1 | 1/2019 | Navab et al. |
| 2019/0261931 A1 | 8/2019 | Ross |
| 2019/0320995 A1 | 10/2019 | Amiri |
| 2019/0328464 A1 | 10/2019 | Saur et al. |

(56) References Cited

U.S. PATENT DOCUMENTS

| | | | |
|---|---|---|---|
| 2019/0387149 | A1 | 12/2019 | Breisacher et al. |
| 2020/0015909 | A1 | 1/2020 | Stawiaski et al. |
| 2020/0078113 | A1 | 3/2020 | Sawhney et al. |
| 2020/0129240 | A1 | 4/2020 | Singh et al. |
| 2020/0170718 | A1 | 6/2020 | Peine |
| 2020/0222123 | A1 | 7/2020 | Handley et al. |
| 2020/0249009 | A1* | 8/2020 | Heymer ............... G01B 11/002 |
| 2020/0345428 | A1 | 11/2020 | Marti et al. |
| 2021/0030479 | A1 | 2/2021 | Marti et al. |

FOREIGN PATENT DOCUMENTS

| | | | |
|---|---|---|---|
| DE | 19639615 A1 | 4/1998 | |
| DE | 10225077 A1 | 12/2003 | |
| DE | 10246147 A1 | 4/2004 | |
| DE | 10323091 A1 | 12/2004 | |
| DE | 202004014857 U1 | 4/2005 | |
| DE | 202007007054 U1 | 7/2007 | |
| DE | 202007016962 U1 | 4/2008 | |
| DE | 102008023330 A1 | 11/2009 | |
| DE | 102008057820 A1 | 5/2010 | |
| DE | 102011054730 A1 | 4/2013 | |
| DE | 102012220116 A1 | 1/2014 | |
| DE | 102013202575 A1 | 8/2014 | |
| DE | 102017105158 A1 | 9/2018 | |
| EP | 0672389 A2 | 9/1995 | |
| EP | 1340470 A1 | 9/2003 | |
| EP | 1933276 A1 | 6/2008 | |
| EP | 3025665 A1 | 6/2016 | |
| JP | 2018514352 A * | 4/2016 | ............ A61B 90/39 |
| JP | 2020507436 A * | 3/2020 | ............ A61B 34/30 |
| WO | 199611624 A2 | 4/1996 | |
| WO | WO 2004023783 A2 * | 3/2004 | ............ G06T 7/73 |
| WO | 2007115825 A1 | 10/2007 | |
| WO | 2013192598 A1 | 12/2013 | |
| WO | 2014122301 A1 | 8/2014 | |
| WO | 2016041050 A1 | 3/2016 | |
| WO | 2017054817 A1 | 4/2017 | |
| WO | 2017121926 A1 | 7/2017 | |
| WO | 2017208186 A2 | 12/2017 | |
| WO | 2018150336 A1 | 8/2018 | |
| WO | 2018210422 A1 | 11/2018 | |
| WO | 2019029934 A1 | 2/2019 | |

OTHER PUBLICATIONS

Abstract of Brown, M.Z. et al., "Advances in Computational Stereo", IEEE Transactions on Pattern Analysis and Machine Intelligence, vol. 25, No. 8, Aug. 2003, pp. 993-1008, 2 pages.

Abstract of Huang, K.S. et al., "Least-squares fitting of two 3-D point sets", IEEE Trans Pattern Anal Machine Intell., vol. 9, 1987, pp. 698-700, 1 page.

Belongie, S. et al., "Matching Shapes", The 8th International Conference on Computer Vision, Vancouver, Canada, 2001, pp. 454-461.

Bouget, D. et al., Vision-Based and Marker-Less Surgery Tool Detection and Tracking: A Review of the Literature:, Med. Image Analysis, vol. 35, 2017, pp. 633-654.

Breitenmoser, A et al., "A Monocular Vision-Based System for 6D Relative Robot Localization", Intelligent Robots and Systems (IROS), IEEE, Sep. 25, 2011, pp. 79-85.

Dornaika, F. et al., "Pose Estimation Using Point and Line Correspondence", Real-Time Imaging, Academic Press Limited, GB, vol. 5, No. 3, Jun. 1, 1999, pp. 215-230.

Duda, R.O. et al., "Use of the Hough Transformation to Detect Lines and Curves in Pictures", Communications of the ACM, Association for Computing Machinery, vol. 15, Jan. 1972, pp. 11-15.

English language abstract and machine-assisted English translation for DE 10 2008 023 330 extracted from espacenet.com database on Jul. 11, 2019, 12 pages.

English language abstract and machine-assisted English translation for DE 10 2008 057 820 extracted from espacenet.com database on Jul. 11, 2019, 8 pages.

English language abstract and machine-assisted English translation for DE 10 2011 054 730 extracted from espacenet.com database on Jul. 11, 2019, 16 pages.

English language abstract and machine-assisted English translation for DE 102 25 077 extracted from espacenet.com database on Jul. 11, 2019, 18 pages.

English language abstract and machine-assisted English translation for DE 102 46 147 extracted from espacenet.com database on Jul. 11, 2019, 12 pages.

English language abstract and machine-assisted English translation for DE 103 23 091 extracted from espacenet.com database on Jul. 11, 2019, 18 pages.

English language abstract and machine-assisted English translation for DE 196 39 615 extracted from espacenet.com database on Jul. 11, 2019, 25 pages.

English language abstract and machine-assisted English translation for DE 20 2004 014 857 extracted from espacenet.com database on Jul. 11, 2019, 9 pages.

English language abstract and machine-assisted English translation for WO 2017/054817 extracted from espacenet.com database on Jul. 15, 2019, 29 pages.

English language abstract for DE 10 2013 202 575 extracted from espacenet.com database on Jul. 11, 2019, 1 page.

English language abstract for DE 20 2007 007 054 extracted from espacenet.com database on Jul. 11, 2019, 1 page.

English language abstract for EP 1 340 470 extracted from espacenet.com database on Jul. 11, 2019, 1 page.

English language abstract for EP 1 933 276 extracted from espacenet.com database on Jul. 11, 2019, 1 page.

Faessler et al., "A Monoculor Pose Estimation System Based on Infrared LEDs", IEEE International Conference on Robotics & Automation (ICRA), 2014.

Fischler et al., "Random Sample Consensus: A Paradigm for Model Fitting with Applications to Image", Analysis and Automated Cartography, Communications of the ACM, vol. 24, No. 6, 1981.

Hartley, R. et al., Multi View Geometry in Computer Vision, Second Edition, Cambridge University Press, 2000, p. 312.

Hartley, R.I., "Theory and Practice of Projective Rectification", International Journal of Computer Vision, vol. 35, No. 2, 1999, pp. 115-127.

Hirschmuller, H., "Stereo Processing by Semiglobal Matching and Mutual Information", IEEE Transactons on Pattern Analysis and Machine Intelligence, vol. 30, No. 2, Feb. 2008, pp. 328-341.

Horn, B.K.P., "Closed-Form Solution of Absolute Orientation Using Unit Quaternions", Journal of the Optical Society of America, vol. 4, No. 4, Apr. 1987, pp. 629-642.

International Search Report for Application No. PCT/US2020/040099 dated Dec. 8, 2020, 5 pages.

Kanatani, K., "Analysis of 3-D rotation fitting", IEEE Trans Pattern Anal Machine Intell., vol. 16, 1994, pp. 543-549.

Machine-assisted English language abstract and machine-assisted English translation for DE 10 2017 105 158 A1 extracted from espacenet.com database on Feb. 2, 2022, 22 pages.

Machine-assisted English language abstract for DE 10 2012 220 116 A1 extracted from espacenet.com database on Feb. 2, 2022, 2 pages.

Machine-assisted English translation for DE 1 125 275 extracted from espacenet.com database on Jul. 11, 2019, 8 pages.

Machine-assisted English translation for DE 20 2007 016 962 extracted from espacenet.com database on Jul. 11, 2019, 7 pages.

Machine-assisted English translation for DE 93 06 771 extracted from espacenet.com database on Jul. 11, 2019, 9 pages.

Machine-assisted English translation of Abstract of Hoppe, H. et al., "Nicht Modellbasierte Kalibration von Kameras mit Monitoren" (Non-Model Based Calibration of Cameras with Monitors), Proceedings Bildverabeitung fur die Medizin (BVM), Berlin, 2016, pp. 50-55.

Scharstein, D. et al., "A Taxonomy and Evaluation of Dense Two-Frame Stereo Correspondence Algorithms", International Journal of Computer Vision, vol. 47, Apr. 2002, pp. 1-3 and 7-42.

Strzeletz, Simon et al., "Fast, Robust and Accurate Monocular Peer-To-Peer Tracking for Surgical Navigation", International Journal of Computer Assisted Radiology and Surgery, vol. 15, 2020, pp. 479-489.

(56) References Cited

OTHER PUBLICATIONS

Teixeira, Maffra, VI-RPE: Visual-Inertial Relative Pose Estimation for Aerial Vehicles, IEEE Robotics and Automation Letters (Early Access), 2018.

Umeyama, S., "Least-squares estimation of transformation parameters between two point patterns", IEEE Trans Pattern Anal Machine Intell., vol. 13, 1991, pp. 376-380.

* cited by examiner (A)

(B)

(C)

(D)

TRACKER-BASED SURGICAL NAVIGATION

CROSS-REFERENCE TO RELATED APPLICATIONS

This application is a bypass continuation of International Patent App. No. PCT/US2020/040099, filed on Jun. 29, 2020, which claims priority to and all the benefits of U.S. Provisional Patent App. No. 62/868,831, filed on Jun. 28, 2019, U.S. Provisional Patent App. No. 62/871,077, filed on Jul. 5, 2019, and U.S. Provisional Patent App. No. 62/899,739, filed on Sep. 12, 2019, the disclosures of each of the aforementioned applications hereby being incorporated by reference in their entirety.

TECHNICAL FIELD

The present disclosure generally relates to tracker-based surgical navigation.

BACKGROUND

Conventional surgical navigation systems track a surgical object by imaging features fixed to the object from numerous angles, typically using multiple cameras having different but overlapping fields of view. The use of multiple cameras to track an object increases power consumption by the navigation system and necessitates that accurate relationship data between the cameras be determined in advance and maintained. Furthermore, if one or more of the features fixed to the object become occluded from a view of one of the cameras, such as because another object or surgical personnel moves between the camera and the object, then the conventional navigation system becomes unable to track the object. The surgical workspace also often includes multiple objects that are capable of relative movement and thus need to be tracked separately, and it frequently includes reflective surfaces and other sources of light detectable by the navigation cameras. The presence of multiple objects each having a fixed set of tracking features and additional sources of light in the surgical workspace can confuse the conventional surgical navigation system when attempting to track objects.

SUMMARY

In one aspect, a navigation system includes a camera aimed at a tracker affixed to an object in a workspace and including a predefined geometry of markers. The camera is configured to generate an image including blobs, a subset of the blobs directly corresponding to the markers of the tracker. The navigation system further includes a controller coupled to the camera and configured to differentiate the subset of blobs from the image, and to assign the differentiated subset to the markers of the tracker. The controller is further configured to estimate a pose of the tracker in the workspace based on the blobs of the image assigned to the markers of the tracker.

In a second aspect, a navigation system for tracking an object in a workspace includes a tracker having a predefined geometry of markers disposed relative to the object, a camera having a field of view including the tracker, and a controller operatively coupled to the camera. The controller is configured to receive, from the camera, an image comprising blobs. Each of the blobs corresponds to a different marker of the tracker. The controller is also configured to estimate a pose of the tracker in the workspace based on the blobs, and to track the object based on the estimated pose of the tracker in the workspace.

In a third aspect, a navigation system for tracking an object in a workspace includes a tracker disposed relative to the object that includes markers, first and second cameras each having a different field of view, and at least one controller operatively coupled to the cameras. The at least one controller is configured to, responsive to the tracker entering the field of view of the first camera, receive, from the first camera, an image comprising blobs, each of the blobs corresponding to a different one of the markers on the first tracker. The at least one controller is further configured to determine a pose of the first tracker relative to the first camera based on the blobs, determine a pose of the first camera relative to a second camera for which the field of view includes the first camera based on an image received from the second camera, and track the first object relative to the second camera based on the pose of the first tracker relative to the first camera and the pose of the first camera relative to the second camera.

In a fourth aspect, a de-centralized navigation system includes a first and second tracking device coupled to a first and second object, respectively. Each tracking device includes detectable markers, a camera, a controller, and a communication module. The controllers of the first tracking device and the second tracking device are configured to communicate using the communication modules to coordinate tracking operation of the first and second tracking devices, by which the first tracking device is assigned to track a state of a target object using the camera of the first tracking device, and the second tracking device is assigned to track a state of the first tracking device by detecting the detectable markers of the first tracking device using the camera of the second tracking device.

In a fifth aspect, a navigation system for tracking an object in a workspace includes a tracker disposed relative to the object having a predefined geometry of markers. The predefined geometry of markers includes a first marker arrangement and a second marker arrangement each including three of the markers in a collinear relationship. The navigation system further includes a camera having a view of the tracker and configured to generate an image comprising blobs. A subset of the blobs is directly generated from the markers of the tracker, and a remainder of the blobs are not directly generated from the markers of the tracker. The navigation system further includes a controller operatively coupled to the camera and configured to identify, from the blobs of the image, blob groups each including three of the blobs of the image and satisfying a collinear criterion as candidates for having been directly generated by the markers of the first or second marker arrangements. At least one of the blob groups includes one of the remainder of blobs. The controller is further configured to differentiate the subset of blobs from the remainder of blobs based on the blob groups and the predefined geometry of markers, and assign the differentiated subset of blobs to the markers of the tracker.

In a sixth aspect, a method for tracking an object in a workspace with a camera aimed at a tracker affixed to the object and including a predefined geometry of markers includes generating an image including blobs with the camera, a subset of the blobs directly corresponding to the markers of the tracker. The method further includes differentiating the subset of blobs from the image, assigning the differentiated subset to the markers of the tracker, and estimating a pose of the tracker in the workspace based on the blobs of the image assigned to the markers of the tracker.

In a seventh aspect, a method for tracking an object in a workspace includes disposing a tracker having a predefined geometry of markers relative to the object, and receiving, from a camera having a field of view including the tracker, an image comprising blobs. Each of the blobs corresponds to a different marker of the tracker. The method further includes estimating a pose of the tracker in the workspace based on the blobs, and tracking the object based on the estimated pose of the tracker in the workspace.

In an eighth aspect, a method for tracking an object in a workspace includes disposing a tracker relative to the object that includes markers and receiving, from a first camera with a field of view including the tracker, an image comprising blobs, each of the blobs corresponding to a different one of the markers on the first tracker. The method further includes determining a pose of the tracker relative to the first camera based on the blobs, determining a pose of the first camera relative to a second camera having a field of view that includes the first camera based on an image received from the second camera, and tracking the object relative to the second camera based on the pose of the first tracker relative to the first camera and the pose of the first camera relative to the second camera.

In a ninth aspect, a method for implementing a de-centralized navigation system includes communicating between a first and second tracking device coupled to a first and second object, respectively, to coordinate tracking operation of the first and second tracking devices. Each tracking device includes detectable markers, a camera, a controller, and a communication module. The method further includes assigning, by the communicating between the first and second tracking devices, the first tracking device to track a state of a target object using the camera of the first tracking device, and assigning the second tracking device to track a state of the first tracking device by detecting the detectable markers of the first tracking device using the camera of the second tracking device.

In a tenth aspect, a method for tracking an object in a workspace based on an image including blobs generated by a camera having a field of view including a tracker disposed relative to the object is provided. The tracker includes a predefined geometry of markers including a first marker arrangement and a second marker arrangement each including three of the markers in a collinear relationship. A subset of the blobs of the image are directly generated from the markers of the tracker, and a remainder of the blobs are not directly generated from the markers of the tracker. The method includes identifying, from the blobs within the image, blob groups each including three of the blobs and satisfying a collinear criterion as candidates for having been directly generated by the markers of the first or second marker arrangements. At least one of the blob groups comprises one of the remainder of blobs. The method further includes differentiating the subset of blobs from the remainder of blobs based on the blob groups and the predefined geometry of markers, and assigning the differentiated subset of blobs to the markers of the tracker.

In an eleventh aspect, a navigation system is provided capable of performing the method of any one or more of the sixth through tenth aspects.

In a twelfth aspect, a controller is coupled to a camera having a field of view including a tracker with a predefined geometry of markers. The predefined geometry of markers has a first marker arrangement and a second marker arrangement each including three of the markers in a collinear relationship. The camera is configured to generate an image depicting blobs, where a subset of the blobs is directly generated from the markers of the surgical tracker, and a remainder of the blobs is not directly generated from the markers of the surgical tracker. The controller includes a processor programmed to implement the method of any one or more of the sixth through tenth aspects.

In a thirteenth aspect, a non-transitory readable medium is provided which has stored thereon computer-executable instructions that, upon execution by a processor, cause the processor to perform the method of any one or more of the sixth through tenth aspects.

In a fourteenth aspect, a robotic manipulator is utilized with any of the described navigation systems or any of the described methods. The robotic manipulator supports a surgical tool and includes links and actuators configured to move the links to move the surgical tool.

Any of the above-aspects can be combined with each other in part or in full.

DETAILED DESCRIPTION

Figure 1:
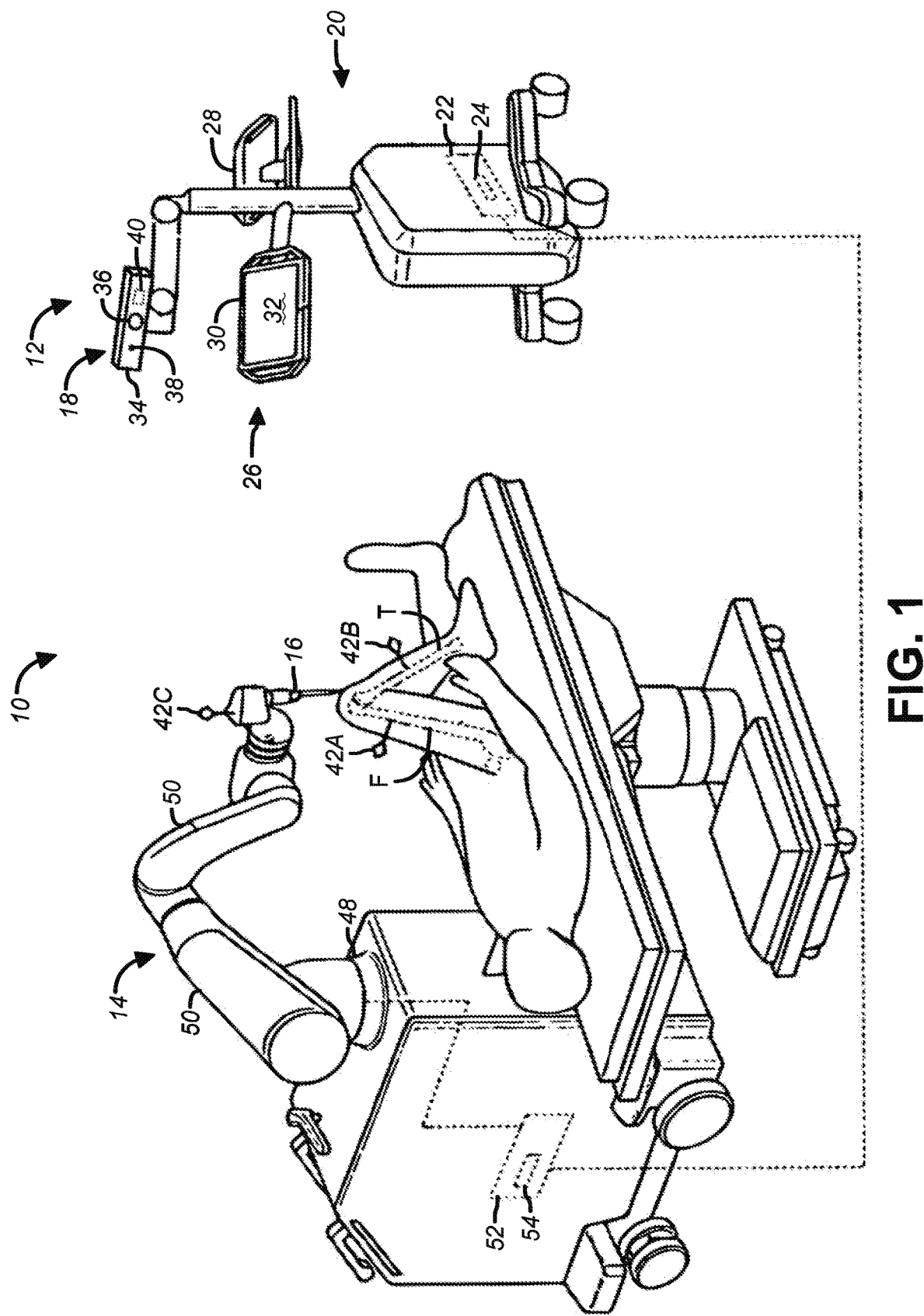
FIG. 1 illustrates a navigation system for tracking objects in a surgical workspace using trackers affixed to the objects.

Surgical navigation systems may include a single tracking unit and several surgical trackers each affixed to an object desired to be tracked. Each surgical tracker may include an arrangement of at least three markers that have a fixed spatial relationship relative to each other and to the object to which the surgical tracker is affixed. The markers may be active (e.g., LEDs) or may be passive (e.g., retro-reflective spheres, black-white targets). The tracking unit may include a stereo camera system for triangulating the markers affixed to the objects in a common coordinate system. Specifically, the tracking unit may image the markers from different angles at a same time using the stereo camera system, and may determine a pose of the markers relative to the tracking unit by matching marker representations in one image to corresponding marker representations in the other image. The tracking unit may then determine the pose of each object relative to the tracking unit based on the determined pose of the markers fixed to the object and the fixed relationship between the object and markers. This navigation methodology may be referred to as "point-to-point matching."

Point-to-point matching has several drawbacks. For example, each camera of the tracking unit needs an unobstructed view of all the surgical tracker markers in the surgical workspace to enable accurate tracking of objects, which often requires the cameras to be placed a significant distance away from the markers and the surgical site. This positioning can make maintaining an unobstructed view difficult, especially in an operating room, where personnel and instruments frequently move throughout, into, and out of the surgical site. The "centralized" concept in which tracking is based solely on the viewpoint of a single tracking unit also lacks redundancy. In addition, the use of a stereo camera system in the tracking unit adds to the weight, cost, and technical complexity of the tracking unit, necessitating tight synchronization and a fixed positional relationship between the multiple cameras of the system.

Surgical navigation systems for alleviating these issues are described herein. For instance, a surgical navigation system may be designed to estimate the poses of objects in a surgical workspace using a monocular camera system and a methodology that may be referred to as "point-to-line matching." In particular, the surgical navigation system may be configured to image the surgical trackers from a single viewpoint using the monocular camera system, and to thereafter implement a fast and robust algorithm that assigns features in the image to the markers of the trackers that correspond to the features. The trackers may include marker layouts specifically designed to facilitate fast and robust marker assignment. The marker assignment algorithm may be fast, accurate, and robust even in the presence of reflections and other light sources that cause accidental features in the image, that is, features that were not directly generated by a marker of a surgical tracker. The efficient assignment of image features to the markers of the surgical trackers is significant, as testing all possible combinations of image features against the various marker arrangements of the surgical trackers would take too much time. For example, consider a camera that observes two trackers each with seven markers and that detects two accidental features (e.g., reflections), so sixteen features in all. This situation may result in more than ten trillion possible assignments of the detected features to the markers. Even the fastest pose estimation algorithm would be too slow to calculate the results of all possible assignments in real time.

Following assignment of the image features to the markers of the surgical trackers, the surgical navigation system may be configured to estimate the pose of each surgical tracker in the surgical workspace based on the position in the image of the features assigned to the markers of the surgical tracker. Each assigned image feature may represent a world line that extends from the monocular camera system into the surgical workspace and through the marker to which the image feature is assigned. The navigation system may be configured to estimate a pose of the surgical tracker in the surgical workspace such that the distance between each marker of the surgical tracker and the world line represented by the image feature assigned to the marker is minimized. The surgical navigation system may identify this pose without using a previously detected or estimated pose of the tracker as a starting value, which can result in errors if the last calculation was faulty.

The above concepts may be extended to implement a peer-to-peer tracker network for a surgical navigation system in which each surgical tracker also includes a monocular camera system for tracking other trackers. In other words, each tracker may function as a tracked unit and a tracking unit. Because of the limited real estate of and power available to trackers, trackers are better suited to house and operate a monocular camera system rather than a stereo camera system. A peer-to-peer tracker network may provide a configuration in which redundancy may be used to confirm proper operation of the surgical navigation system, and in which objects affixed to trackers occluded from a main tracking unit may still be tracked through a chain of trackers. A peer-to-peer tracker network may also enable distributed processing to improve the speed of the surgical navigation system, and the surgical navigation system may be configured to modify tracker chains formed by the peer-to-peer tracker network on the fly to optimize system performance, such as according to a quality of service profile desired for the given surgical procedure.

FIG. 1 illustrates a surgical system 10 for treating a patient. The surgical system 10 may be located in a surgical setting such as an operating room of a medical facility. The surgical system 10 may include a surgical navigation system 12 and a robotic manipulator 14. The robotic manipulator 14 may be coupled to a surgical instrument 16. During a surgical procedure, the surgical navigation system 12 may track the pose (location and orientation) of objects of interest within the surgical workspace. The surgical navigation system 12 may then cause the robotic manipulator 14 to maneuver the surgical instrument 16 to treat a target volume of patient tissue based on the tracked objects. Alternatively, the surgeon may hold and manually maneuver the surgical instrument 16 while receiving guidance from the surgical navigation system 12.

The surgical navigation system 12 may include a localizer camera 18 and a navigation cart assembly 20. The navigation cart assembly 20 may house a navigation controller 22. The navigation controller 22 may be configured to implement the functions, features, processes, algorithms, and modules of the surgical navigation system 12 described herein. In particular, the navigation controller 22 may include a processor 24 programmed to implement the functions, features, processes, algorithms, and modules of the surgical navigation system 12 described herein.

The navigation controller 22 may be in operative communication with a user interface 26 of the navigation system 12. The user interface 26 may facilitate user interaction with the surgical navigation system 12, or more particularly, with the navigation controller 22. The user interface 26 may include one or more output devices that provide information to the user, such as from the navigation controller 22. The output devices may include, without limitation, a display 28 adapted to be situated outside of a sterile field including the surgical workspace, and may include a display 30 adapted to be situated inside the sterile field. The displays 28, 30 may be adjustably mounted to the navigation cart assembly 20. The user interface 26 may also include one or more input devices that enable user-input to the navigation controller 22. The input devices may include, without limitation, a keyboard, mouse, and/or touch screen 32. The input devices may also include a microphone that enables user-input through voice-recognition technology.

The localizer camera 18 may be a monocular camera system configured to image trackers in the surgical workspace. More specifically, the localizer camera 18 may be configured to generate two-dimensional images of the surgical workspace that include features corresponding to the markers of the trackers. The features may be contrasting blobs that correspond to detected light signals emitted from the markers. The localizer camera 18 may be communicatively coupled and configured to communicate the images to the navigation controller 22. The navigation controller 22 may be configured to track the poses of objects in the surgical workspace based on the images.

The localizer camera 18 may include an outer casing 34 that houses an optical sensor 36, a light source 38, and a camera controller 40. The optical sensor 36 may be a two-dimensional sensor configured to detect light signals in and thereby image the surgical workspace. The localizer camera 18 may thus be a two-dimensional monocular camera configured to generate a two-dimensional image of the surgical workspace.

The optical sensor 36 may be configured to detect light signals at a particular wavelength or a particular range of wavelengths. For instance, the optical sensor 36 may be configured to detect non-visible light signals such as infrared light signals, thereby resulting in the localizer camera 18 being an infrared camera. The light source 38 of the localizer camera 18 may be configured to illuminate the surgical workspace with light of a wavelength that, upon reflection by a marker in the surgical workspace, is detectable by the optical sensor 36. As some examples, the optical sensor 36 may be a charge-coupled device (CCD) or a complementary metal-oxide semiconductor (CMOS) sensor.

The camera controller 40 may be operatively coupled to the navigation controller 22, the optical sensor 36, and the light source 38. The camera controller 40 may be configured to operate the optical sensor 36 and light source 38 based on instructions received from the navigation controller 22, to generate image data based on optical-based signals received from the optical sensor 36, and to communicate the image data to the navigation controller 22 for object tracking. The image data may define the two-dimensional image of the surgical workspace generated by the localizer camera 18.

The localizer camera 18 may be mounted to an adjustable arm to selectively position the localizer camera 18, and more particularly the optical sensor 36, with a field of view of the trackers in the surgical workspace that, ideally, is free from obstacles. The localizer camera 18 may be adjustable in at least one degree of freedom by rotating about a rotational joint, and may be adjustable about two or more degrees of freedom.

As described above, the navigation system 12 may cooperate with a plurality of tracking devices 42, also referred to herein as trackers or surgical trackers, to determine the poses of objects within the surgical workspace. Each of the trackers 42 may be affixed to an object of interest in the surgical workspace. In general, the object to which each tracker 42 is affixed may be rigid and inflexible so that during the surgical procedure, the object cannot or is unlikely to move or deform relative to the tracker 42. In other words, the spatial relationship between a tracker 42 and the object to which the tracker 42 is affixed may remain fixed during the surgical procedure, notwithstanding movement of the object during the surgical procedure. In this way, responsive to determining the pose of a tracker 42 in the surgical workspace in a given coordinate system, the navigation controller 22 may infer the position of the object to which the tracker 42 is affixed in the coordinate system based on the determined pose of the tracker 42 and the fixed spatial relationship between the tracker 42 and object.

The objects tracked by the navigation system 12, and to which the trackers 42 are affixed, may include patient anatomical structures of interest and instruments such as the surgical instrument 16. As non-limiting examples, the tracked anatomical structures may include hard tissues such as bone, and the tracked surgical instruments may include retractors, cutting tools, and waste management devices used during the surgical procedure.

FIG. 1 illustrates a possible placement of trackers 42 for a knee replacement procedure. As shown in the illustrated example, a tracker 42A may be firmly affixed to the femur F of the patient, a tracker 42B may be firmly affixed to the tibia T of the patient, and a tracker 42C may be firmly affixed to the surgical instrument 16. Trackers 42A and 42B may be attached to the femur F and tibia T in the manner shown in U.S. Pat. No. 7,725,162, the disclosure of which is hereby incorporated by reference herein in its entirety. Trackers 42A and 42B may also be mounted like those shown in U.S. Patent Application Publication No. 2014/0200621, filed Jan. 16, 2014, entitled "Navigation Systems and Methods for Indicating and Reducing Line-of-Sight Errors," the disclosure of which is hereby incorporated by reference herein in its entirety. The tracker 42C may be integrated into the surgical instrument 16 during manufacture, or may be separately mounted to the surgical instrument 16 in preparation for the surgical procedure.

Prior to the start of a surgical procedure, the surgical navigation system 12 may receive data corresponding to the surgical procedure. For instance, pre-operative images may be generated for anatomy of interest, such as anatomical structures defining and/or adjacent a target volume of patient tissue to be treated by the surgical instrument 16. Continuing with the knee replacement example illustrated in FIG. 1, pre-operative images of the patient's femur F and tibia T may be taken prior to the procedure. Pre-operative images may be based on MRI scans, radiological scans, or computed tomography (CT) scans of the patient's anatomy, and may be used to develop virtual models of the anatomical structures of interest stored by the surgical navigation system 12.

Each virtual model of an anatomical structure may include a three-dimensional model (e.g., point cloud, mesh, CAD) of the anatomical structure or a portion of the anatomical structure, and/or may include a three-dimensional model or other indicator of at least a portion of the anatomical structure that forms at least part of a target volume of patient tissue to be treated during the surgical procedure. The navigation controller 22 may receive and store these virtual models in advance of the surgical procedure. In addition or alternatively to taking pre-operative images, plans for treatment and virtual models for anatomical structures of interest can be developed in the operating room from kinematic studies, bone tracing, and other methods. Further prior to the surgical procedure, the navigation controller 22 may receive and store virtual models for other tracked objects of interest to the surgical procedure, such as virtual models of the surgical instruments and trackers 42 being used in the surgical procedure.

Each virtual model for an object received and stored by the navigation controller 22 may define a three-dimensional coordinate system specific to the object, and may indicate coordinates in the three-dimensional coordinate system corresponding to the relative positions of features of the object. For instance, a virtual model for a given tracker 42 may indicate coordinates in a three-dimensional coordinate system specific to the tracker 42 that correspond to the relative positions of the markers of the tracker 42. As a further example, a virtual model for a given surgical instrument may indicate coordinates in a three-dimensional coordinate system specific to the surgical instrument that correspond to the relative positions of features of the outer perimeter of the surgical instrument.

The navigation controller 22 may also receive and store data defining the fixed spatial relationships between the trackers 42 and the objects to which the trackers 42 are affixed, and a surgical plan. The fixed spatial relationships may define a pose of each tracker 42, or more particularly a pose of the markers of each tracker 42, relative to the object to which the tracker 42 is affixed, such as by reference to the virtual models of the object and tracker 42. For instance, the fixed spatial relationship for a given tracker 42 may indicate where the coordinate system specific to the object affixed to the tracker 42 is positioned within the coordinate system specific to the tracker 42. The surgical plan may identify the patient anatomical structures involved in the surgical procedure and the target volume of patient tissue to be treated in the surgical procedure, may identify the instruments being used in the surgical procedure, and may identify planned trajectories of the instruments and planned movements of patient anatomical structures during the surgical procedure.

During the surgical procedure, the optical sensor 36 of the localizer camera 18 may detect light signals, such as non-visible light signals (e.g., infrared or ultraviolet), emitted from the markers of the trackers 42. Responsive to detecting these light signals, the optical sensor 36 may generate and communicate optical-based signals to the camera controller 40. In general, the optical-based signals may indicate directions from which the detected light signals were transmitted to and received by the optical sensor 36. The camera controller 40 may be configured to generate image data based on the optical-based signals, and to communicate the image data to the navigation controller 22. The navigation controller 22 may then be configured to determine the poses of the trackers 42 relative to the localizer camera 18 based on the image data, and to determine the poses of the objects to which the trackers 42 are affixed based on the determined tracker poses and previously stored fixed spatial relationships between the trackers 42 and objects.

The navigation controller 22 may display the relative poses of objects tracked during a surgical procedure on the displays 28, 30 to aid the surgeon. The navigation controller 22 may also control and/or constrain movement of the robotic manipulator 14 and surgical instrument 16 based on the relative poses of the tracked objects. For example, the navigation controller 22 may be configured, based on the determined poses of the tracked objects, to identify a pose of a target volume of patient tissue to be treated, and to cause the robotic manipulator 14 to maneuver the surgical instrument 16 to treat the target volume while avoiding undesired contact with anatomical structures and other surgical tools adjacent the target volume.

The surgical instrument 16 may form part of an end effector of the robotic manipulator 14. The surgical instrument 16 may be, without limitation, a burring instrument, an electrosurgical instrument, an ultrasonic instrument, a reamer, an impactor, or a sagittal saw. The robotic manipulator 14 may include a base 48, several links 50 extending from the base 48, and several active joints including actuators for moving the surgical instrument 16 with respect to the base 48. The links 50 may form a serial arm structure as shown in FIG. 1, a parallel arm structure, or other suitable structure.

The robotic manipulator 14 may include an ability to operate in a manual mode in which a user grasps the end effector of the robotic manipulator 14 to cause movement of the surgical instrument 16 (e.g., directly, or through force/torque sensor measurements that cause active driving of the robotic manipulator 14). The robotic manipulator 14 may also include a semi-autonomous mode in which the surgical instrument 16 is moved by the robotic manipulator 14 along a predefined tool path (e.g., the active joints of the robotic manipulator 14 are operated to move the surgical instrument 16 without requiring force/torque on the end effector from the user). An example of operation in a semi-autonomous mode is described in U.S. Pat. No. 9,119,655 to Bowling et al., the disclosure of which is hereby incorporated by reference herein in its entirety. A separate tracker may be attached to the base 48 of the robotic manipulator 14 to track movement of the base 48 by the localizer camera 18.

Similar to the navigation system 12, the robotic manipulator 14 may house a manipulator controller 52 including a processor 54 programmed to implement the functions, features, processes, algorithms, and modules of the robotic manipulator 14, or more particularly of the manipulator controller 52, described herein. For example, the processor 54 may be programmed to control operation and movement of the surgical instrument 16 through movement of the links 50, such as at the direction of the navigation controller 22.

During a surgical procedure, the manipulator controller 52 may be configured to determine a desired location to which the surgical instrument 16 should be moved, such as based on data received from the navigation controller 22. Based on this determination, and information relating to the current position of the surgical instrument 16, the manipulator controller 52 may be configured to determine an extent to which each of the links 50 needs to be moved to reposition the surgical instrument 16 from the current position to the desired position. Data indicating where the links 50 are to be repositioned may be forwarded to joint motor controllers (e.g., one for controlling each motor) that control the active joints of the robotic manipulator 14. Responsive to receiving such data, the joint motor controllers may be configured to move the links 50 in accordance with the data, and consequently move the surgical instrument 16 to the desired position.

Figure 2:
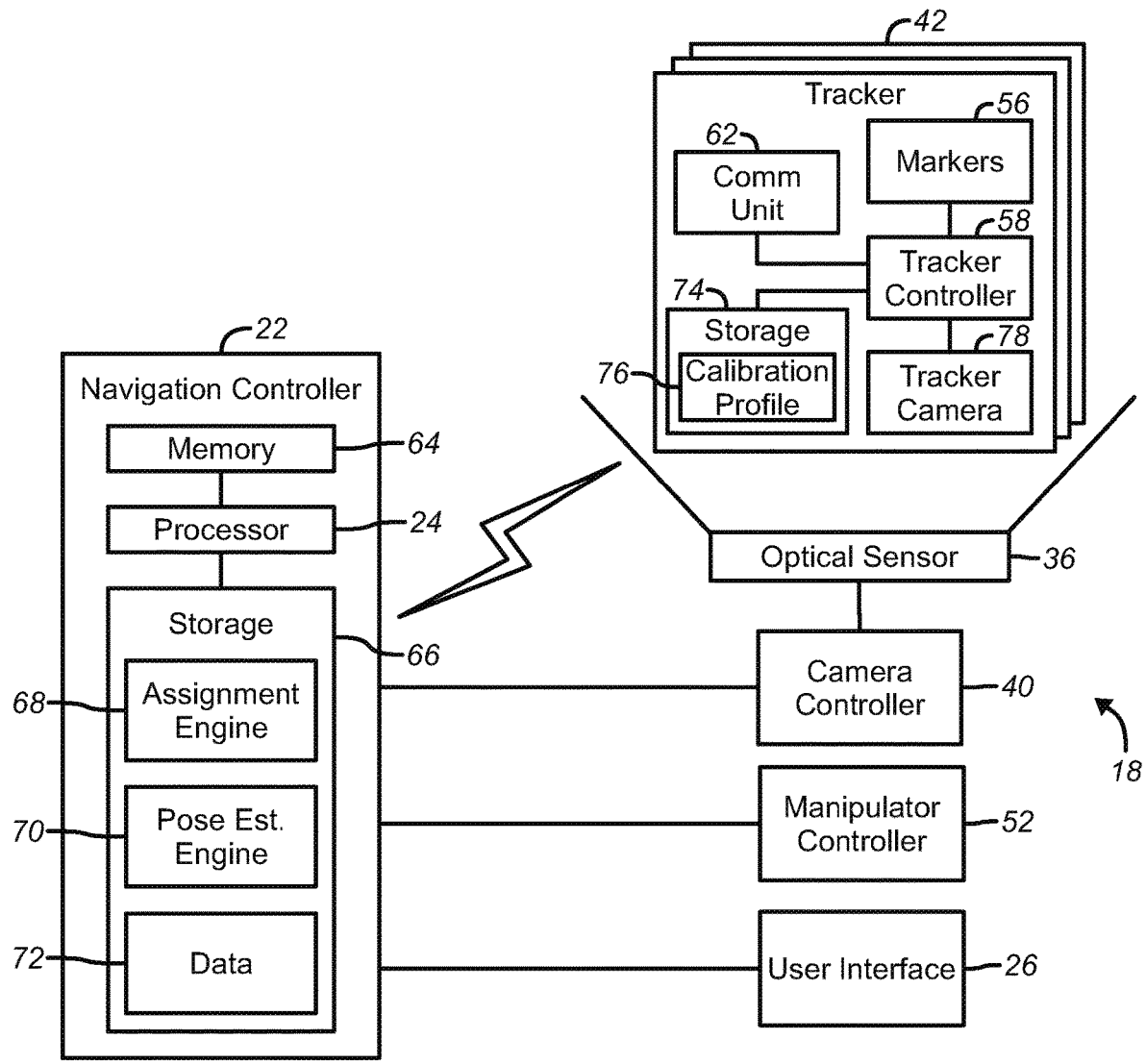
FIG. 2 illustrates components of a navigation system.

Referring to FIG. 2, the trackers 42 affixed to objects in the surgical workspace may be active trackers each having active markers 56 for transmitting light signals and a tracker controller 58. The trackers 42 may be powered by an internal battery, or may have leads to receive power through the navigation controller 22. The active markers 56 may be light emitting diodes (LEDs) that transmit light, such as non-visible light (e.g., infrared or ultraviolet), detectable by the optical sensor 36.

The tracker controller 58 of each tracker 42 may be connected to the active markers 56 of the tracker 42, and may be configured to control the rate and order in which the active markers 56 fire, such as at the direction of the navigation controller 22. The navigation controller 22 may thus be in data communication with the tracker controllers 58, such as wirelessly or through a wired connection, to cause firing of the active markers 56 of each tracker 42. For instance, each tracker 42 may include a communications unit 62 coupled to the tracker controller 58 and configured to facilitate communication between the tracker 42 and the navigation controller 22. The communications unit 62 of each tracker 42 may also facilitate communication between the tracker controllers 58 of the various trackers 42 in the surgical workspace. As one example, the communications unit 62 of each tracker 42 may include one or more wireless communication technologies, such as Bluetooth.

The tracker controllers 58 may cause the active markers 56 of each tracker to fire at different rates and/or times to enable the navigation controller 22 to identify which active marker 56 is firing at a given moment. In this way, the navigation controller 22 may associate each detected light signal with a particular marker 56 that generated the light signal. Alternatively, the tracker controllers 58 may cause the active markers 56 to fire continuously and/or at a same time. In this case, the navigation controller 22 may be configured to implement a marker assignment algorithm, which is described in more detail below, to determine which detected light signal corresponds to which active marker 56.

Rather than being active trackers, the trackers 42 affixed to objects in the surgical workspace may be passive trackers including passive markers (not shown), such as reflectors that reflect light emitted from the light source 38 (FIG. 1) of the localizer camera 18. The reflected light may then be received and detected by the optical sensor 36.

The localizer camera 18 may be configured to detect and image the light signals emitted from the markers 56. Specifically, responsive to the marker 56 of a tracker 42 emitting a light signal towards the optical sensor 36 of the localizer camera 18, the optical sensor 36 may generate and communicate an optical-based signal to the camera controller 40. The optical-based signal may indicate a direction from which the signal was transmitted to and received by the optical sensor 36. In particular, the optical-based signal may indicate a viewing direction vector that extends from the localizer camera 18 and through the source of the detected light signal in the surgical workspace. The optical sensor 36 may communicate each optical-based signal to the camera controller 40.

The camera controller 40 may be configured to generate image data based on the optical-based signals received from the optical sensor 36. The image data may indicate the above-described viewing direction vectors, such as by defining a two-dimensional image depicting features. Each feature depicted in the image may be a blob that contrasts a background of the image. The position of each blob in the image may correspond to the direction from which the light signal corresponding to the blob was transmitted to and received by the localizer camera 18. Specifically, each pixel coordinate of an image generated by the localizer camera 18 may correspond to a different viewing direction vector, and light signals emitted from a source at any position on the viewing direction vector may be mapped to the same pixel coordinate. Accordingly, the position of each blob in the image may indicate a direction from which the light signal corresponding to the blob was received by the optical sensor 36, and correspondingly, may indicate a direction of a marker 56 relative to the localizer camera 18.

For each tracker 42 within a field of view of the localizer camera 18, at least a subset of the blobs in an image generated by the localizer camera 18 may have been directly generated from the markers 56 of the tracker 42. Said another way, each blob of the subset may directly correspond to a detected light signal that was emitted from one of the markers 56 of the tracker 42 and traveled directly to the optical sensor 36. The subset of blobs directly generated by a given tracker 42 may thus reflect the position of the tracker 42 in the surgical workspace. A remainder of the blobs of the image may not be directly generated from the markers 56 of the given tracker 42. For example, the remainder of blobs may include one or more blobs directly generated from the markers 56 of another tracker 42 in the surgical workspace. The remainder of blobs may also include one or more blobs generated from reflections of detectable light signals in the surgical workspace, such as surface reflections of the light signals emitted from the markers 56 of the trackers 42, and from other light sources in the surgical workspace not functioning as a marker 56 of a tracker 42. These latter blobs in the image may be referred to as "accidental blobs."

The camera controller 40 may be configured to communicate the image data to the navigation controller 22. Responsive to receiving the image data, the navigation controller 22 may be configured to generate tracker pose data estimating the poses of the trackers 42 relative to the localizer camera 18, as described in more detail below. The navigation controller 22 may then be configured to generate object pose data indicating the poses of objects to which the trackers 42 are affixed relative to the localizer camera 18 based on the tracker pose data and previously stored spatial relationships between the trackers 42 and objects. The object pose data may indicate the poses of objects firmly affixed to the trackers 42 relative to the localizer camera 18. The navigation controller 22 may thereafter provide guidance and/or operate the robotic manipulator 14 based on the object pose data.

As previously described, the navigation controller 22 may include a processor 24 programmed to implement the functions, features, processes, algorithms, and modules of the navigation controller 22 described herein. More particularly, the navigation controller 22 may include the processor 24, memory 64, and non-volatile electronic storage 66 configured to implement the functions, features, processes, algorithms, and modules of the navigation controller 22 described herein.

The processor 24 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions stored in the memory 64. The memory 64 may include a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The non-volatile electronic storage 66 may include one or more persistent data storage devices such as a hard drive, optical drive, tape drive, non-volatile solid-state device, or any other device capable of persistently storing information.

The non-volatile electronic storage 66 may store computer-executable instructions embodying software programs, such as an operating system and applications. The computer-executable instructions may be compiled or interpreted from a variety of programming languages and/or technologies, including, without limitation, and either alone or in combination, Java, C, C++, C#, Objective C, Fortran, Pascal, Java Script, Python, Perl, and PL/SQL.

The processor 24 may operate under control of the software programs, which may be configured upon execution by the processor 24 to implement the functions, features, processes, algorithms, and modules of the navigation controller 22 described herein. In particular, the processor 24 may be configured to execute the software programs by reading into the memory 64 and executing the computer-executable instructions embodying the software programs. Upon execution, the computer-executable instructions may be configured to cause the processor 24 to implement the functions, features, processes, algorithms, and modules of the navigation controller 22 described herein.

As non-limiting examples, the computer-executable instructions of the navigation controller 22 may embody an assignment engine 68 and a pose estimation engine 70. The assignment engine 68 may be configured upon execution to determine which blobs depicted in an image generated by the localizer camera 18 were directly generated by which markers 56 of the trackers 42. The pose estimation engine 70 may be configured upon execution to estimate a pose of a tracker 42 in the surgical workspace based on the positions of blobs in the image assigned to the markers 56 of the tracker 42. Algorithms implemented by these programs for performing these tasks are described in more detail below.

The non-volatile electronic storage 66 may also store data 72 that facilitates operation of the navigation controller 22 and other components of the surgical system 10. The software programs executing on the navigation controller 22 may be configured to access and process the data 72 to facilitate performance of the functions, features, algorithms, and processes of the navigation controller 22 described herein.

For example and without limitation, the data 72 may include model data, transformation data, calibration data, and surgical plan data. The model data may include the virtual models of anatomical structures of interest to the surgical procedure, the virtual models for the surgical instruments being used in the surgical procedure, and the virtual models for trackers used in the surgical procedure, as described above. The transformation data may include the fixed spatial relationships described herein, which may enable transforming a pose of a tracker 42 in the surgical workspace relative to the localizer camera 18 to a pose of an object to which the tracker 42 is firmly affixed relative to the localizer camera 18. The calibration data may indicate a three-dimensional coordinate system C specific to the localizer camera 18, a calibration area of the localizer camera 18 relative to the coordinate system C, and the viewing direction vector associated with each pixel coordinate of an image generated by the localizer camera 18 relative to the coordinate system C. For instance, the calibration data may indicate a center viewing direction vector of the optical sensor 36 and a pixel coordinate corresponding to the center viewing direction vector (e.g., the center pixel coordinate of each image), and the navigation controller 22 may be configured to calculate the viewing direction vector for each other pixel coordinate in an image based on the center viewing direction vector and the position of the other pixel coordinate relative to the center pixel coordinate using geometry (e.g., Pythagorean theorem, cosine). The surgical plan data may identify patient anatomical structures and target volumes involved in the surgical procedure, may identify the instruments being used in the surgical procedure, and may define planned trajectories for instruments and planned movements of patient tissue during the surgical procedure.

Each tracker 42 may also include non-volatile electronic storage 74, which may be similar to the non-volatile electronic storage 66 of the navigation controller 22. The non-volatile electronic storage 74 of a given tracker 42 may store a calibration profile 76 specific to the tracker 42. The calibration profile 76 may indicate the type of the tracker 42, the shape of the tracker 42, and the predefined marker geometry of the tracker 42. For instance, the calibration profile 76 may define the virtual model for the tracker 42 that indicates a coordinate system specific to the tracker 42, and indicates coordinates in the coordinate system corresponding to the relative positions of the markers 56 on the tracker 42. The calibration profile 76 may also indicate the fixed spatial relationship between markers 56 of the tracker 42 and the object affixed to the tracker 42. Responsive to the tracker 42 being positioned in the surgical workspace and being powered on, the tracker 42 may be configured to transmit its calibration profile 76 to the navigation controller 22, such as via the communications unit 62. This transmission may inform the navigation controller 22 of the tracker's 42 use in the surgical workspace, and the virtual model for the tracker 42 defined in the calibration profile 76 may be stored by the navigation controller 22 in the non-volatile electronic storage 66 or memory 64.

Although not shown, the camera controller 40, the manipulator controller 52, and the tracker controllers 58 may each also include a processor, memory, and non-volatile electronic storage having supporting data and computer-executable instructions embodying software programs configured, upon execution by the processor, to implement the functions, features, processes, algorithms, and modules of the controller described herein.

Tracker Configurations

To track objects in real time during a surgical procedure, the navigation system 12 may be configured to implement a fast and robust algorithm for assigning each detected light signal to the marker 56 that generated the light signal. As described above, when the trackers 42 are active trackers, the tracker controllers 58 may be configured to fire the markers 56 at different times, and the navigation controller 22 may be configured to assign each detected light signal with the marker 56 being fired contemporaneously with the light signal being detected. However, iteratively firing and associating each marker 56 results in additional processing time, and does not account for accidental light signals in the surgical workspace, such as reflections. Moreover, this technique may not be implemented when the trackers 42 are passive and function to reflect light emitted from the light source 38 of the localizer camera 18.

Thus, in alternative implementations, the markers 56 of the trackers 42 may emit detectable light signals at substantially a same time, and the navigation controller 22 may be configured to differentiate, from the several detected light signals, which detected light signal was directly generated by which marker 56 in the surgical workspace. In particular, responsive to detection of the light signals, the localizer camera 18 may generate an image depicting features. Each feature may be a blob that contrasts with a background of the image. The markers 56 of each tracker 42 in the surgical workspace may have directly generated a different subset of the blobs depicted in the image. The navigation controller 22 may be configured to perform a marker assignment algorithm, such as upon execution of the assignment engine 68, to determine each blob that was directly generated by one of the markers 56, and to assign the blobs to the markers 56 accordingly. To this end, the navigation controller 22 may be configured to identify and ignore accidental blobs that were not directly generated by a marker 56, such as blobs caused by unplanned light sources and unintended reflections.

Figure 3:
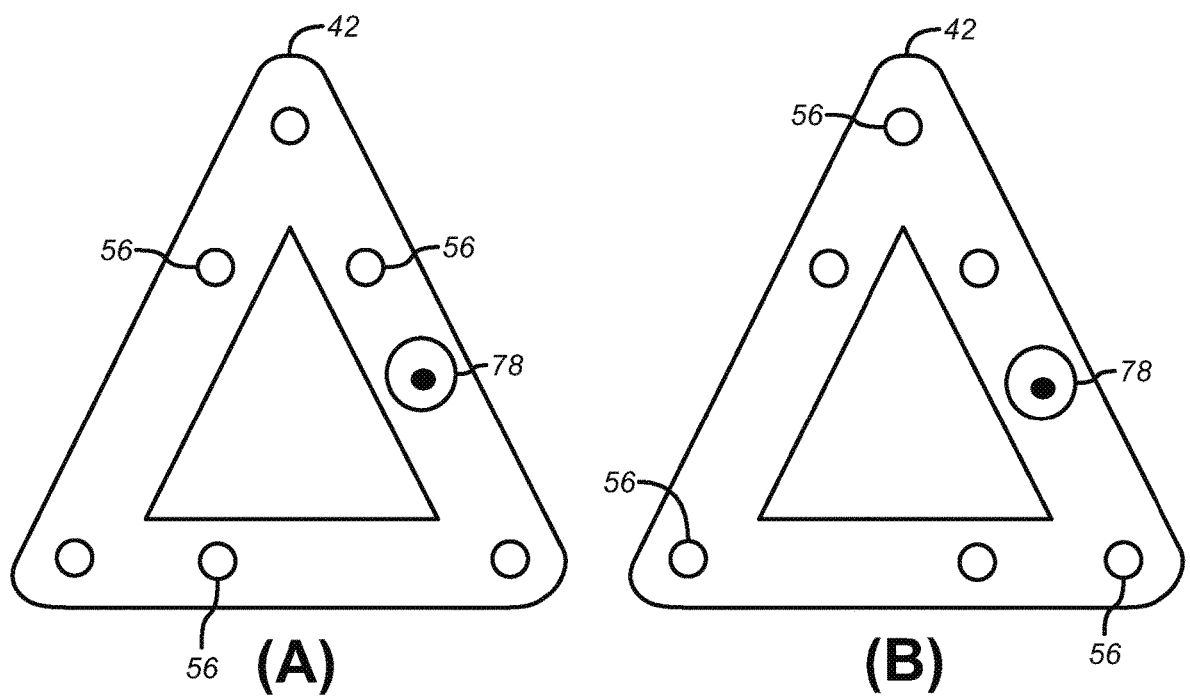
FIG. 3 illustrates triangle shaped surgical trackers.
Figure 4:
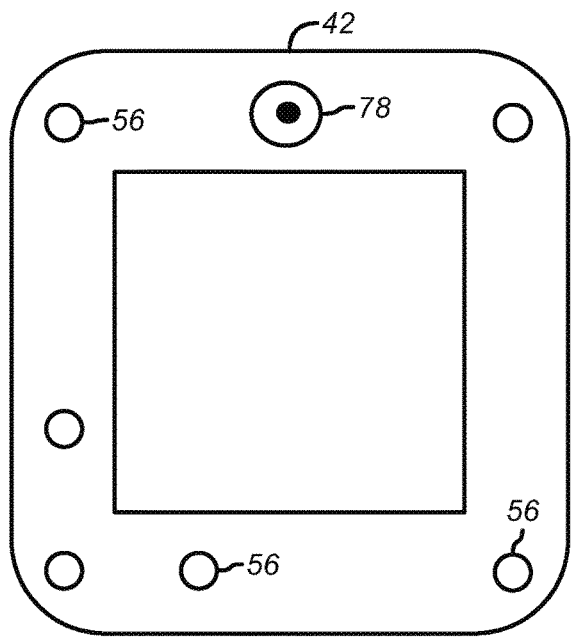
FIG. 4 illustrates square shaped surgical trackers.
Figure 4:
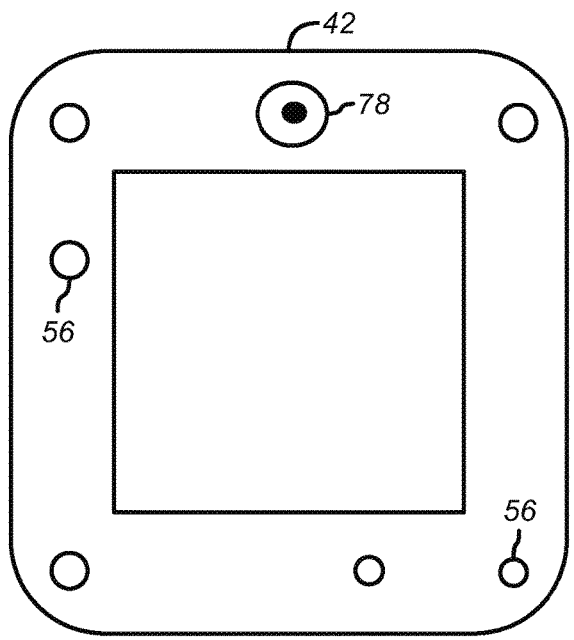
Figure 4:
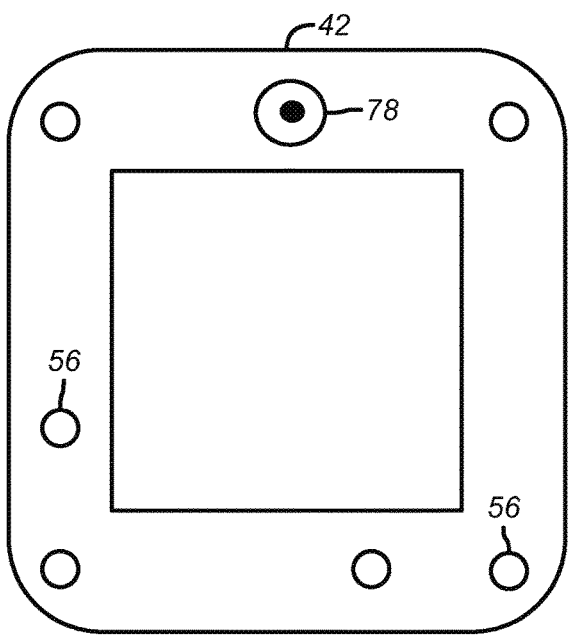
Figure 4:
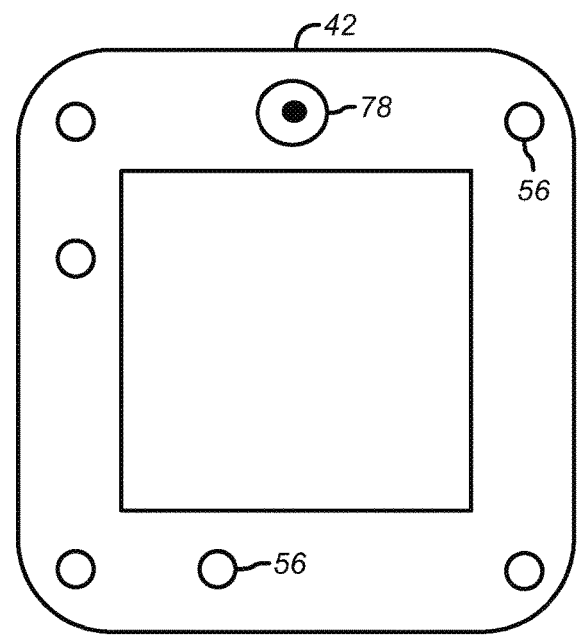
Figure 5:
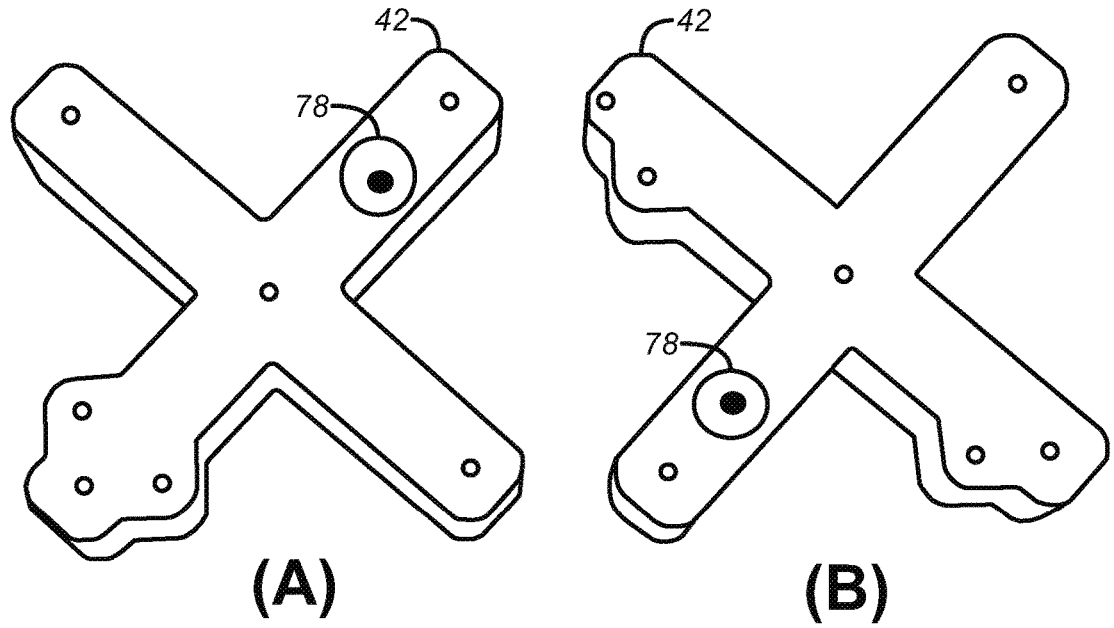
FIG. 5 illustrates star shaped surgical trackers.
Figure 5:
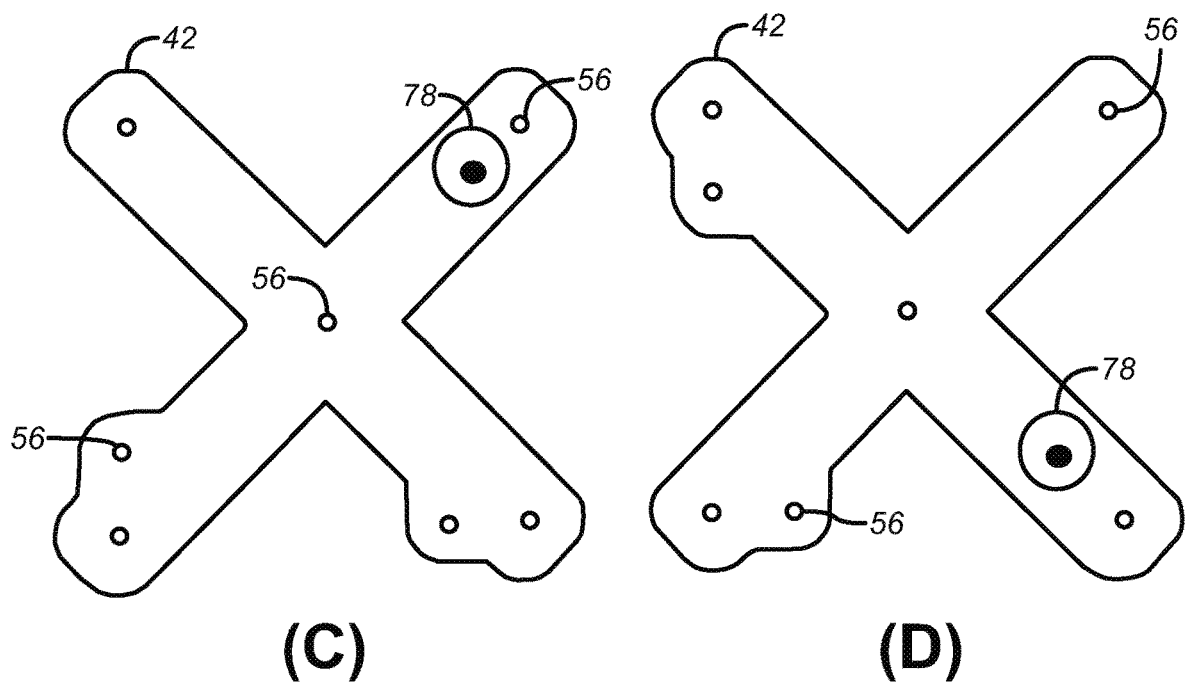
Figure 6:
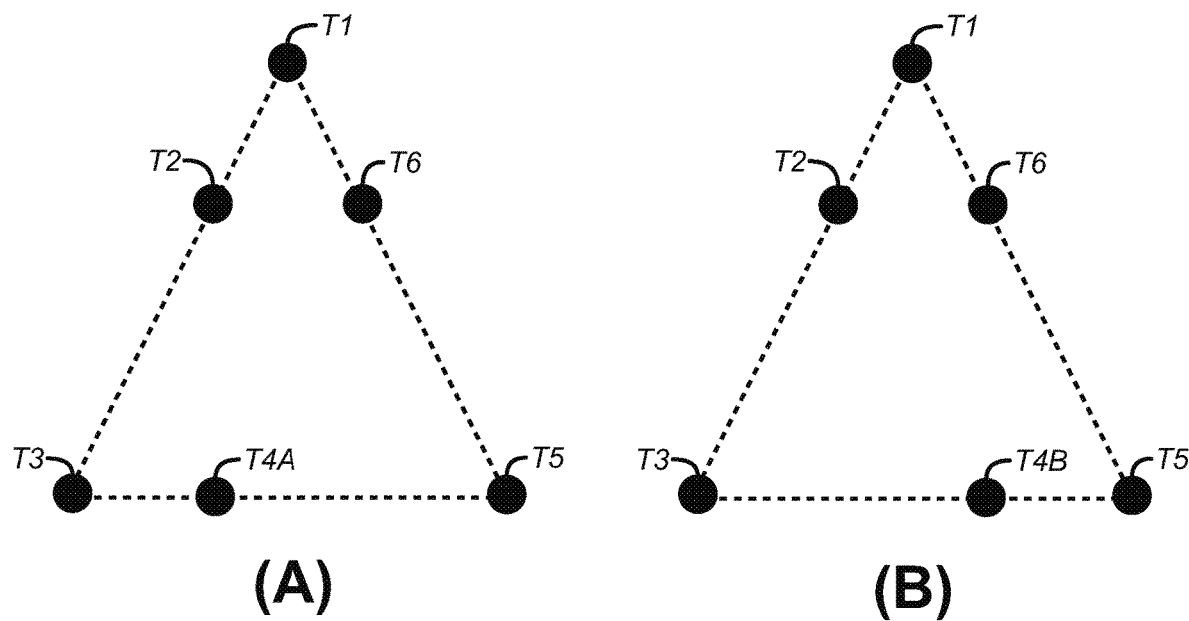
FIG. 6 illustrates predefined marker geometries for surgical trackers that form a triangle shape.
Figure 7:
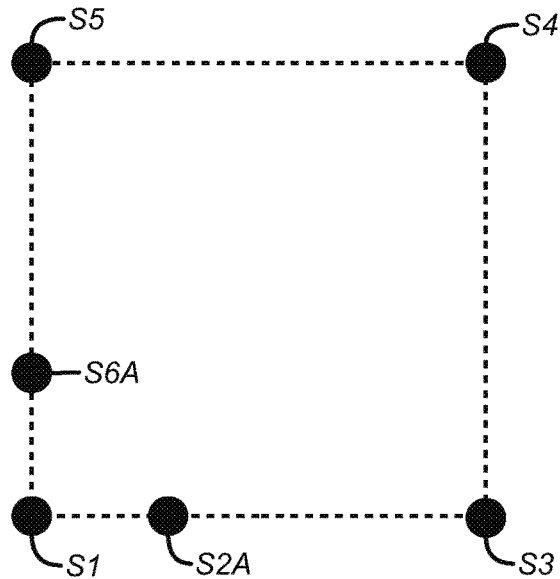
FIG. 7 illustrates predefined marker geometries for surgical trackers that form a square shape.
Figure 7:
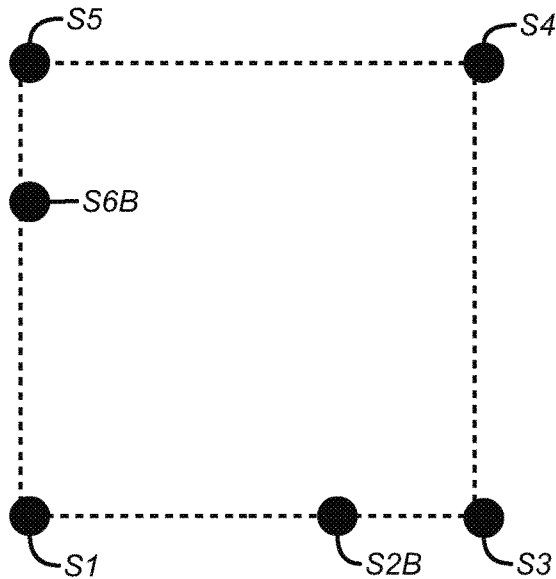
Figure 7:
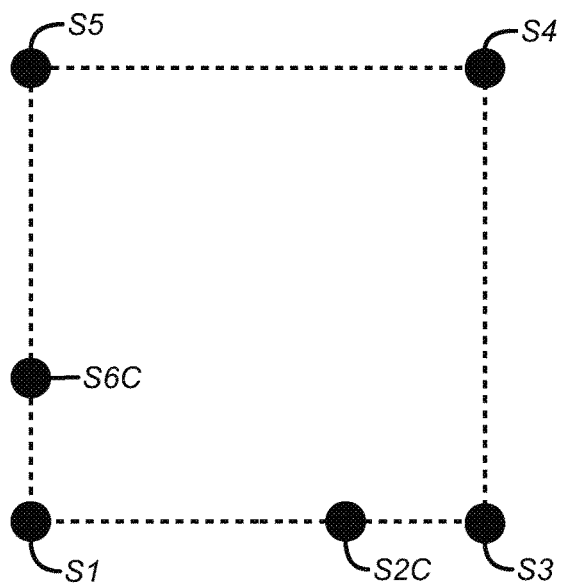
Figure 7:
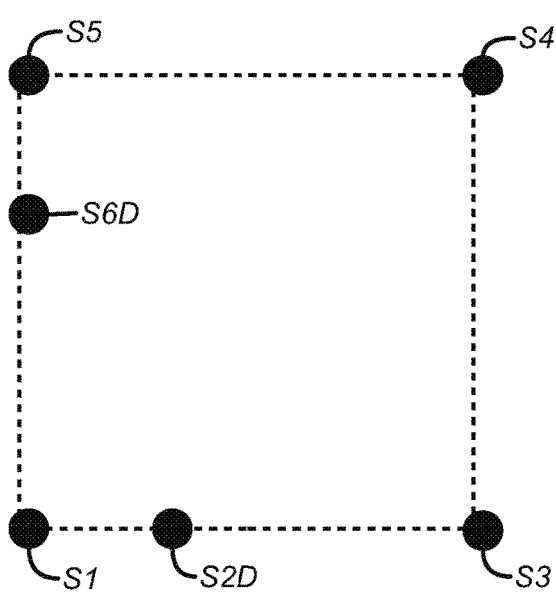
Figure 8:
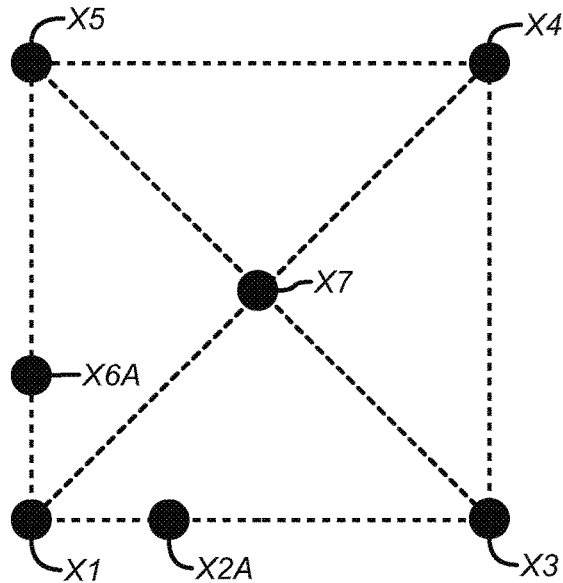
FIG. 8 illustrates predefined marker geometries for surgical trackers that form a star shape.
Figure 8:
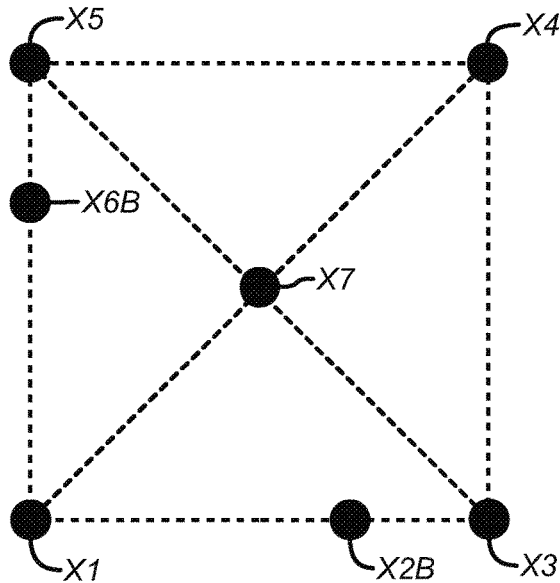
Figure 8:
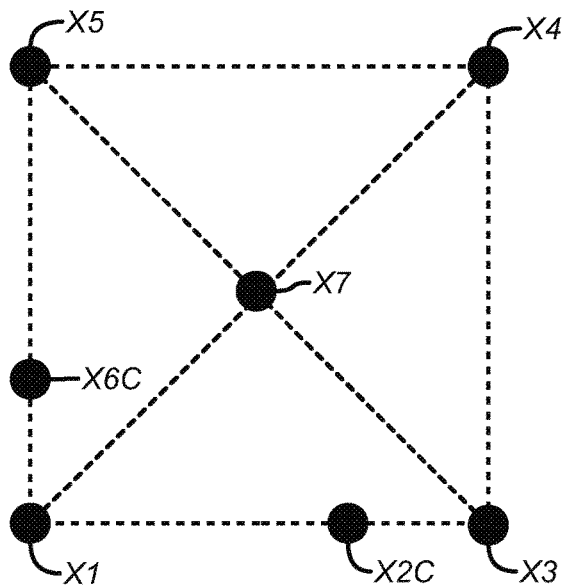
Figure 8:
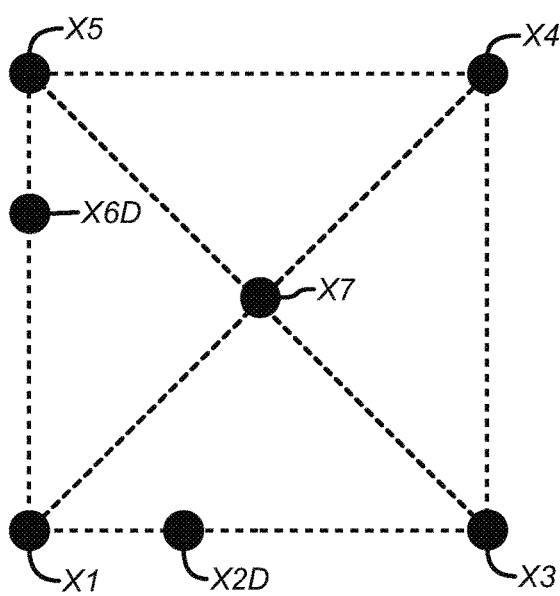

FIGS. 3-5 illustrate trackers 42 with predefined geometries of markers 56 that are specifically designed to enable a fast and robust marker assignment algorithm. FIG. 3 illustrates triangle shaped trackers 42, FIG. 4 illustrates square shaped trackers 42, and FIG. 5 illustrates star shaped trackers 42. FIGS. 6-8 illustrate the predefined geometries of markers 56 that may be disposed on the triangle, square, and star shaped trackers 42 respectively. The illustrated predefined marker geometries may enable the navigation controller 22 to assign detected light signals to the markers 56 of the trackers 42 based on an image of the surgical workspace, even if the image depicts detected light signals generated from the markers 56 of multiple trackers 42 and/or depicts detected light signals not directly generated by a marker 56 of a tracker 42 (e.g., reflections).

Each tracker 42 may include at least four markers 56. For instance, the predefined marker geometries of FIGS. 6 and 7 each includes six markers 56 (labeled T1 through T6 and S1 through S6, respectively), and the predefined marker geometries of FIG. 8 each includes seven markers 56 (labeled X1 through X7). The markers 56 of each predefined marker geometry may be ordered starting at a master marker 56 (e.g., T1, S1, X1) and proceeding according to a predefined marker order direction, such as counterclockwise.

The predefined marker geometry of each tracker 42 in the surgical workspace may form a particular shape, which may correspond to the shape of the tracker 42. For example, the predefined marker geometries of FIG. 6 each form a triangle, the predefined marker geometries of FIG. 7 each form a square, and the predefined marker geometries of FIG. 8 each form a star. Moreover, different predefined marker geometries may form a same shape. FIGS. 6A and 6B each illustrates a different predefined marker geometry forming a triangle, FIGS. 7A through 7D each illustrates a different predefined marker geometry forming a square, and FIGS. 8A through 8D each illustrates a different predefined marker geometry forming a star. The predefined marker geometries forming a same shape may differ by varying the position of one or more markers 56 forming a side of the shape relative to the markers 56 forming the vertices of the shape (e.g., the position of marker T4A in FIG. 6A compared to the position of marker T4B in FIG. 6B). Thus, responsive to determining that a subset of blobs of an image corresponds to a given shape formed by a predefined marker geometry of a tracker 42 in the surgical workspace, the navigation controller 22 may be configured to determine to which predefined marker geometry forming the given shape the subset of blobs corresponds based on the positions of the blobs forming a side of the shape relative to the blobs forming the vertices of the shape.

Each predefined marker geometry of each tracker 42 may include two or more collinear marker arrangements. Each collinear marker arrangement may include three or more markers 56 in a collinear relationship on the tracker 42. In other words, the collinear marker arrangement can include exactly three markers, at least three markers, or any number of markers greater than three markers, including, but not limited to any number of markers in a range inclusively between three to twenty markers. Moreover, multiple collinear marker arrangements of a given predefined marker geometry may share a same marker 56. For example, the predefined marker geometries of FIG. 6 each includes three collinear marker arrangements. Specifically, marker group T1, T2, and T3 form a collinear marker arrangement, marker group T3, T4, and T5 form a collinear marker arrangement, and marker group T5, T6, and T1 form a collinear marker arrangement. As a further example, the predefined marker geometries of FIG. 7 each includes two collinear marker arrangements: the marker group S1, S2, and S3, and the marker group S1, S6, and S5. As another example, the predefined marker geometries of FIG. 8 each includes four collinear marker arrangements: the marker group X1, X2, and X3, the marker group X1, X6, and X5, the marker group X1, X7, and X4, and the marker group X3, X7, and X5.

Each collinear marker arrangement of a tracker 42 may have a symmetric layout (hereinafter referred to as a "symmetric collinear marker arrangement") or an asymmetric layout (hereinafter referred to as an "asymmetric collinear marker arrangement"). A symmetric collinear marker arrangement may include two outer markers 56 and a middle marker 56 positioned between and equidistant from the outer markers 56. As an example, each of the predefined marker geometries of FIG. 8 includes two symmetric collinear marker arrangements: the marker group X1, X7, and X4, and the marker group X3, X7, and X5.

An asymmetric collinear marker arrangement may similarly include two outer markers 56 and a middle marker 56 that is positioned between the outer markers 56. However, unlike the symmetric collinear marker arrangements, in the asymmetric collinear marker arrangements, the middle marker 56 may be positioned closer to one of the outer markers 56 than the other of the outer markers 56. The middle marker 56 may be considered as "tagging" the outer marker 56 to which it is closest, which may be referred to as the "tagged marker 56" of the asymmetric collinear marker arrangement. As an example, the predefined marker geometries of FIG. 6 each includes three asymmetric collinear marker arrangements: the marker group T1, T2, and T3, the marker group T3, T4, and T5, and the marker group T1, T6, and T5. In each of these predefined marker geometries, marker T1 is doubly tagged by markers T2 and T6. The predefined marker geometry of FIG. 6A includes a middle marker T4A tagging outer marker T3, and the predefined marker geometry of FIG. 6B includes a middle marker T4B tagging outer marker T5. As a further example, the predefined marker geometries of FIG. 7 each includes two asymmetric collinear marker arrangements: marker group S1, S2, and S3, and marker group S1, S6, and S5. The predefined marker geometries of FIG. 8 each similarly includes two asymmetric collinear marker arrangements: marker group X1, X2, and X3, and marker group X1, X6, and X5.

Marker Assignment Algorithm

Figure 9:
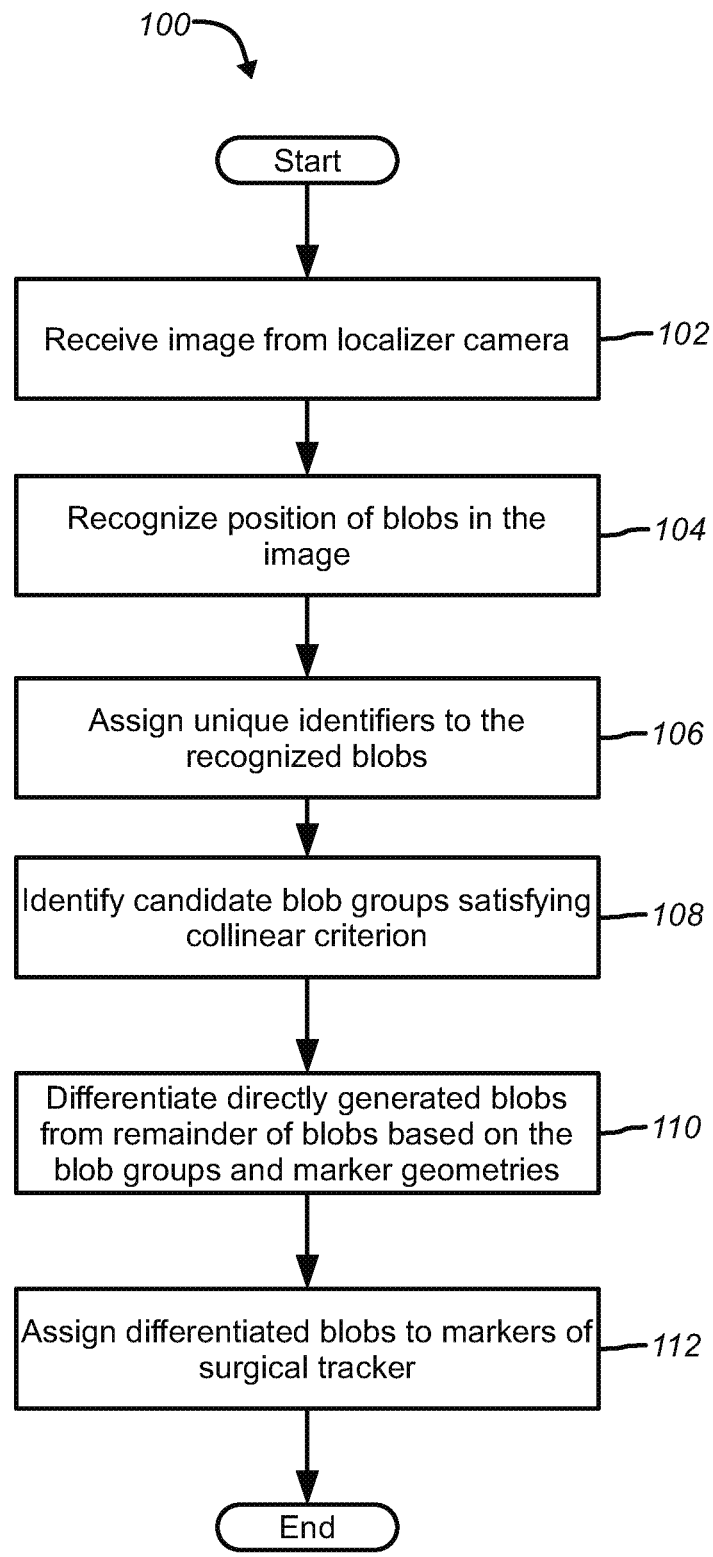
FIG. 9 illustrates a process for assigning blobs of an image to the markers of a surgical tracker.

FIG. 9 illustrates a process 100 for implementing a marker assignment algorithm. In particular, the process 100 may be configured to map feature points such as blobs in an image generated by the localizer camera 18 to the markers 56 of the trackers 42 in the surgical workspace that directly generated the blobs. The navigation controller 22 may be configured, such as upon execution of the assignment engine 68 by the processor 24, to perform the process 100.

In block 102, an image may be received from the localizer camera 18. The localizer camera 18 may be positioned so that its field of view includes the surgical workspace, and correspondingly includes the trackers 42 in the surgical workspace. Periodically, such as at the direction of the navigation controller 22, and/or responsive to a tracker 42 entering the field of view of the localizer camera 18, the localizer camera 18 may generate an image corresponding to its field of view. For instance, the navigation controller 22 may be configured to cause the localizer camera 18 to generate an image contemporaneously with instructing the trackers 42 to fire the markers 56 to detect the light signals emitted from the markers 56. Alternatively, the navigation controller 22 may cause the localizer camera 18 to transmit light into the surgical workspace from the light source 38, and may contemporaneously cause the localizer camera 18 to generate an image that depicts reflections of the transmitted light by the markers 56 of the trackers 42.

The image may include several features, which may be blobs that contrast with the background of the image. Each blob may correspond to a light signal detected by the localizer camera 18. At least a subset of the blobs may directly correspond to the markers 56 of the trackers 42. A remainder of the blobs may not be directly generated by the markers 56 of the trackers 42. For example, the remainder of blobs may include one or more blobs generated from other sources of detectable light signals in the surgical workspace, and/or may include one or more blobs generated from undesired reflections of detectable light signals in the surgical workspace.

Figure 10:
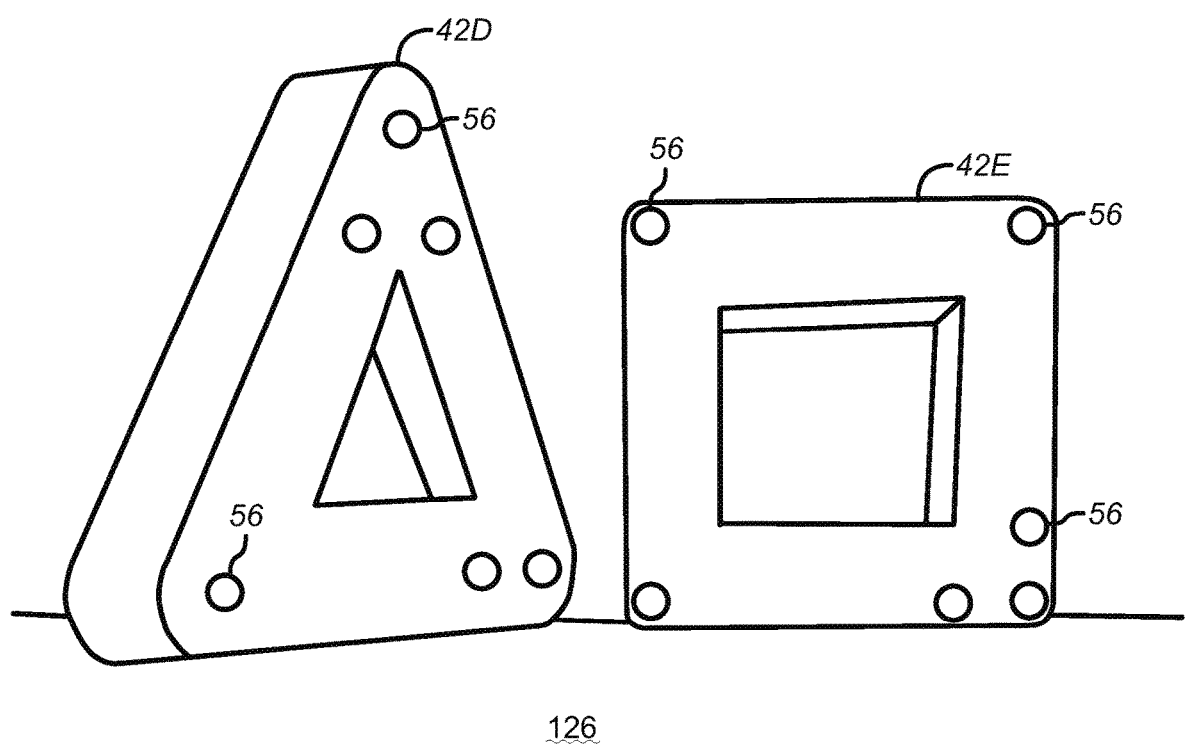
FIG. 10 illustrates a scene of surgical trackers that may be imaged by a surgical navigation system.

By way of example, FIG. 10 illustrates a scene that may be included within the field of view of the localizer camera 18. The scene may include two trackers 42D and 42E adjacent one another. The tracker 42D may be a triangle shaped tracker including the predefined marker geometry of FIG. 6B, and the tracker 42E may be a square shaped tracker including the predefined marker geometry of FIG. 7A. The scene may also include a reflective surface 126 on which the trackers 42D and 42E are disposed.

Figure 11:
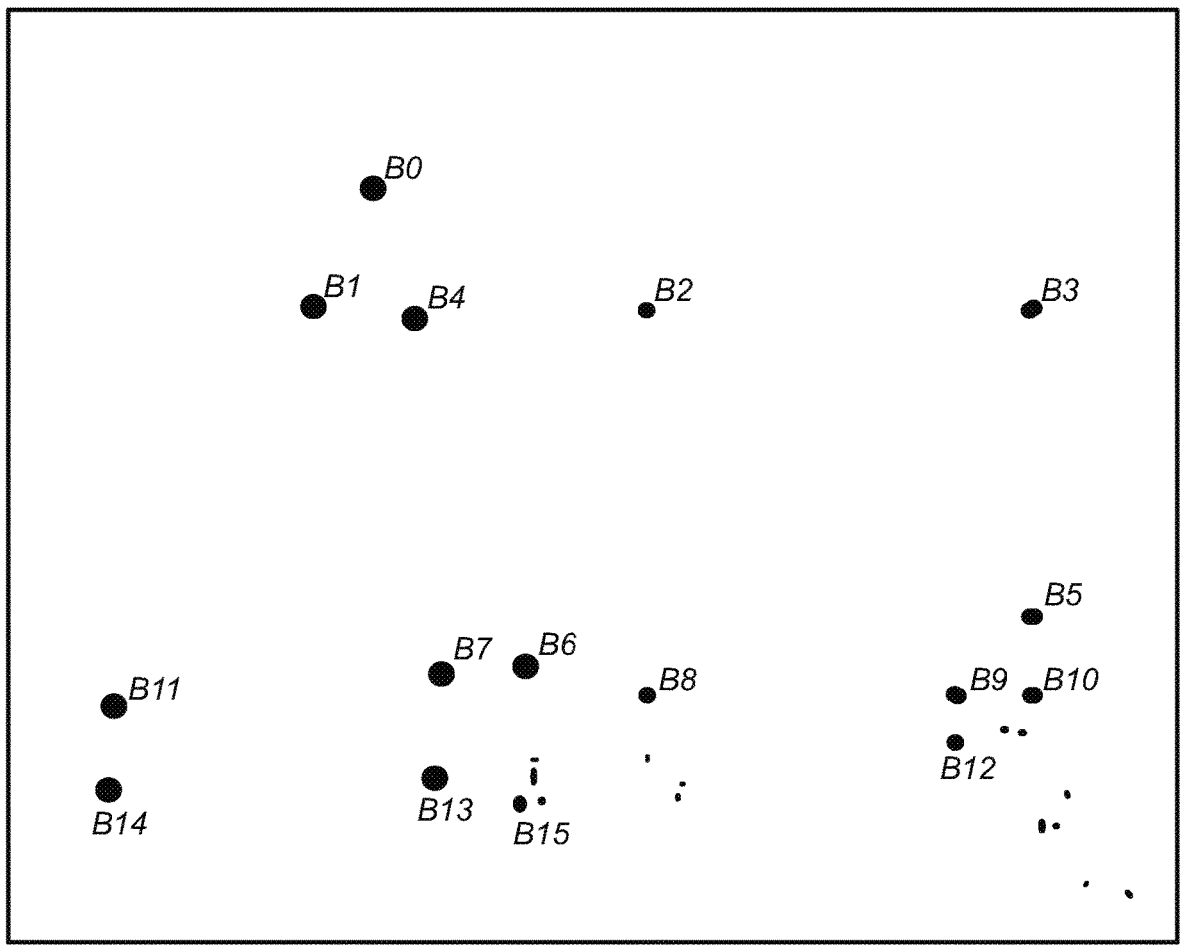
FIG. 11 illustrates an image that may be generated by a surgical navigation system from the scene of FIG. 10.

FIG. 11 illustrates an image of the scene of FIG. 10 that may be generated by the localizer camera 18. As shown in the illustrated example, the image may include several features in the form of blobs. A subset of the blobs may have been directly generated from the markers 56 of the tracker 42D (e.g., blobs B0, B1, B4, B6, B7, B11), and a subset of the blobs may have been directly generated the markers 56 of the tracker 42E (e.g., blobs B2, B3, B5, B8, B9, B10). A remainder of the blobs may have been generated from reflections of detectable light signals on the reflective surface 126. The image of FIG. 11 may be received by the navigation controller 22 in block 102.

Referring again to FIG. 9, in block 104, the position of the blobs in the image may be recognized. In particular, the navigation controller 22 may be configured, such as via execution of the assignment engine 68, to calculate the centers of all blobs in the image above a given threshold (e.g., using a weighted center algorithm), which results in a set of N two-dimensional pixel coordinates each corresponding to a different feature point, or more particularly to a different blob, in the image.

In block 106, a unique identifier may be assigned to each recognized blob. The unique identifiers (hereinafter referred to as "blob IDs") may be assigned to the recognized blobs in an incrementally increasing order, and may be assigned to each recognized blob based on the position of the blob in the image relative to the other blobs in the image. For instance, the blob IDs may be assigned from left to right iterating through each row of pixels from top to bottom of the image, as shown in FIG. 11. For example, the first recognized blob may be assigned a blob ID of B0, and subsequent blobs may be assigned incrementally increasing blob IDs.

In block 108, candidate blob groups satisfying a collinear criterion may be identified from the image. Each candidate blob group may include three of the blobs in the image that satisfy a collinear criterion, as described in more detail below. These identified blobs groups may be candidates for having been directly generated by a collinear marker arrangement of one of the trackers 42 in the surgical workspace. The blob groups may be considered as candidates because, relative to a given tracker 42, at least one of the blob groups may include a blob that is not in the subset of blobs directly generated by the given tracker 42. In other words, at least one of the blob groups may include a blob that is in the remainder of blobs relative to the given tracker 42 (e.g., generated by the marker 56 of another tracker 42, an accidental blob).

Figure 12:
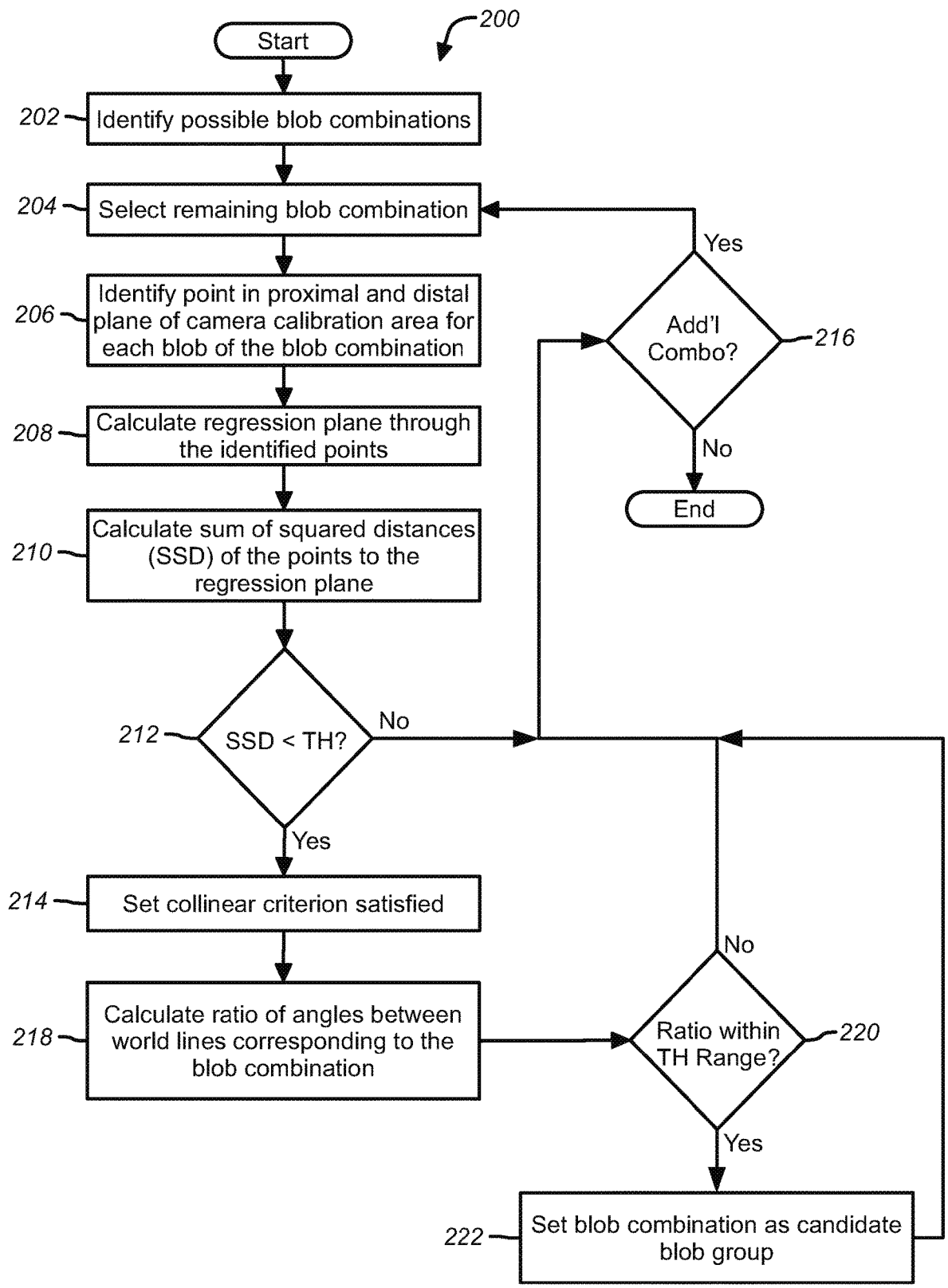
FIG. 12 illustrates a process for identifying blob groups as candidates for having been directly generated by the markers of a surgical tracker.

FIG. 12 illustrates a process 200 for identifying the candidate blob groups in block 108. The navigation controller 22 may be configured to implement the process 200, such as upon execution of the assignment engine 68 by the processor 24.

In block 202, each possible combination of a given number of blobs may be identified. The given number of blobs of each possible combination may be equal to the number of markers 56 included in each collinear marker arrangement in the surgical workspace. For instance, based on the predefined marker geometries illustrated in FIGS. 6-8, in which each collinear marker arrangement includes three markers 56, each possible blob combination of three of the blobs in the image may be identified.

Figure 13:
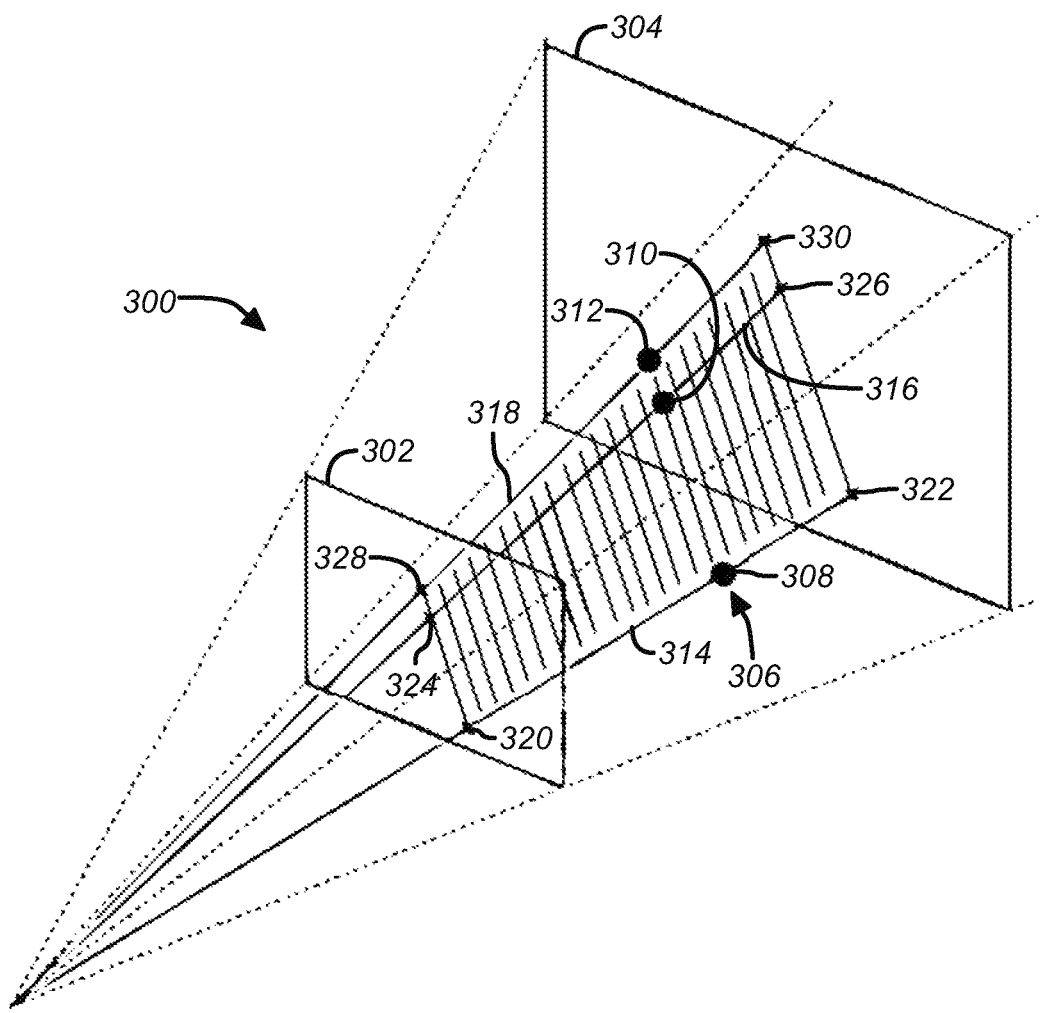
FIG. 13 illustrates a calibration area of a tracking camera of a surgical navigation system.

Each possible blob combination may then be evaluated to determine whether the combination satisfies a collinear criterion. A possible blob combination may be considered to satisfy the collinear criterion if the blobs of the combination could have been generated by a collinear marker arrangement of a tracker 42 in the surgical workspace. The navigation controller 22 may be configured to make this determination based on a calibration area of the localizer camera 18. Referring to FIG. 13, the localizer camera 18 may have a calibration area 300 that defines an area in which markers 56 may be imaged by the localizer camera 18 for navigation purposes. During setup, the localizer camera 18 may thus be positioned so that the surgical workspace is within the calibration area 300.

The calibration area 300 for the localizer camera 18 may be defined by a proximal plane 302 closer to the localizer camera 18 and a distal plane 304 further from the localizer camera 18. As previously described, each blob in an image generated by the localizer camera 18 may represent a straight line containing all world points in the calibration area 300 that project on the specific pixel coordinate of the blob center in the image. In other words, each blob center may define a unique viewing direction vector (also referred to herein as a "world line") that extends from the localizer camera 18 and through the proximal plane 302 and the distal plane 304. Each blob center may thus correspond to a unique point in the proximal plane 302 ("near point") and a unique point in the distal plane 304 ("far point") of the calibration area 300, namely, the points where the straight line associated with the blob center intersects the proximal plane 302 and distal plane 304. The navigation controller 22 may utilize these points to determine whether a possible blob combination satisfies the collinear criterion.

Referring again to FIG. 12, in block 204, one of the possible blob combinations that remains to be evaluated may be selected. In block 206, for each blob of the selected possible blob combination, a near point and a far point corresponding to the blob in the proximal plane 302 and the distal plane 304, respectively, may be identified. For example, FIG. 13 illustrates a selected possible blob combination 306 including blobs 308, 310, and 312. Blob 308 may correspond to viewing direction vector 314, blob 310 may correspond to viewing direction vector 316, and blob 312 may correspond to viewing direction vector 318. Following the respective viewing direction vectors to the proximal plane 302 and distal plane 304, the navigation controller 22 may determine that blob 308 is associated with near point 320 and far point 322, that blob 310 is associated with near point 324 and far point 326, and blob 312 is associated with near point 328 and far point 330. The data 72 of the navigation controller 22 may indicate the far and near points corresponding to each world line and pixel coordinate, either directly or through mathematical calculation.

Referring again to FIG. 12, in block 208, a regression plane may be calculated based on the identified near points and far points. Given a set of markers 56 having a collinear relationship on a tracker 42 in the surgical workspace, the far and near points corresponding to the blobs directly generated from the markers 56 will ideally be on a same plane. The calculated regression plane may thus be a plane that best fits the identified far and near points for the selected possible blob combination.

In block 210, a sum of squared distances ("SSD") of the identified far and near points to the regression plane may be calculated. In block 212, a determination may be made of whether the SSD is less than a threshold value. For example, the threshold value may be 0.25 mm$^2$, which may correspond to the mean distance of the identified far and near points to the regression plane being less than 0.2 mm. Responsive to determining that the SSD of the identified far and near points corresponding to the blobs of the possible blob combination to the regression plane is less than the threshold value ("Yes" branch of block 212), a determination may be made that the possible blob combination may have been directly generated by a set of markers 56 of a tracker 42 in the surgical workspace that have a collinear relationship. Accordingly, in block 214, the possible blob combination may be set as satisfying the collinear criterion.

Responsive to determining that the SSD is greater than or equal to the threshold value ("No" branch of block 212), in block 216, a determination may be made of whether an additional possible blob combination remains to be evaluated. If so ("Yes" branch of block 216), then the process 200 may return to block 204 to select and evaluate one of the remaining possible blob combinations as described above.

Responsive to determining that a possible blob combination satisfies the collinear criterion, the navigation controller 22 may be configured to determine whether the possible blob combination satisfies a ratio criterion corresponding to a collinear marker arrangement of a tracker 42. As previously described, each collinear marker arrangement on the trackers 42 may include two outer markers 56 and a middle marker 56 positioned between the outer markers 56. The distance between the middle marker 56 and one of the outer markers 56 and the distance between the middle marker 56 and the other outer marker 56 may have a predefined ratio. Thus, in blocks 218 through 222, a determination may be made of whether each possible blob combination satisfying the collinear criterion also satisfies the predefined ratio of one of the collinear marker arrangements of the trackers 42 in the surgical workspace based on a position of the middle blob of the possible blob combination relative to positions of the outer blobs of the possible blob combination from a viewpoint of the localizer camera 18. If so, then the navigation controller 22 may set the possible blob combination as a candidate blob group identified in block 108 (FIG. 9).

Figure 14:
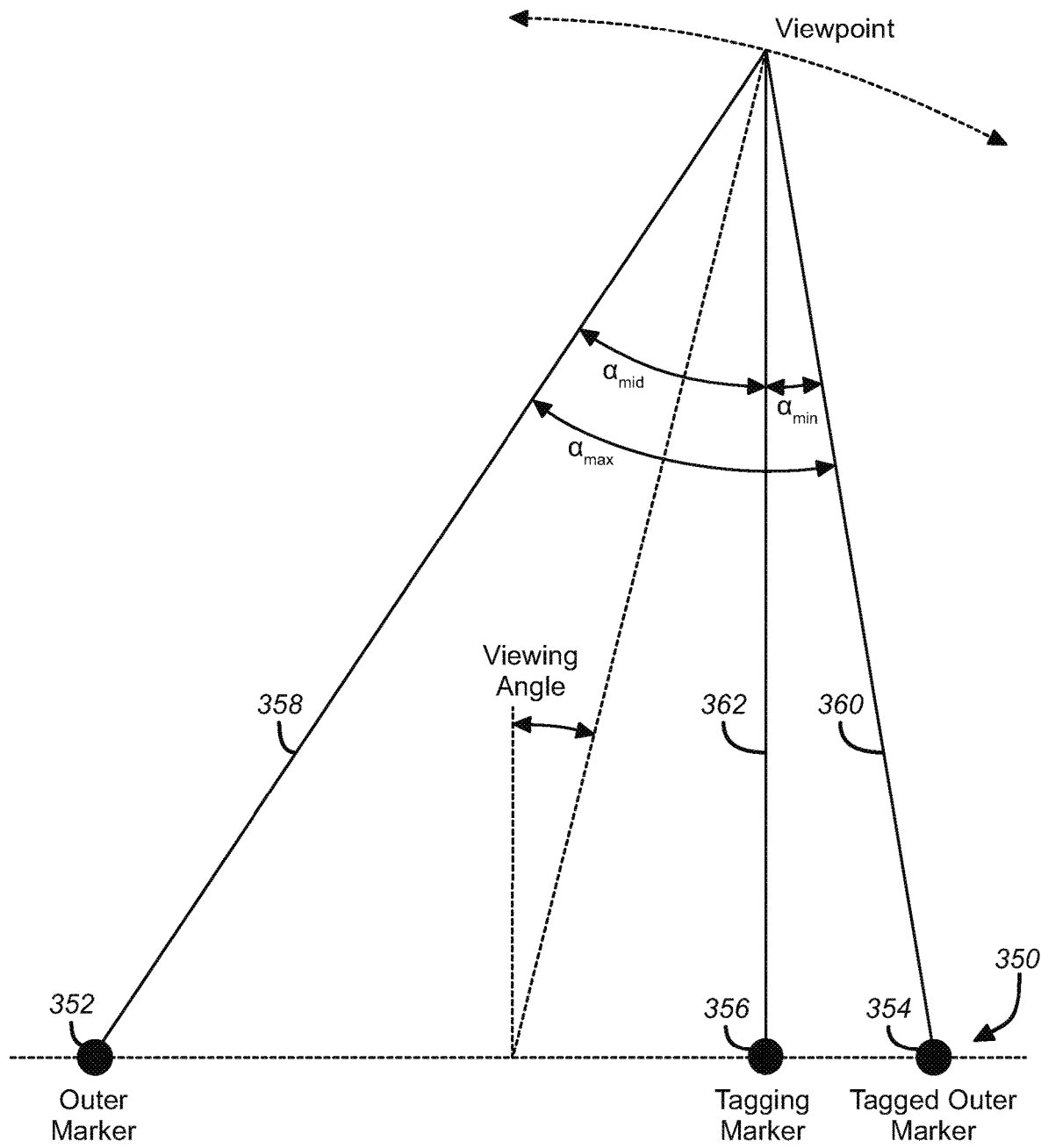
FIG. 14 illustrates an asymmetric collinear marker arrangement that may be disposed on a surgical tracker.

As an example, FIG. 14 illustrates an asymmetric collinear marker arrangement 350 that may be disposed on a tracker 42 in the surgical workspace. Each asymmetric collinear marker arrangement 350 may include two outer markers 352, 354 and a middle marker 356 positioned between the outer markers 352, 354. The middle marker 356 may be positioned nearer to and thus "tag" the outer marker 354. For instance, the middle marker 356 may be positioned at 80% of the distance between the outer markers 352, 354 such that the ratio of the distance between the middle marker 356 and the non-tagged outer marker 352 to the distance between the middle marker 356 and the tagged outer marker 354 is four. As another example, the middle marker 356 may be positioned at 70% of the distance between the outer markers 352, 354 such that the aforementioned ratio (also referred to herein as the "marker ratio") is about 2.3. Comparatively, the middle marker 56 of each symmetric collinear marker arrangement that may be disposed on the trackers 42 may be positioned halfway between the outer markers 56 of the arrangement, and thus not tag either outer marker 56. Accordingly, the marker ratio for the symmetric collinear marker arrangement may be one.

If the blobs of a selected possible blob combination are directly generated by the markers 56 of a collinear marker arrangement, then the relative positions of the blobs in the image may correspond to the marker ratio of the collinear marker arrangement. Specifically, if a selected possible blob combination is directly generated from a collinear marker arrangement of a tracker 42, then each marker 56 of the collinear marker arrangement may be located somewhere on the world lines corresponding to the blobs of the selected possible blob combination. For instance, referring again to FIG. 14, non-tagged outer marker 352 may be located on world line 358, which may correspond to a blob directly generated from non-tagged outer marker 352, tagged outer marker 354 may be located on world line 360, which may correspond to a blob directly generated from outer marker 354, and middle marker 356 may be located on world line 362, which may correspond to a blob directly generated from middle marker 356. Thus, when the blobs of a selected possible blob combination are directly generated from a collinear marker arrangement of a tracker 42, then a ratio of the angles between the world lines associated with the blobs, as determined by the position of the blobs in the image, may be within a threshold distance of the marker ratio of the collinear marker arrangement.

Specifically, like the collinear marker arrangements, each possible blob combination may include two outer blobs and a middle blob based on the relative positions of the blobs in the image. If the blobs of a selected possible blob combination are directly generated from a collinear marker arrangement of a tracker 42, then the ratio of the angle between the world line corresponding to the middle blob and the world line corresponding to one of the outer blobs to the angle between the world line corresponding to the middle blob and the world line corresponding to the other one of the outer blobs (referred to herein as the "blob angle ratio") may be within a threshold distance of the marker ratio of the collinear marker arrangement.

As shown in FIG. 14, the angle between the world line corresponding to the middle blob of a possible blob combination and the world line corresponding to one of the outer blobs may be referred to as "$\alpha_{mid}$," the angle between the world line corresponding to the middle blob and the world line corresponding to the other one of the outer blobs of the possible blob combination may be referred to as "$\alpha_{min}$," and the angle between the world lines corresponding to the outer blobs of the possible blob combination may be referred to as "$\alpha_{max}$." The blob angle ratio for each possible blob combination may be calculated as $\alpha_{mid}/\alpha_{min}$.

Because the marker ratio corresponding to a symmetric collinear marker arrangement of a tracker 42 is one, if $\alpha_{mid}=\alpha_{min}$, then the possible blob combination may have been directly generated from a symmetric collinear marker arrangement. If $\alpha_{mid}$ is not equal to $\alpha_{min}$, then $\alpha_{mid}$ may correspond to the larger angle between the world line corresponding to the middle blob and the world line corresponding to one of the outer blobs, and $\alpha_{min}$ may correspond to the smaller angle between the world line corresponding to the middle blob and the world line corresponding to one of the outer blobs of the blob group combination. In other words, $\alpha_{mid} \geq \alpha_{min}$ for each possible blob combination. The navigation controller 22 may be configured to determine whether a possible blob combination is a candidate for having been generated by a collinear marker arrangement of a tracker 42 based on whether $\alpha_{mid}/\alpha_{min}$ is within a predefined range of blob angle ratios corresponding to the collinear marker arrangements of the trackers 42.

As previously described, the marker ratio for each symmetric collinear marker arrangement in the surgical workspace may be one, and the marker ratio for each asymmetric collinear marker arrangement in the surgical workspace may be greater than one, such as four (e.g., when the middle marker 56 is placed at 80% of the distance between the outer markers 56). In this case, one could conclude that the blob angle ratio of $\alpha_{mid}$ to $\alpha_{min}$ for a possible blob combination must be one or four for the possible blob combination to be a candidate for having been generated by a collinear marker arrangement of a tracker 42. However, the blob angle ratio for a possible blob combination directly generated by one of these collinear marker arrangements may equal one of these values only if the collinear marker arrangement is observed from a distance significantly larger than the distance between the outer markers 56 of the collinear marker arrangement. The nearer the viewpoint gets, the more the blob angle ratio for the possible blob combination may differ from the marker ratio as a function of viewing angle, especially for flat viewing angles.

Figure 15:
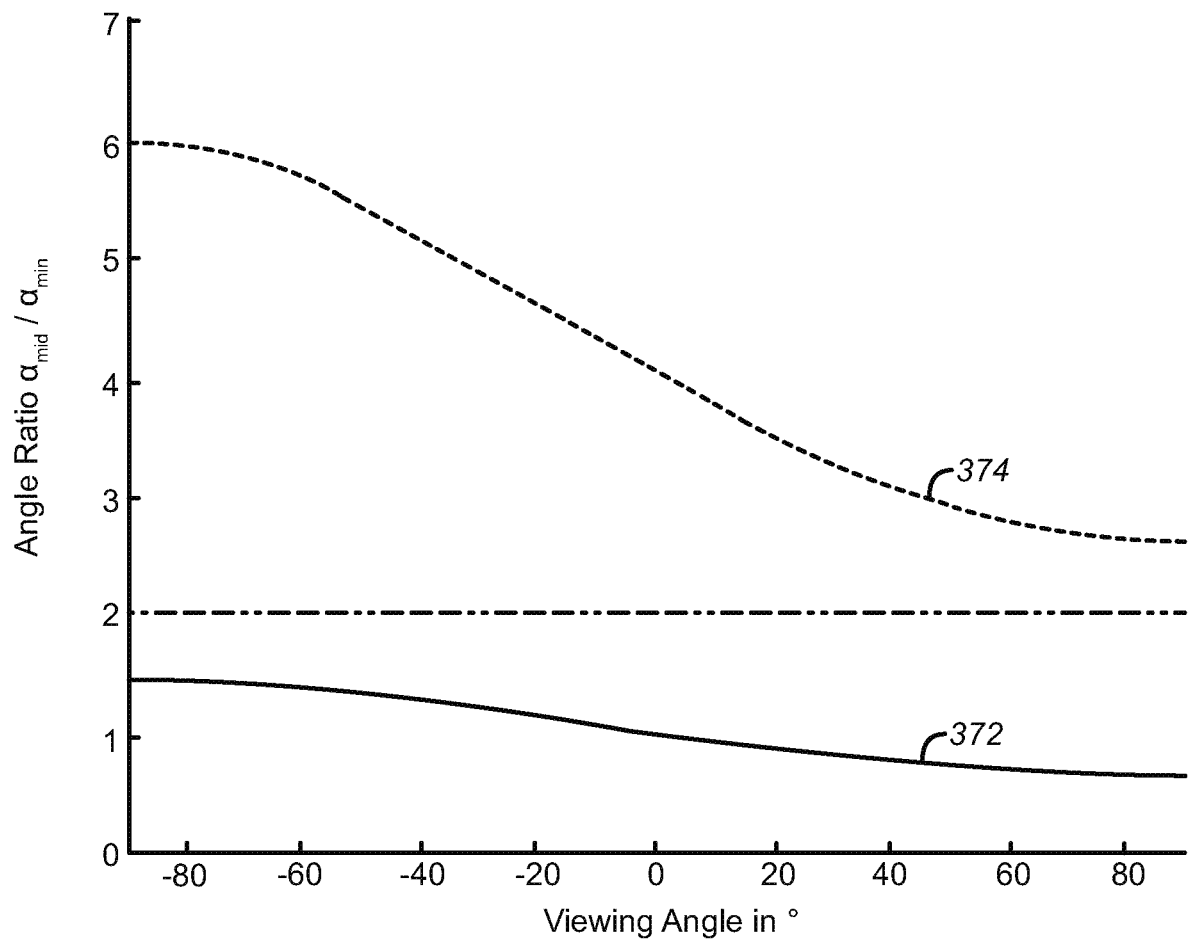
FIG. 15 illustrates predefined ratio ranges for determining whether a blob group is a candidate for having been directly generated by the markers of a tracker.

FIG. 15 is a graph illustrating a range of potential blob angle ratios 372 for a possible blob combination directly generated from a symmetric collinear marker arrangement, and a range of potential blob angle ratios 374 for a blob combination directly generated from an asymmetric collinear marker arrangement having a marker ratio of four, with the distance between the outer markers 56 of each of the symmetric and asymmetric collinear marker arrangements being 80 mm, and the localizer camera 18 being at a viewing distance of 200 mm from the collinear marker arrangements. In the absence of noise, the blob angle ratio 372 for a blob combination directly generated from the symmetric collinear marker arrangement may range from about 0.7 to 1.5 as a function of viewing angle, and the blob angle ratio 374 for a blob combination directly generated from the asymmetric collinear marker arrangement may range from about 2.7 to 6.0 as a function of viewing angle.

The navigation controller 22 may utilize these ranges to eliminate possible blob combinations that coincidently satisfy the collinear criterion (e.g., detectable light sources in the surgical workspace that align coincidentally when the image is generated) but were not generated by a collinear marker arrangement of a tracker 42. Based on FIG. 15, for example, the navigation controller 22 may be configured to determine that a given possible blob combination satisfying the collinear criterion is a candidate for having been generated by an asymmetric collinear marker arrangement of a tracker 42 in the surgical workspace if the blob angle ratio for the possible blob combination is between 2.5 and 6.5. The navigation controller 22 may also be configured to determine that a given possible blob combination satisfying the collinear criterion is a candidate for having been generated by a symmetric marker arrangement of a tracker 42 in the surgical workspace if the blob angle ratio for the possible blob combination is between 0 and 2. By way of comparison, for a same asymmetric collinear marker arrangement design but a viewing distance of 150 mm, the range of potential blob angle ratios for possible blob combinations that may have been directly generated by the asymmetric collinear marker arrangement may be from 2.3 to 6.9. For a same viewing distance but the asymmetric collinear marker arrangement having a marker ratio of 2.3, the range of potential blob angle ratios for possible blob combinations that may have been directly generated by the asymmetric collinear marker arrangement may be from 1.5 to 3.5.

Thus, referring again to FIG. 12, in block 218, the blob angle ratio for the selected possible blob combination may be calculated. In particular, the navigation controller 22 may be configured to determine the world line corresponding to each blob of the possible blob combination based on the position of the blob in the image and the stored calibration data. Thereafter, the navigation controller 22 may be configured to determine the blob angle ratio for the possible blob combination, or more particularly, a ratio of the angle between the world line corresponding to the middle blob of the possible blob combination and the world line corresponding to one of the outer blobs of the possible blob combination to the angle between the world line corresponding to the middle blob of the possible blob combination and the world line corresponding to the other one of the outer blobs of the possible blob combination. If one of these angles is larger than the other angle, then the navigation controller 22 may be configured to divide the larger angle by the lesser angle to calculate the blob angle ratio for the possible blob combination.

In block 220, a determination may be made of whether the calculated blob angle ratio is within one or more predefined blob angle ratio ranges, such as a predefined blob angle ratio range corresponding to asymmetric collinear marker arrangements in the surgical workspace, and a predefined blob angle ratio range corresponding to symmetric collinear marker arrangements in the surgical workspace. Responsive to determining that the blob angle ratio is within a predefined blob angle ratio range ("Yes" branch of block 220), in block 222, the possible blob combination may be set as a candidate blob group for having been directly generated from a collinear marker arrangement of a tracker 42. More specifically, if the blob angle ratio falls within the predefined asymmetric blob angle ratio range, then the navigation controller 22 may be configured to set the possible blob combination as a candidate blob group for having been directly generated from an asymmetric collinear marker arrangement of a tracker 42 in the surgical workspace. If the blob angle ratio falls within the predefined symmetric blob angle ratio range, then the navigation controller 22 may be configured to set the possible blob combination as a candidate blob group for having been directly generated from a symmetric collinear marker arrangement of a tracker 42 in the surgical workspace.

Alternatively, responsive to determining that the blob angle ratio is not within a predefined blob angle ratio range ("No" branch of block 220), in block 216, a determination may be made of whether any possible blob combinations remain to be evaluated. If so, then the process 200 may return to block 204 and select one of the remaining possible blob combinations for evaluation as described above.

Following analysis of all the possible blob combinations, the navigation controller 22 may store a number of identified blob groups that satisfy the collinear criterion and are candidates for having been directly generated by an asymmetric collinear marker arrangement of a tracker 42 in the surgical workspace, and may store a number of identified blob groups that satisfy the collinear criterion and are candidates for having been directly generated by a symmetric collinear marker arrangement of a tracker 42 in the surgical workspace. Because these blob groups may be candidates for multiple trackers 42 in the surgical workspace, relative to a given tracker 42, at least one of the blobs groups may include one or more blobs that were not directly generated by a marker 56 of the given tracker 42, such as blobs directly generated by the markers 56 of another tracker 42 and/or accidental blobs.

Figure 16:
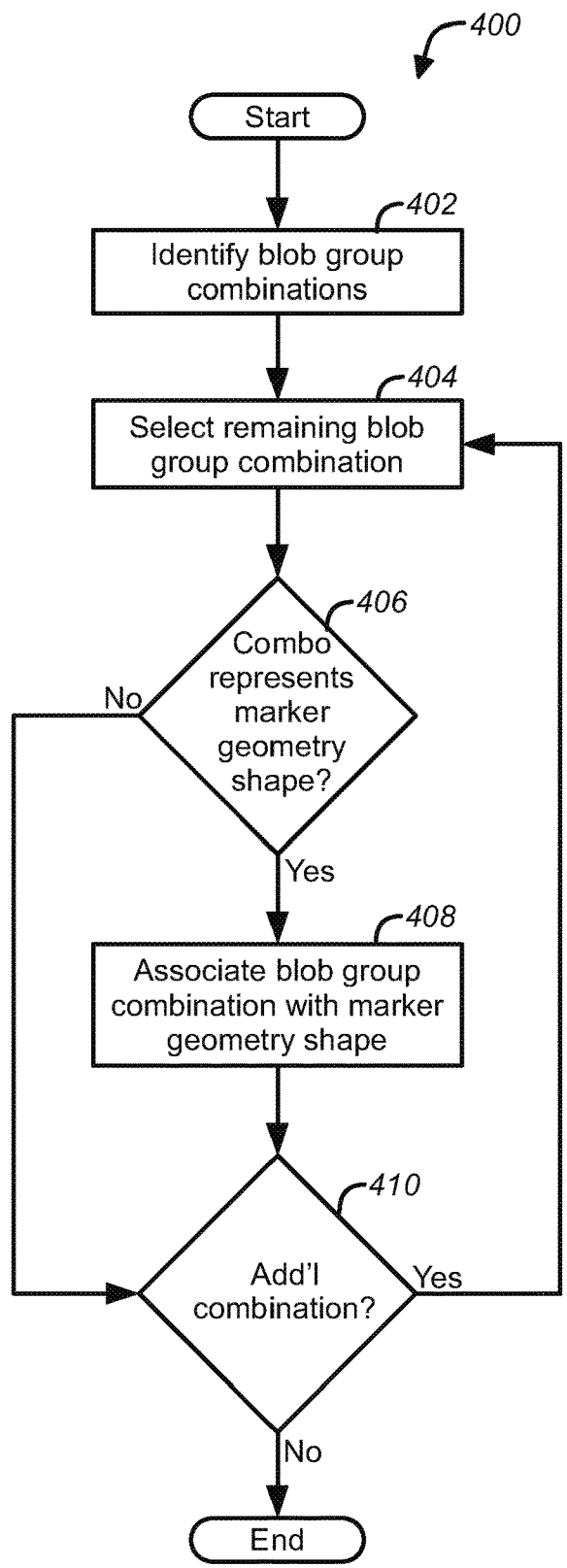
FIG. 16 illustrates a process for differentiating a subset of blobs of an image that directly corresponds to the markers of a surgical tracker from a remainder of blobs in the image.

Referring again to FIG. 9, in block 110, subsets of blobs in the image directly generated from the markers 56 of a same tracker 42 may be differentiated from the remainder of blobs in the image based on the identified candidate blob groups and the predefined marker geometries of the trackers 42 in the surgical workspace. FIG. 16 illustrates a process 400 for making this differentiation. The navigation controller 22, such as via execution of the assignment engine 68 by the processor 24, may be configured to implement the process 400.

In block 402, one or more blob group combinations may be identified. Each blob group combination may include two asymmetric candidate blob groups that share one and only one blob. The shared blob may be an outer blob of each asymmetric candidate blob group. The navigation controller 22 may be configured to determine each blob group combination by selecting one of the asymmetric candidate blob groups, and thereafter identifying another one of the asymmetric candidate blob groups having a same outer blob as the initially selected asymmetric candidate blob group. Because each asymmetric candidate blob group of each blob group combination may satisfy the collinear criterion and share only one outer blob with the other asymmetric candidate blob group of the blob group combination, the two asymmetric blob groups of each blob group combination may represent a corner of a predefined marker geometry of a tracker 42 in the surgical workspace.

The navigation controller 22 may be configured to facilitate efficient identification of the blob group combinations by ordering the blobs of each asymmetric candidate blob group in ascending order according to the blob IDs assigned to the blobs. Each asymmetric candidate blob group may thus be stored so that the blob IDs of the group are listed in the following order: (1) blob ID of the outer blob with the lowest blob ID; (2) blob ID of the middle blob; and (3) blob ID of the outer blob with the larger blob ID. Each asymmetric candidate blob group may also include a fourth entry indicating the blob ID of the outer blob tagged by the middle blob. The navigation controller 22 may determine which outer blob is tagged based on which outer blob corresponds to $\alpha_{min}$ (FIG. 14) as described above. The asymmetric candidate blob groups may then be stored such that they are listed in ascending order based on the first entry of each asymmetric candidate blob group, namely, the blob ID of the outer blob with the lowest blob ID.

This convention enables increased efficiency of the assignment engine 68, as not all possible combinations of asymmetric candidate blob groups need to be checked to find the blob group combinations discussed above. Specifically, let i and j be indices for the first and second asymmetric candidate blob groups of each blob group combination respectively. The indices i and j may each point to an entry in the ordered list of asymmetric candidate blob groups described above. Given M asymmetric candidate blob groups, the navigation controller 22 may iteratively select each of most of the asymmetric candidate blob groups as a possible first entry of a blob group combination by looping i from 0 to M−2. For each selected asymmetric candidate blob group associated with a current value of i, the navigation controller 22 may search for another asymmetric blob group of which the lowest blob ID matches the highest blob ID of the asymmetric candidate blob group associated with the current value of i. Because the blob ID for the second outer blob entry of each asymmetric candidate blob group may be greater than the blob ID for the first outer blob entry of the asymmetric candidate blob group, and the asymmetric candidate blob groups may be listed and stored in ascending order so that the first entry of each candidate blob group increases as the list is traversed from top to bottom, for a current value of i that points to a given asymmetric candidate blob group, the navigation controller 22 may limit j to those asymmetric candidate blob groups that are listed after the given asymmetric candidate blob group of i, namely, i+1 to M−1. Each match that is found may be stored as a blob group combination.

As an example, referring to the image of FIG. 11, the navigation controller 22 may recognize and store at least the following asymmetric candidate blob groups in this order: {B0, B1, B11}, {B0, B4, B6}, {B3, B5, B10}, {B6, B7, B11}, and {B8, B9, B10}. While iterating i, the navigation controller 22 may select the asymmetric candidate blob group {B0, B4, B6} as a possible first entry of a blob group combination. Thereafter, while iterating j to search for an asymmetric candidate blob group in which the lowest blob ID matches the highest blob ID of {B0, B4, B6}, the navigation controller 22 may identify {B6, B7, B11}. The navigation controller 22 may be configured to further verify the combination of the two asymmetric candidate blob groups by checking that the shared outer blob ID is the only shared blob ID between the asymmetric candidate blob groups. The navigation controller 22 may then store the two identified asymmetric candidate blob groups in the order they were selected as a blob group combination: {B0, B4, B6}{B6, B7, B11}.

Once identified, each blob group combination may be evaluated to determine whether the combination corresponds to a shape formed by at least one predefined marker geometry of a tracker 42 in the surgical workspace. Specifically, referring again to FIG. 16, in block 404, a blob group combination remaining to be evaluated may be selected. In block 406, a determination may be made of whether the selected blob group combination represents a portion (e.g., corner) of a shape formed by at least one predefined marker geometry of a tracker 42 in the surgical workspace. This determination may be made by grouping the selected blob group combination with one or more other blobs not included in the blob group combination to form an expanded blob group combination, and determining whether the expanded blob group combination forms a shape of a predefined marker geometry of at least one tracker 42 in the surgical workspace. The operations performed by the navigation controller 22 in block 406 may differ depending on whether the blob subset is associated with the triangle, square, or star shaped predefined marker geometries. Example processes for forming and verifying expanded blob group combinations against the triangle, square, and star shaped predetermined marker geometries are described below.

Responsive to determining that an expanded blob group combination corresponds to a shape formed by at least one predefined marker geometry of a tracker 42 in the surgical workspace ("Yes" branch of block 406), in block 408, the expanded blob group combination may be associated with the shape and considered a subset of blobs differentiated from the other blobs in the image (block 110, FIG. 9). If the surgical workspace includes only one tracker 42 with a predefined marker geometry forming the associated shape, then the navigation controller 22 may be configured to determine that the blobs of the expanded blob group combination were directly generated by the markers 56 of this tracker 42. In cases where the surgical workspace includes multiple trackers 42 having predefined marker geometries forming the associated shape, such as those shown in each of FIGS. 6 through 8, the navigation controller 22 may be configured to determine to which of these trackers 42 the expanded blob group combination directly corresponds based on which outer blobs are tagged in the expanded blob group combination, as described in more detail below.

Responsive to determining that a selected blob group combination does not correspond to a portion of a shape formed by at least one predefined marker geometry of a tracker 42 in the surgical workspace ("No" branch of block 406), or to an expanded blob group combination being associated with a shape (block 408), in block 410, a determination may be made of whether an additional blob group combination remains to be evaluated. If so ("Yes" branch of block 410), then the process 400 may return to block 404 to select and evaluate one of the remaining blob group combinations as described herein.

As an example, when at least one of the trackers 42 includes a triangle shaped predefined marker geometry, such as those shown in FIG. 6, block 406 may include determining whether a selected blob group combination forms part of a triangle. Because each predefined marker geometry of FIG. 6 includes three asymmetric collinear marker arrangements, the navigation controller 22 may be configured to search for another asymmetric candidate blob group that forms a triangle with the asymmetric candidate blob groups of the currently selected blob group combination. In particular, the navigation controller 22 may be configured to loop through all of the remaining asymmetric candidate blob groups for an asymmetric candidate blob group in which the lowest blob ID matches the lowest blob ID of the first asymmetric candidate blob group of the blob group combination, and in which the highest blob ID matches the highest blob ID of the second asymmetric candidate blob group of the blob group combination. Because such an asymmetric candidate blob group could be found anywhere in the list of remaining asymmetric candidate blob groups, the navigation controller 22 may be configured to loop over all the remaining asymmetric candidate blob groups in the list to find the additional candidate blob group for the selected blob group combination.

Responsive to finding an additional asymmetric candidate blob group to add to the selected blob group combination to form an expanded blob group combination using the above methodology, the navigation controller 22 may be configured to verify that the expanded blob group combination represents a triangle by checking that the middle blob of each asymmetric candidate blob group in the expanded blob group combination differs from the blobs of each other asymmetric candidate blob group in the expanded blob group combination. Responsive to identifying an expanded blob group combination that includes three asymmetric candidate blob groups forming a triangle as described above, and optionally, to determining that the middle blob ID of each respective asymmetric candidate blob group of the expanded blob group combination does not match any blob IDs of the other asymmetric candidate blob groups of the expanded blob group combination, the navigation controller 22 may be configured to determine that the expanded blob group was directly generated by the markers 56 of a tracker 42 in the surgical workspace having a predefined marker geometry forming a triangle ("Yes" branch of block 406).

Applying the process 400 to the image illustrated in FIG. 11 to differentiate a subset of blobs directly generated by the markers 56 of the triangle shaped tracker 42D illustrated in FIG. 10, in blocks 402 and 404, the navigation controller 22 may identify and select a blob group combination including the asymmetric candidate blob groups {B0, B4, B6} and {B6, B7, B11} in that order. In block 406, the navigation controller 22 may determine whether this blob group combination forms a portion of a triangle shaped predefined marker geometry by looping through the remaining asymmetric candidate blob groups to identify an asymmetric candidate blob group of which the largest blob ID matches the largest blob ID of the blob group combination, namely B11, and for which the lowest blob ID matches the lowest blob ID of the blob group combination, namely B0. In this case, the navigation controller 22 may identify the asymmetric candidate blob group of {B0, B1, B11}.

The navigation controller 22 may then add this identified asymmetric candidate blob group to the blob group combination to form an expanded blob group combination, and may check whether the middle blob ID of each asymmetric candidate blob group in the expanded blob group combination differs from the blob IDs of the other asymmetric candidate blob groups in the expanded blob group combination. If so ("Yes" branch of block 406), then in block 408, the navigation controller 22 may associate the expanded blob group combination with the triangle shape. If there is only a single tracker 42 in the surgical workspace having a predefined marker geometry forming a triangle, then the navigation controller 22 may determine that the expanded blob combination was directly generated by the markers 56 of that tracker 42. If there are multiple trackers 42 in the surgical workspace having a predefined marker geometry forming a triangle, then the navigation controller 22 may be configured to determine to which of these trackers 42 that the expanded blob group combination directly corresponds based on which outer blobs are tagged in the expanded blob group combination, as described in more detail below.

Some of the operations performed in the process 400 for the triangle shaped predefined marker geometries may differ from the operations performed for the square shaped predefined marker geometries. Specifically, to determine whether a selected blob group combination represents a portion of a square shaped predefined marker geometry, such as those illustrated in FIG. 7, in block 406, the navigation controller 22 may determine if the image includes an additional blob that is positioned in an approximately correct location relative to the shared outer blob of the blob group combination (e.g., diagonal from the shared outer blob). The navigation controller 22 may be configured to make this determination based on the world line associated with each outer blob of the blob group combination and the world line associated with a given candidate for the additional blob, as described in more detail below. Each of the blobs that are not included in the blob group combination may be considered as a candidate for the additional blob.

Thus, the navigation controller 22 may be configured to select through each of the blobs in the image that are not included in the selected blob group combination as candidates for the additional blob. The currently selected blob group combination and additional blob candidate may be combined to form an expanded blob group combination. For each expanded blob group combination being evaluated, the navigation controller 22 may be configured to the store the non-shared outer blob of the first asymmetric candidate blob group of the expanded blob group combination as $p_{id}$, the middle blob of the first asymmetric candidate blob group as $m_1$, the shared outer blob as $q_{id}$, the middle blob of the second asymmetric candidate blob group of the expanded blob group combination as $m_2$, the non-shared outer blob of the second asymmetric candidate blob group as $r_{id}$, and the candidate blob of the expanded blob group combination as $s_{id}$. Hence, if the currently considered expanded blob group combination corresponds to a square shaped predefined marker geometry, then the blob order $p_{id}$, $m_1$, $q_{id}$ $m_2$, $r_{id}$, $s_{id}$ may correspond to moving around the square from the shared outer blob $p_{id}$ in either the clockwise or counterclockwise direction.

To determine whether a given expanded blob group combination is viable to correspond to a square shaped predefined marker geometry, the navigation controller 22 may be configured conduct a handedness check for the expanded blob group combination. More particularly, the navigation controller 22 may be configured to determine a handedness for each of the four triangles that would be formed by a blob in the center of the square proposed by the expanded blob group combination and a pair of blobs representing adjacent corners of the proposed square. If the handedness of each such triangle is the same, then the expanded blob group may be viable to correspond to a square shaped predefined marker geometry.

In general, if the blobs forming a shape are ordered to represent movement around the perimeter of the shape in one direction, the handedness of the blob order may indicate whether the blob order corresponds to movement around the shape in the clockwise or counterclockwise direction. Assuming the localizer camera 18 observes the markers 56 of each tracker 42 from the front of the tracker 42, the handedness for a given blob order may be determined based on viewing direction vectors for at least three blobs of the blobs order, such as at least three blobs corresponding to corners of the represented shape (referred to herein as "corner blobs"), from the viewpoint of the localizer camera 18. In particular, the navigation controller 22 may be configured to identify the viewing direction vectors for at least three corners blobs of the blob order, insert the viewing direction vectors into a matrix according to the blob order, and calculate a determinant of the matrix. If the determinant is positive, then the blob order may correspond to traversing the shape in the clockwise direction. If the determinant is negative, then the blob order may correspond to traversing the shape in the counterclockwise direction.

If the expanded blob group combination currently under consideration is viable to correspond to a square shaped predefined marker geometry, and the blobs of each blob set forming one of the aforementioned triangles of the square are ordered to correspond to movement around the respective triangle in a same direction relative to the square, then the handedness of each blob set forming one the triangles should be same. In other words, the handedness for each blob set forming one of the triangles should indicate that the order of the blobs in the blob set represents movement around the triangle in the clockwise direction, or the handedness determined for each blob set forming one of the triangles should indicate that the order of the blobs in the blob set represents movement around the triangle in the counterclockwise direction.

Figure 17:
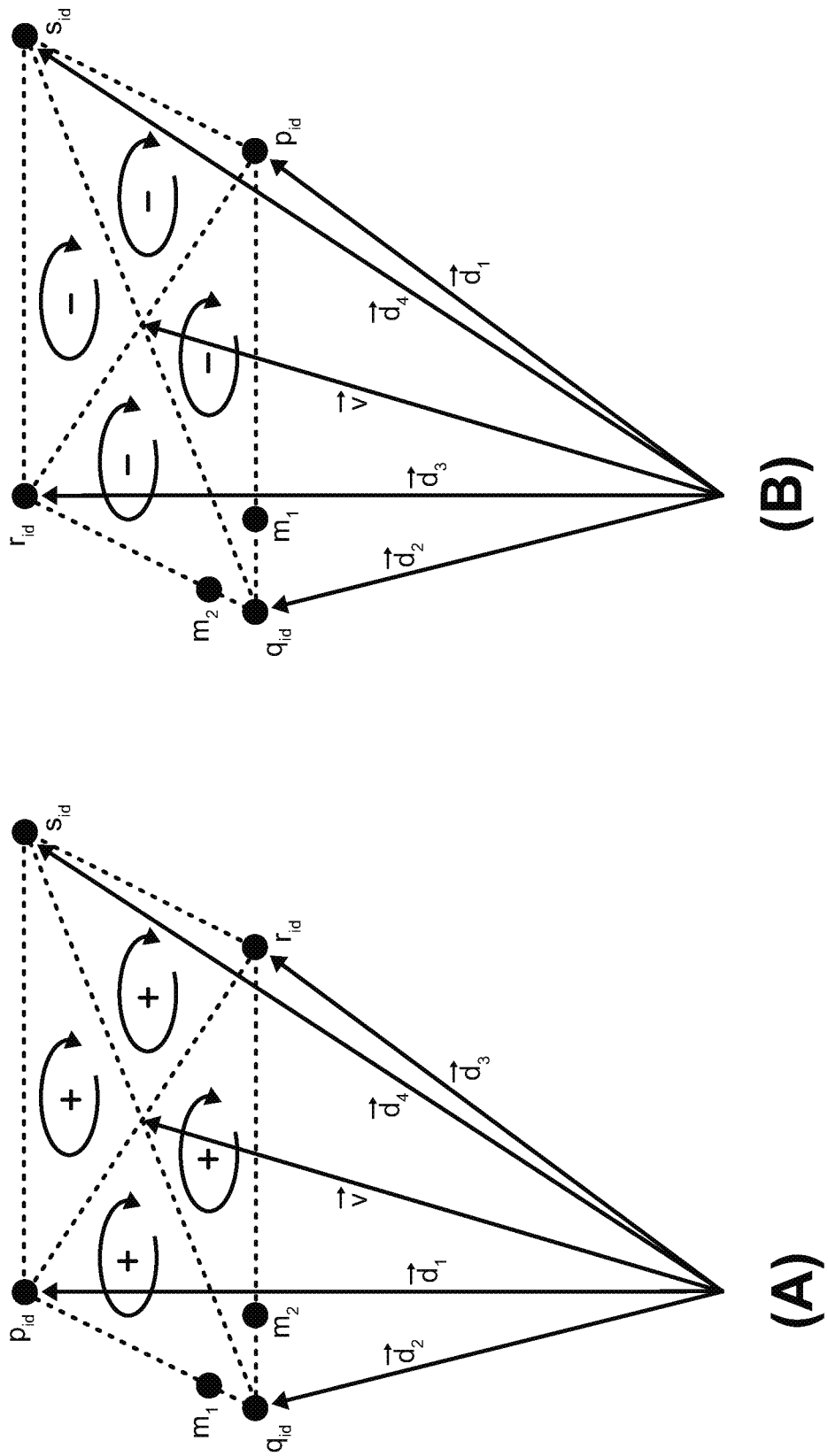
FIG. 17 illustrates blob group combinations each corresponding to a square shaped predefined marker geometry.

The navigation controller 22 may thus be configured to determine whether an expanded blob group combination corresponds to a square shaped predefined marker geometry by identifying viewing direction vectors $\vec{d}_1$, $\vec{d}_2$, $\vec{d}_3$, $\vec{d}_4$ corresponding to the corner blobs of the square proposed by the expanded blob group combination, namely $p_{id}$, $q_{id}$, $r_{id}$, and $s_{id}$ respectively. The navigation controller 22 may then calculate a mean vector $\vec{v}$ from the viewing direction vectors $\vec{d}_1$, $\vec{d}_2$, $\vec{d}_3$, $\vec{d}_4$, which may correspond to a central blob of the proposed square if one were present. FIG. 17 illustrates mean vectors $\vec{v}$ that may be calculated from the identified viewing direction vectors $\vec{d}_1$, $\vec{d}_2$, $\vec{d}_3$, $\vec{d}_4$ to perform the handedness check.

Thereafter, the navigation controller 22 may define matrices each listing the vectors corresponding to a different one the aforementioned triangles. For example, each matrix may list the mean vector $\vec{v}$ and two of the identified viewing direction vectors $\vec{d}_1$, $\vec{d}_2$, $\vec{d}_3$, $\vec{d}_4$ that correspond to corner blobs representing adjacent corners of the square proposed by the expanded blob group combination. The vectors of each matrix may be ordered to correspond to moving around the triangle represented by the matrix in a same direction relative to the proposed square. For instance, assuming the blob order $p_{id}$, $m_1$, $q_{id}$ $m_2$, $r_{id}$, $s_{id}$ represents movement around the proposed square in one direction, each matrix for a given triangle may start with the mean vector $\vec{v}$ and be followed by the pair of viewing direction vectors corresponding to the blobs forming the given triangle in accordance with this blob order. In other words, one matrix may list $\vec{v}$ followed by $\vec{d}_1$ (which may correspond to $p_{id}$) and then $\vec{d}_2$ (which may correspond to $q_{id}$); another matrix may list $\vec{v}$ followed by $\vec{d}_2$ (which may correspond to $q_{id}$) and then $\vec{d}_3$ (which may correspond to $r_{id}$); another matrix may list v followed by $\vec{d}_3$ (which may correspond to $r_{id}$) and then $\vec{d}_4$ (which may correspond to $s_{id}$); and another matrix may list v followed by $\vec{d}_4$ (which may correspond to $s_{id}$) and then $\vec{d}_1$ (which may correspond to $p_{id}$).

The navigation controller 22 may then calculate the determinant of each matrix. Thus, the navigation controller 22 may calculate the following four determinants:

$$D_{12}=\det(\vec{v}\,\vec{d}_1\vec{d}_2) \quad D_{23}=\det(\vec{v}\,\vec{d}_2\vec{d}_3)$$

$$D_{34}=\det(\vec{v}\,\vec{d}_3\vec{d}_4) \quad D_{41}=\det(\vec{v}\,\vec{d}_4\vec{d}_1)$$

The navigation controller 22 may be configured to determine whether the expanded blob group combination is viable to represent a square predefined marker geometry based on the sign of these determinants. As previously described, if the expanded blob group combination is viable, then the sign of each determinant may be the same. Hence, responsive to the sign of each of the above determinants being the same, the navigation controller 22 may be configured to determine that the expanded blob group is viable to represent a square predefined marker geometry.

Assuming the sign of each of the above determinants is the same, the sign of each determinant may also indicate a handedness for the expanded blob group combination. In particular, if the blobs of the expanded blob group combination are ordered to correspond to movement around the square represented by the expanded blob group combination in a same direction as the direction represented by the order of the blobs in the blob sets forming the triangles (e.g., $p_{id}$, $m_1$, $q_{id}$ $m_2$, $r_{id}$, $s_{id}$), then the direction indicated by the handedness for each blob set forming a triangle may be the direction represented by the order of blobs in the expanded blob group combination. In other words, if the sign of each determinant is negative, then the order of blobs in the expanded blob group combination may represent movement around the proposed square in the counterclockwise direction. Alternatively, if the sign of each determinant is positive, then the order of the blobs in the expanded blob group combination may represent movement around the proposed square in the clockwise direction. Thus, responsive to the sign of each of the above determinants being the same, the navigation controller 22 may be configured to store data indicating the handedness for the extended blob group combination, such as by storing the sign of the determinants, for later assigning the blobs of the expanded blob group combination to the markers 56 of a surgical tracker 42, as described in more detail below.

Responsive to the sign of the determinants being the same, the navigation controller 22 may be configured to perform additional tests on the expanded blob group combination to determine if the combination corresponds to a square predefined marker geometry of a tracker 42 in the surgical workspace. For instance, the navigation controller 22 may be configured to determine whether the candidate for the additional blob in the expanded blob group combination is in approximately the right location relative to the other blobs of the expanded blob group combination by calculating an expected viewing direction vector $\vec{d}_{exp}$ for the additional blob relative to the other blobs of the expanded blob group combination, such as by mirroring the viewing direction vector for the shared outer marker ($\vec{d}_2$) over the mean viewing direction vector $\vec{v}$. For example, the navigation controller 22 may solve the following equations:

$$q=\hat{d}_2^T \cdot \hat{v}$$

$$\vec{\alpha}=\hat{d}_2 \times \hat{v}$$

where q is the cosine of the angle between $\vec{d}_2$ and $\hat{v}$, and $\vec{\alpha}$ is a vector orthogonal to the plane defined by $\vec{d}_2$ and $\vec{v}$. The navigation controller 22 may then calculate the expected viewing direction vector $\vec{d}_{exp}$ based on the mean direction vector $\vec{v}$, q, and $\vec{\alpha}$. Specifically, the navigation controller 22 may be configured to compute the angle between $\vec{d}_2$ and $\hat{v}$ by taking the arccosine of q, and may then calculate a rotation matrix R that when applied to $\hat{v}$ mirrors $\vec{d}_2$ over $\hat{v}$ based on the angle and $\vec{\alpha}$. Finally, the navigation controller 22 may calculate the expected direction vector $\vec{d}_{exp}$ by solving the following formula:

$$\hat{d}_{exp}=R \cdot \hat{v}$$

The navigation controller 22 may then be configured to compare the expected viewing direction vector $\hat{d}_{exp}$ to the viewing direction vector $\vec{d}_4$ corresponding to the currently selected candidate additional blob to determine whether the candidate additional blob is in the right position. In particular, the navigation controller 22 may calculate the following:

$$p=\hat{d}_4^T \cdot \hat{d}_{exp}$$

where p represents the cosine of the angle between $\hat{d}_4^T$ and $\hat{d}_{exp}$. Thus, the arccosine of p may indicate the angle between the expected viewing direction vector $\hat{d}_{exp}$ and the viewing direction vector $\vec{d}_4$. Responsive to this angle being less than a defined threshold (e.g., 1.5°), the currently considered candidate additional blob may be accepted, and the navigation controller 22 may be configured to determine that the expanded blob group combination was directly generated by a predefined marker geometry of a tracker 42 in the surgical workspace forming a square ("Yes" branch of block 406).

Responsive to the navigation controller 22 determining that the expanded blob group combination was directly generated by a predefined marker geometry of a tracker 42 in the surgical workspace forming a square ("Yes" branch of block 406), in block 408, the navigation controller 22 may associate this expanded blob group combination with the square shape. If there is only a single tracker 42 in the surgical workspace having a predefined marker geometry forming a square, then the navigation controller 22 may determine that the extended blob group combination was directly generated by the markers 56 of that tracker 42. If there are multiple trackers 42 in the surgical workspace having a predefined marker geometry forming a square, then the navigation controller 22 may be configured to determine which of these trackers 42 the expanded blob group combination corresponds based on which outer blobs are tagged in the expanded blob group combination, as described in more detail below.

The operations performed in the process 400 for the star predefined marker geometry may differ from the operations performed for the square and triangle predefined marker geometries. As shown in FIG. 8, unlike the square and triangle predefined marker geometries, the predefined marker geometries forming a star may each include two symmetric collinear marker arrangements in addition to two asymmetric collinear marker arrangements. The two symmetric collinear marker arrangements of each star shaped predefined marker geometry may form the 'X' of the geometry, and may therefore only share a middle marker 56. Accordingly, in block 402 of the process 400, to distinguish a subset of blobs directly generated by the markers 56 of a tracker 42 having a square shaped predefined tracker geometry, in addition to determining the asymmetric blob group combinations discussed above, the navigation controller 22 may identify symmetric blob group combinations. Each identified symmetric blob group combination may include two symmetric candidate blob groups selected such that they share only a middle blob. Each outer blob of each symmetric candidate blob group of an identified symmetric blob group combination may differ from the outer blobs of the other symmetric candidate blob group in the combination. The symmetric candidate blob groups of each symmetric blob group combination may thus represent two intersecting lines. The navigation controller 22 may order the symmetric candidate blob groups similar to how the asymmetric candidate blob groups are ordered as described above prior to identifying the symmetric blob group combinations.

Figure 18:
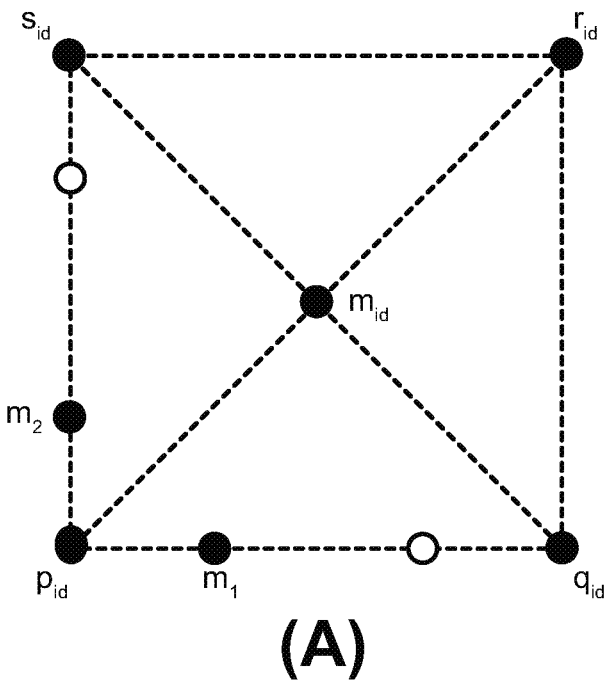
FIG. 18 illustrates blob group combinations each corresponding to a star shaped predefined marker geometry.
Figure 18:
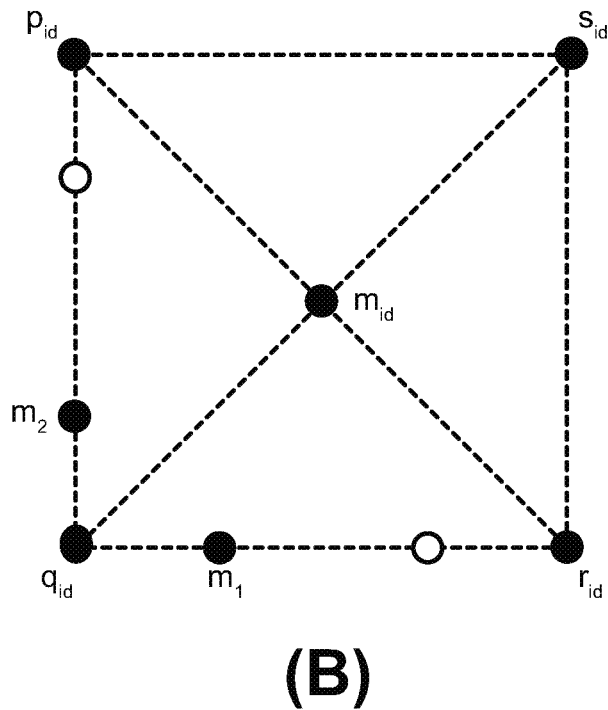

In block 404, relative to distinguishing blobs corresponding to the star shaped predefined marker geometries, the navigation controller 22 may select one of the identified symmetric blob group combinations including two symmetric candidate blob groups. Thereafter, in block 406, the navigation controller 22 may be configured to determine whether the selected symmetric blob group combination represents a portion of a star shaped predefined marker geometry of a tracker 42 in the surgical workspace by storing each blob of the symmetric blob group combination as follows:

$p_{id}$=outer blob of first symmetric blob group with smaller ID $q_{id}$=outer blob of second symmetric blob group with smaller ID $r_{id}$=outer blob of first symmetric blob group with larger ID $s_{id}$=outer blob of second symmetric blob group with larger ID $m_{id}$=ID of shared middle marker The containers $p_{id}$, $q_{id}$, $r_{id}$, and $s_{id}$ (in this order) may thus define blob IDs potentially corresponding to corner markers 56 of a star shaped predefined marker geometry in clockwise or counterclockwise order, and $m_{id}$ may define a blob ID potentially corresponding to a middle marker 56 of a star shaped predefined marker geometry. FIG. 18 illustrates blobs of symmetric blob group combinations labeled using the above notation.

Thereafter, the navigation controller 22 may loop through the asymmetric candidate blob groups determined above to identify an asymmetric candidate blob group that connects two outer blobs of the currently selected symmetric blob group combination, which potentially correspond to adjacent corner markers 56 of a star shaped predefined marker geometry. Specifically, each star shaped predefined marker geometry shown in FIG. 8 may include two asymmetric collinear marker arrangements forming sides of the star shaped predefined marker geometry. The navigation controller 22 may thus search for an asymmetric candidate blob group that connects an outer blob of one of the symmetric candidate blob groups of the currently selected blob group combination to an outer blob of the other symmetric candidate blob group of the currently selected symmetric blob group combination. In other words, the navigation controller 22 may search for an asymmetric candidate blob group that connects $p_{id}$ and $q_{id}$, $q_{id}$ and $r_{id}$, $r_{id}$ and $s_{id}$, or $s_{id}$ and $p_{id}$.

Responsive to identifying such an asymmetric candidate blob group, the navigation controller 22 may loop through the remaining asymmetric candidate blob groups to identify another asymmetric candidate blob group that shares one of the outer blobs of the first asymmetric candidate blob group, and connects this outer blob to another outer blob of the currently selected symmetric blob group combination. Specifically, for each star shaped predefined marker geometry illustrated in FIG. 8, the asymmetric collinear marker arrangements may share one outer marker 56 and no other markers 56, and each asymmetric collinear marker arrangement may connect an outer marker 56 of one of the symmetric collinear marker arrangements to an outer marker 56 of the other symmetric collinear marker arrangement. Accordingly, responsive to identifying the first asymmetric candidate blob group, the navigation controller 22 may search for another asymmetric candidate blob group that connects an outer blob of the first asymmetric candidate blob group and of one of the symmetric candidate blob groups of the currently selected symmetric blob group combination to an outer blob of the other one of the symmetric candidate blob groups of the currently selected symmetric blob group combination. As an example, if the first asymmetric candidate blob group connects $p_{id}$ and $q_{id}$, then the navigation controller 22 may search for another asymmetric candidate blob group that connects either $p_{id}$ to $s_{id}$ (e.g., FIG. 18A) or $q_{id}$ to $r_{id}$ (e.g., FIG. 18B).

Responsive to identifying such an additional asymmetric candidate blob group, the navigation controller 22 may determine that the expanded blob group combination including the selected symmetric blob group combination and the identified asymmetric candidate blob groups was directly generated by a predefined marker geometry of a tracker 42 in the surgical workspace forming a star ("Yes" branch of block 406). Responsive to the navigation controller 22 determining that the expanded blob group combination was directly generated by a predefined marker geometry of a tracker 42 in the surgical workspace forming a star ("Yes" branch of block 406), in block 408, the navigation controller 22 may associate this expanded blob group combination with the star shape. If there is only a single tracker 42 in the surgical workspace having a predefined marker geometry forming a star, then the navigation controller 22 may determine that the expanded blob group combination was directly generated by the markers 56 of that tracker 42. If there are multiple trackers 42 in the surgical workspace having a predefined marker geometry forming a star, then the navigation controller 22 may be configured to determine to which of these trackers 42 the expanded blob group combination corresponds based on which outer blobs are tagged in the expanded blob group combination, as described in more detail below.

Referring again to the process 100 of FIG. 9, in block 112, the differentiated blob subsets, each which may include a different one of the expanded blob group combinations associated with a shape formed by the predefined marker geometry of at least one tracker 42 in the surgical workspace, may be assigned to one of the trackers 42 in the surgical workspace that includes the predefined marker geometry forming the shape. If only one tracker 42 in the surgical workspace includes a predefined marker geometry forming the shape associated with a given blob subset, the navigation controller 22 may be configured to assign the blob subset to the markers 56 of that tracker. However, if multiple trackers 42 in the surgical workspace include a predefined marker geometry forming the shape associated with a given blob subset, then the navigation controller 22 may be configured to determine to which of these multiple trackers 42 the blob subset corresponds, such as based on which blobs are tagged in the blob subset.

Figure 19:
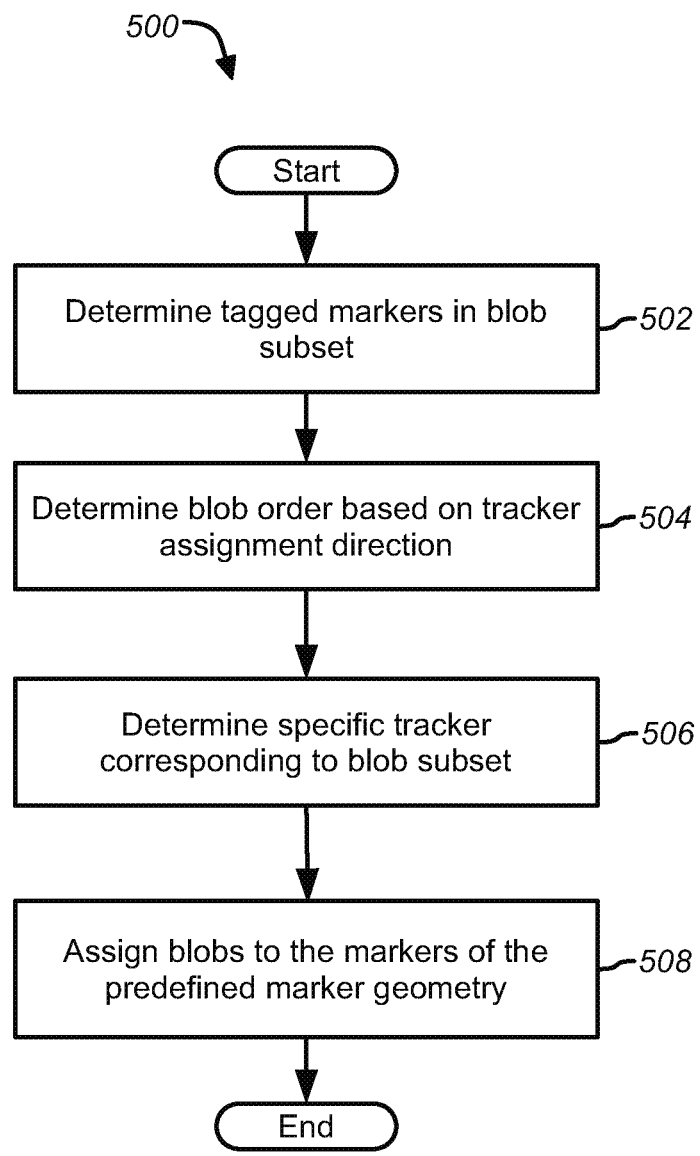
FIG. 19 illustrates a process for assigning a subset of blobs to the markers of a surgical tracker.

FIG. 19 illustrates a process 500 that may be performed in block 112 of FIG. 9 to assign a given blob subset to the markers 56 of a tracker 42 in the surgical workspace. The navigation controller 22 may be configured, such as upon execution of the assignment engine 68, to implement the process 500 for each differentiated blob subset. The operations performed by the navigation controller 22 in the blocks of the process 500 may differ depending on whether the blob subset is associated with the triangle, square, or star shaped predefined marker geometry.

In block 502, the tagged blobs of the blob subset may be determined. As previously described, a surgical workspace may include multiple trackers 42 each including a different predefined marker geometry forming a same shape. Different markers 56 may be tagged in the predefined marker geometries of these trackers 42 to distinguish therebetween. Accordingly, when a blob subset has been determined to correspond to a predefined marker geometry shape encompassed by multiple trackers 42, the navigation controller 22 may be configured to determine which blobs of the blob subset are tagged to determine which of the multiple trackers 42 that the blob subset corresponds.

As previously described, each blob subset may include at least two asymmetric candidate blob groups that correspond to asymmetric collinear marker arrangements on a tracker 42. The navigation controller 22 may be configured to determine which outer blob of each asymmetric candidate blob group is tagged based on the position of the middle blob of the asymmetric candidate blob group relative to the outer blobs of the asymmetric candidate blob group from a viewpoint of the localizer camera 18. Specifically, for each asymmetric candidate blob group in the blob subset, the navigation controller 22 may be configured to determine the world line corresponding to each blob in the asymmetric candidate blob group based on the position of the blob in the image. The navigation controller 22 may then be configured to determine the angle between the world line corresponding to the middle blob and the world line correspond to one outer blob, and the angle between the world line corresponding to the middle blob and the world line corresponding to the other outer blob. The navigation controller 22 may thereafter be configured to determine that the outer blob corresponding to the smaller angle is the tagged outer blob of the asymmetric candidate blob group.

In some examples, the tagged blobs may be determined during the asymmetric candidate blob group discovery process described above in reference to block 108 of FIG. 9. In particular, when the asymmetric candidate blob groups are identified from an image and stored, each asymmetric candidate blob group entry may be assigned a fourth value that indicates the blob ID of the tagged outer blob of the asymmetric candidate blob group. Thus, the navigation controller 22 may be configured to determine the tagged outer blob of each asymmetric candidate blob group in the blob subset by looking up the fourth value of the asymmetric candidate blob group.

In block 504, the blobs of the blob subset may be ordered, such as according to the predefined marker order direction of the markers 56 of the trackers 42, which may be used by the navigation controller 22 to match the blobs of the blob subset to the markers 56 of a tracker 42 in the surgical workspace. As previously described, the markers 56 of each predefined marker geometry may be ordered starting at a master marker 56 and proceeding according to a predefined marker order direction, such as counterclockwise. When considering which of multiple trackers 42 including a predefined marker geometry forming a same shape that a given blob subset associated with the shape should be assigned, the navigation controller 22 may be configured to compare the tagged blobs of the blob subset to the tagged markers 56 of each predefined marker geometry forming the shape in accordance with the order of the blobs in the subset and the predefined marker order direction. Similarly, responsive to determining that a blob subset directly corresponds to a particular tracker 42, the navigation controller 22 may be configured to assign the blobs of the blob subset to this tracker 42 based on the order of the blobs in the subset and according to the predefined marker order direction. In particular, the navigation controller 22 may be configured to assign a first blob of the blob subset to the master marker 56 of the predefined marker geometry of the tracker 42, and then proceed to iteratively assign the remaining blobs of the blob subset to the remaining markers 56 of the predefined marker geometry in a counterclockwise direction.

As a result of the above methodologies, the blobs of the subset may be ordered such that the first blob in the order corresponds to the master marker 56 of each predefined marker geometry in the surgical workspace forming the shape associated with the subset, and the remaining blobs following the first blob may be ordered to correspond to the predefined marker order direction of the predefined marker geometries. If the direction represented by the order of the blobs in the blob subset differs from the predefined marker order direction that is used by the navigation controller 22, then the blob subset may be assigned to the wrong tracker 42, or the blobs of the blob subset may be assigned to the wrong markers 56 of the right tracker 42. Either of these cases may result in navigation errors.

Thus, prior to assignment, the blobs of each blob subset may be ordered so that the first blob in the subset corresponds to the master marker 56 of each predefined marker geometry in the surgical workspace forming the shape associated with the subset. To this end, each predefined marker geometry in the surgical workspace may include a marker 56 that is designated as the master marker 56, which may be associated with uniquely identifiable qualities within the predefined marker geometry. Each predefined marker geometry in the surgical workspace that forms a same shape may also designate the same marker 56 as the master marker 56.

For instance, referring to the triangle shaped predefined marker geometries shown in FIG. 6, the marker 56 designated as the master marker 56 in each geometry may be T1, which is doubly tagged in each triangle shaped predefined marker geometry (e.g., tagged by two asymmetric collinear marker arrangements in the predefined marker geometry). Hence, for a given blob subset associated with the triangle shape, the navigation controller 22 may select the blob of the blob subset that is doubly tagged according to the positions of the blobs in the image as the first blob of the blob subset. The navigation controller 22 may then append the remaining blobs of the blob subset to the first blob in an order that corresponds to movement around the triangle represented by the blob subset according to the predefined marker order direction (e.g., counterclockwise).

Referring to the example of FIG. 11, for a blob subset determined to correspond to a triangle predefined marker geometry, namely {B0, B4, B6, B7, B11, B1}, the navigation controller 22 may determine that B0 is the doubly tagged blob (tagged both by B1 and B4), and may thus set B0 as the first blob of the blob subset. The navigation controller 22 may then append the remaining blobs of the blob subset to the first blob in an order corresponding to movement around the triangle represented by the blob subset in a direction corresponding to the predefined marker order direction, as described in more detail below.

Referring to the square shaped predefined marker geometries illustrated in FIG. 7, the marker 56 of each square shaped predefined marker geometry designated as the master marker 56 may be the marker 56 shared by the two asymmetric collinear marker arrangements in the predefined marker geometries, namely, S1. Hence, for a given blob subset associated with a square shaped predefined marker geometry, the navigation controller 22 may be configured to select the blob of the blob subset that is shared by the two asymmetric candidate blob groups of the blob subset, which may have been previously stored as $q_{id}$ as described above, as the first blob listed in the subset. The navigation controller 22 may then append the remaining blobs of the blob subset to the first blob in an order corresponding to movement around the square represented by the blob subset in a direction corresponding to the predefined marker order direction, as described in more detail below.

Referring to the star shaped predefined marker geometries illustrated in FIG. 8, the marker 56 of each star shaped predefined marker geometry designated as the master marker 56 may again be the marker 56 shared by the two asymmetric collinear marker arrangements in the predefined marker geometries, namely, X1. Hence, for a given blob subset associated with a star shaped predefined marker geometry, the navigation controller 22 may select the blob of the blob subset that is shared by the two asymmetric candidate blob groups of the blob subset as the first blob listed in the subset. The navigation controller 22 may then append the remaining blobs of the blob subset (other than the shared middle marker $m_{id}$, which may always be last in the blob order for a star shaped predefined marker geometry) to the first blob in an order corresponding to movement around the outside of the star represented by the blob subset in a direction corresponding to the predefined marker order direction, as described in more detail below.

Responsive to determining a first blob for a given blob subset, the navigation controller 22 may be configured to determine the order for the remaining blobs of the subset that corresponds to the predefined marker order direction by defining a proposed order for the blobs of the subset that travels around the shape represented by the blob subset in one direction, such as from the first blob for the given blob subset. The navigation controller 22 may be configured to form the proposed blob order based on knowledge of the predefined marker geometries in the surgical workspace forming the shape associated with the blob subset, the shared outer blob or blobs of each asymmetric candidate blob group within the subset, and by maintaining the adjacency of the blobs of each asymmetric candidate blob group of the subset within the proposed order.

The navigation controller 22 may then be configured to determine the handedness of the proposed blob order from the viewpoint of the localizer camera 18, such as based on the viewing direction vectors for one or more of the blobs of the proposed order. As described above, because it is assumed that the localizer camera 18 observes the front of the trackers 42, the navigation controller 22 may be configured to determine whether the proposed order corresponds to a clockwise or counterclockwise direction around the shape represented by the blob subset from the viewpoint of the localizer camera 18 based on the viewing direction vectors for one or more blobs of the proposed order. For instance, the navigation controller 22 may be configured to determine whether the proposed order corresponds to a clockwise or counterclockwise direction around the shape represented by the blob subset based on the viewing direction vectors for three or more corner blobs of the blob subset, that is, blobs corresponding to corners of the shape represented by the blob subset. The viewing direction vectors for the corner blobs may be determined based on the position of the corner blobs in the image as described above.

The navigation controller 22 may be configured to determine the handedness of the proposed order based on the identified viewing direction vectors by generating at least one matrix for the blob subset that includes the determined viewing direction vectors ordered according to the proposed blob order. The navigation controller 22 may then be configured to calculate a determinant of each matrix, the sign of which may indicate whether the proposed blob order represents a clockwise or counterclockwise direction around the shape defined by the blob subset. If the sign of each determinant is positive, then the navigation controller 22 may be configured to determine that the proposed blob order corresponds to the clockwise direction. In this case, assuming the predefined marker order direction is counterclockwise, the navigation controller 22 may be configured to append the remaining blobs to the first blob of the blob subset in an order reverse of the proposed blob order. If the sign of each determinant is negative, then the navigation controller 22 may be configured to determine that the proposed blob order corresponds to a counterclockwise direction around the shape represented by the blob subset. In this case, assuming the predefined marker order direction is counterclockwise, the navigation controller 22 may be configured to append the remaining blobs to the first blob of the blob subset in an order corresponding of that of the proposed blob order.

For instance, referring to the image of FIG. 11, the navigation controller 22 may be configured to determine a blob subset associated with the triangle shape including the following blobs: B0, B4, B6, B7, B11, and B1. The navigation controller 22 may set B0 as the first blob of the blob subset because it is doubly tagged and thus corresponds to the master marker 56 of the triangle shaped predefined marker geometries shown in FIG. 6, and may then define a proposed order for the remaining blobs of the subset that travels around the perimeter of the triangle defined by the blob subset from B0. For instance, the navigation controller 22 may use the order in which the blobs of the blob subset were found as the proposed order: B0, B4, B6, B7, B11, and B1.

The navigation controller 22 may thereafter determine viewing direction vectors $\vec{d}_1$, $\vec{d}_2$, and $\vec{d}_3$ respectively corresponding to corner blobs B0, B6, and B11, and form a matrix including these viewing direction vectors in the order corresponding to the proposed order. In other words, the columns of the matrix may set forth $\vec{d}_1$, $\vec{d}_2$, and $\vec{d}_3$ in that order. The navigation controller 22 may then calculate the determinant of the formed matrix, and determine whether the determinant is positive. Responsive to determining that the determinant of the matrix is positive, the navigation controller 22 may determine that B0, B6 and B11 in that order corresponds to clockwise movement around the triangle defined by current blob subset. Accordingly, assuming the predefined marker order direction is counterclockwise, the navigation controller 22 may order the blobs of the blob subset by starting with B0 and appending the remaining blobs of the blob subset in an order reversed from the proposed order: B0, B1, B11, B7, B6, and B4. Alternatively, if the determinant of the matrix is negative, then the navigation controller 22 may determine that B0, B6 and B11 in that order corresponds to counterclockwise movement around the triangle defined by current blob subset. Accordingly, assuming the predefined marker order direction is counterclockwise, the navigation controller 22 may order the blobs of the blob subset by starting with B0 and appending the remaining blobs of the blob subset in an order corresponding to the proposed order: B0, B4, B6, B7, B11, and B1.

As a further example referring to the image of FIG. 11, the navigation controller 22 may be configured to determine a blob subset associated with the square shape including the following blobs: B2, B3, B5, B10, B9, and B8. To order the blobs in block 504, the navigation controller 22 may be configured to set B10 as the first blob of the blob subset because it is shared by the asymmetric collinear blob groups of the blob subset and thus corresponds to the master marker 56 of the square shaped predefined marker geometries shown in FIG. 7. To order the remaining blobs of the blob subset, as described above, the navigation controller 22 may determine a handedness for the blob subset when determining whether the blob subset is viable to represent a square shaped predefined marker geometry. In particular, as described above in reference to FIG. 16, the navigation controller 22 may form four matrices each including vectors corresponding to a triangle that would be formed by a blob in the center of the square represented by the blob subset and a pair of blobs representing adjacent corners of the blob subset, and order the vectors of each matrix to correspond to movement around the square in a same direction. As an example, the vectors of each matrix may be ordered based on the blob order $p_{id}$, $m_1$, $q_{id}$ $m_2$, $r_{id}$, $s_{id}$, which in the example of FIG. 11 may correspond to B3, B5, B10, B9, B8, and B2 respectively. The navigation controller 22 may then calculate and store the sign of the determinant of each matrix, which should be same if the blob subset corresponds to a square shaped predefined marker geometry.

Thus, to determine an order for the remaining blobs of the blob subset, the navigation controller 22 may be configured lookup and use the previously stored data indicating the sign of the determinants of each matrix. Responsive to the determinant of each matrix being positive, the navigation controller 22 may determine that $p_{id}$, $m_1$, $q_{id}$ $m_2$, $r_{id}$, $s_{id}$ in that order corresponds to clockwise movement around the square defined by current blob subset. Accordingly, assuming the predefined marker order direction is counterclockwise, the navigation controller 22 may order the blobs of the blob subset by starting with B10 and appending the remaining blobs of the blob subset in an order reversed from the above blob order: B10, B5, B3, B2, B8, and B9. Alternatively, if the sign is negative, then the navigation controller 22 may determine that $p_{id}$, $m_1$, $q_{id}$ $m_2$, $r_{id}$, $s_{id}$ in that order corresponds to counterclockwise movement around the square defined by current blob subset. Accordingly, assuming the predefined marker order direction is counterclockwise, the navigation controller 22 may order the blobs of the blob subset by starting with B10 and appending the remaining blobs of the blob subset in an order corresponding to the proposed blob order: B10, B9, B8, B2, B3, and B5.

As another example, for blob subsets associated with a star shaped predefined marker geometry, such as those illustrated in FIG. 18, the navigation controller 22 may be configured to set the blob shared by the asymmetric collinear blob groups of the blob subset as the first blob of the blob subset, and then identify viewing direction vectors $\vec{d}_1$, $\vec{d}_2$, and $\vec{d}_3$ corresponding to the outer blobs of the asymmetric candidate blob groups of the blob subset to determine how to order the remaining blobs.

In the case of the blob subset illustrated in FIG. 18A, for example, the navigation controller 22 may be configured to set $p_{id}$ as the first blob of the blob subset because it is shared by the asymmetric collinear blob groups of the blob subset and thus corresponds to the master marker 56 of the star shaped predefined marker geometries shown in FIG. 8. The navigation controller 22 may then define a proposed blob order that traverses around the perimeter of the star shape from $p_{id}$ in one direction and ends with the blob $m_{id}$, such as $p_{id}$, $m_1$, $q_{id}$, $r_{id}$, $s_{id}$, $m_2$, $m_{id}$. The navigation controller 22 may then determine viewing direction vectors $\vec{d}_1$, $\vec{d}_2$, and $\vec{d}_3$ corresponding to $p_{id}$, $q_{id}$, and $s_{id}$ respectively, insert $\vec{d}_1$, $\vec{d}_2$, and $\vec{d}_3$ in that order into a matrix, and determine the determinant of the matrix. If the determinant of the matrix is positive, then the navigation controller 22 may be configured to determine that the proposed order corresponds to the clockwise direction around the star represented by the blob subset, and may append the remaining blobs other than the blob $m_{id}$ from blob $p_{id}$ in reverse order from the proposed order (blob $m_{id}$ may always go last): $p_{id}$, $m_2$, $s_{id}$, $r_{id}$, $q_{id}$, $m_1$, $m_{id}$. Alternatively, if the determinant of the matrix is negative, then the navigation controller 22 may be configured to determine that the proposed order corresponds to the counterclockwise direction around the star represented by the blob subset, and may append the remaining blobs other than the blob $m_{id}$ from blob $p_{id}$ in an order corresponding to the proposed order (blob $m_{id}$ may always go last): $p_{id}$, $m_1$, $q_{id}$, $r_{id}$, $s_{id}$, $m_2$, $m_{id}$.

In the case of the blob subset of FIG. 18B, for example, the navigation controller 22 may be configured to set $q_{id}$ as the first blob of the blob subset because it is shared by the asymmetric collinear blob groups of the blob subset and thus corresponds to the master marker 56 of the star predefined marker geometries shown in FIG. 8. The navigation controller 22 may then define a proposed order in which the blobs traverse around the perimeter of the star shape from $q_{id}$ in one direction and end with the blob $m_{id}$, such as $q_{id}$, $m_1$, $r_{id}$, $s_{id}$, $p_{id}$, $m_2$, $m_{id}$. The navigation controller 22 may then determine viewing direction vectors $\vec{d}_1$, $\vec{d}_2$, and $\vec{d}_3$ corresponding to $q_{id}$, $r_{id}$, and $p_{id}$ respectively, insert $\vec{d}_1$, $\vec{d}_2$, and $\vec{d}_3$ in that order into a matrix, and determine the determinant of the matrix. If the determinant of the matrix is positive, then the navigation controller 22 may be configured to determine that the proposed order corresponds to the clockwise direction around the star represented by the blob subset, and may append the remaining blobs other than the blob $m_{id}$ from blob $q_{id}$ in reverse order from the proposed order (blob $m_{id}$ may always go last): $q_{id}$, $m_2$, $p_{id}$, $s_{id}$, $r_{id}$, $m_1$, $m_{id}$. Alternatively, if the determinant of the matrix is negative, then the navigation controller 22 may be configured to determine that the proposed order corresponds to the counterclockwise direction around the star represented by the blob subset, and may append the remaining blobs other than the blob $m_{id}$ from blob $q_{id}$ in an order corresponding to the proposed order (blob $m_{id}$ may always go last): $q_{id}$, $m_1$, $r_{id}$, $s_{id}$, $p_{id}$, $m_2$, $m_{id}$.

Referring again to FIG. 19, in block 506, the specific tracker 42 directly corresponding to the blob subset may be determined. If only one tracker 42 in the surgical workspace includes a predefined marker geometry forming the shape associated with the blob subset, then the navigation controller 22 may be configured to determine that the blob subset corresponds to that tracker 42. Alternatively, if multiple trackers 42 in the surgical workspace have a predefined marker geometry forming the shape associated with the blob subset, then the navigation controller 22 may be configured to determine which of these trackers 42 corresponds to the blob subset based on which blobs in the blob subset are tagged.

As illustrated in FIGS. 6 through 8, predefined marker geometries forming a same shape may differ from one another based on which outer markers 56 are tagged. Accordingly, when the surgical workspace includes multiple trackers 42 each having a predefined marker geometry forming a shape associated with the blob subset, the navigation controller 22 may be configured to determine to which of these multiple trackers 42 the blob subset corresponds based on the position of the tagged blobs in the blob order determined in block 504. In particular, for each predefined marker geometry in the surgical workspace forming the shape associated with the blob subset, the navigation controller 22 may be configured to determine if the tagged markers 56 of the predefined marker geometry correspond to the tagged blobs of the blob subset according to the predefined marker order direction and the determined blob order. If so, then the navigation controller 22 may be configured to determine that the blob subset was directly generated by a tracker 42 including that predefined marker geometry.

As an example, referring to FIG. 6, for a blob subset associated with the triangle shaped marker geometry, if the first and third blobs of the blob order are tagged, then the navigation controller 22 may be configured to determine that the blob subset was directly generated by the markers 56 of a tracker 42 having the predefined marker geometry of FIG. 6A. Alternatively, if the first and fifth blobs of the blob order are tagged, then the navigation controller 22 may be configured to determine that the blob subset was directly generated by the markers 56 of a tracker 42 having the predefined marker geometry of FIG. 6B As another example, referring to FIG. 7, for a blob subset associated with the square shaped marker geometry, if only the first blob of the blob order is tagged, then the navigation controller 22 may be configured to determine that the blob subset was directly generated by the markers 56 of a tracker 42 having the predefined marker geometry of FIG. 7A. If the third and fifth blobs of the blob order are tagged, then the navigation controller 22 may be configured to determine that the blob subset was directly generated by the markers 56 of a tracker 42 having the predefined marker geometry of FIG. 7B. If the first and third blobs of the blob order are tagged, then the navigation controller 22 may be configured to determine that the blob subset was directly generated by the markers 56 of a tracker 42 having the predefined marker geometry of FIG. 7C. If the first and fifth blobs of the blob order are tagged, then the navigation controller 22 may be configured to determine that the blob subset was directly generated by the markers 56 of a tracker 42 having the predefined marker geometry of FIG. 7D.

As another example, referring to FIG. 8, for a blob subset associated with the star shaped predefined marker geometry, if only the first blob of the blob order is tagged, then the navigation controller 22 may be configured to determine that the blob subset was directly generated by the markers 56 of a tracker 42 having the predefined marker geometry of FIG. 8A. If the third and fifth blobs of the blob order are tagged, then the navigation controller 22 may be configured to determine that the blob subset was directly generated by the markers 56 of a tracker 42 having the predefined marker geometry of FIG. 8B. If the first and third blobs of the blob order are tagged, then the navigation controller 22 may be configured to determine that the blob subset was directly generated by the markers 56 of a tracker 42 having the predefined marker geometry of FIG. 8C. If the first and fifth blobs of the blob order are tagged, then the navigation controller 22 may be configured to determine that the blob subset was directly generated by the markers 56 of a tracker 42 having the predefined marker geometry of FIG. 8D.

In block 508, the subset of blobs may be assigned to the markers 56 of the surgical tracker 42 determined to have directly generated the blob subset. The navigation controller 22 may be configured to perform the assignment based on the predefined marker order direction and the blob order of the blob subset. In particular, the navigation controller 22 may be configured to assign the first blob in the blob order to the master marker 56 of the tracker 42, and then proceed to assign each subsequent blob in the blob order to a marker 56 of the tracker 42 according to the predefined marker order direction, such as counterclockwise.

Following block 112 of FIG. 9, the navigation controller 22 may store one or more mutually exclusive blob sets, each blob set identifying blobs included in an image generated by the localizer camera 18 and assigned to the markers 56 of a tracker 42 in the surgical workspace. The navigation controller 22 may then be configured to determine a pose of the trackers 42 in the surgical workspace relative to the localizer camera 18 based on the assigned blob sets.

Pose Estimation Algorithm

The pose estimation algorithm may function to estimate a pose of a tracker 42 in the surgical workspace based on the blobs of an image of the surgical workspace generated by the localizer camera 18 that are assigned to the markers 56 of the tracker 42. As previously discussed, each blob depicted in an image that directly corresponds to a marker 56 of a tracker 42 may represent a world line extending from the localizer camera 18 and through the marker 56. In other words, the marker 56 directly corresponding to a blob may be positioned somewhere on the world line represented by the blob. Hence, to estimate the pose of a tracker 42, the navigation controller 22 may be configured to determine a position of each marker 56 of the tracker 42 relative to the localizer camera 18 such that the distance between the markers 56 and the world lines represented by the blobs assigned to the markers 56 of the tracker 42 is minimized.

Figure 20:
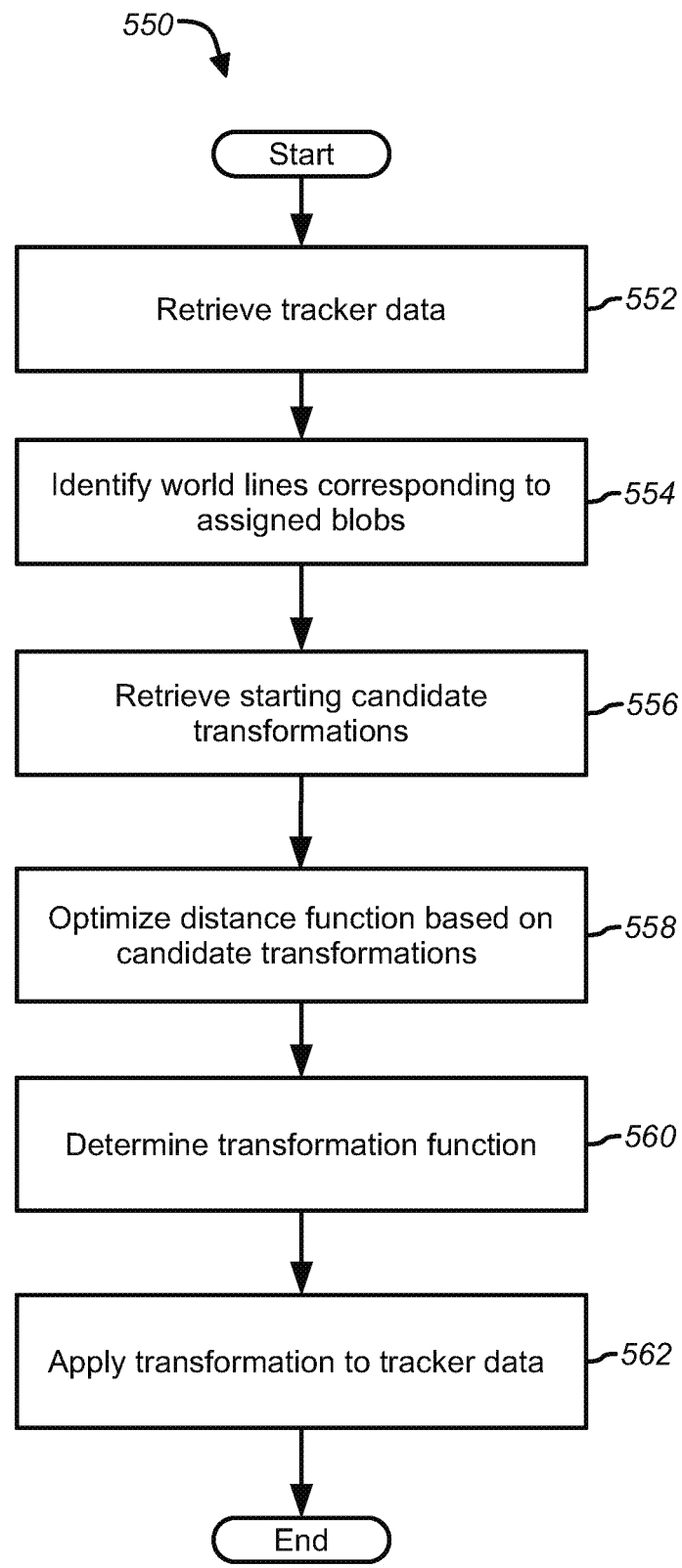
FIG. 20 illustrates a process for estimating a pose of a surgical tracker relative to a tracking camera of a navigation system.

FIG. 20 illustrates a process 550 for estimating the pose of a tracker 42 in the surgical workspace based on an image of the tracker 42 including blobs assigned to the markers 56 of the tracker 42. The process 550 may estimate this pose based on a single image and no additional images. The navigation controller 22 may be configured, such as upon execution of the pose estimation engine 70, to implement the process 550.

Figure 21:
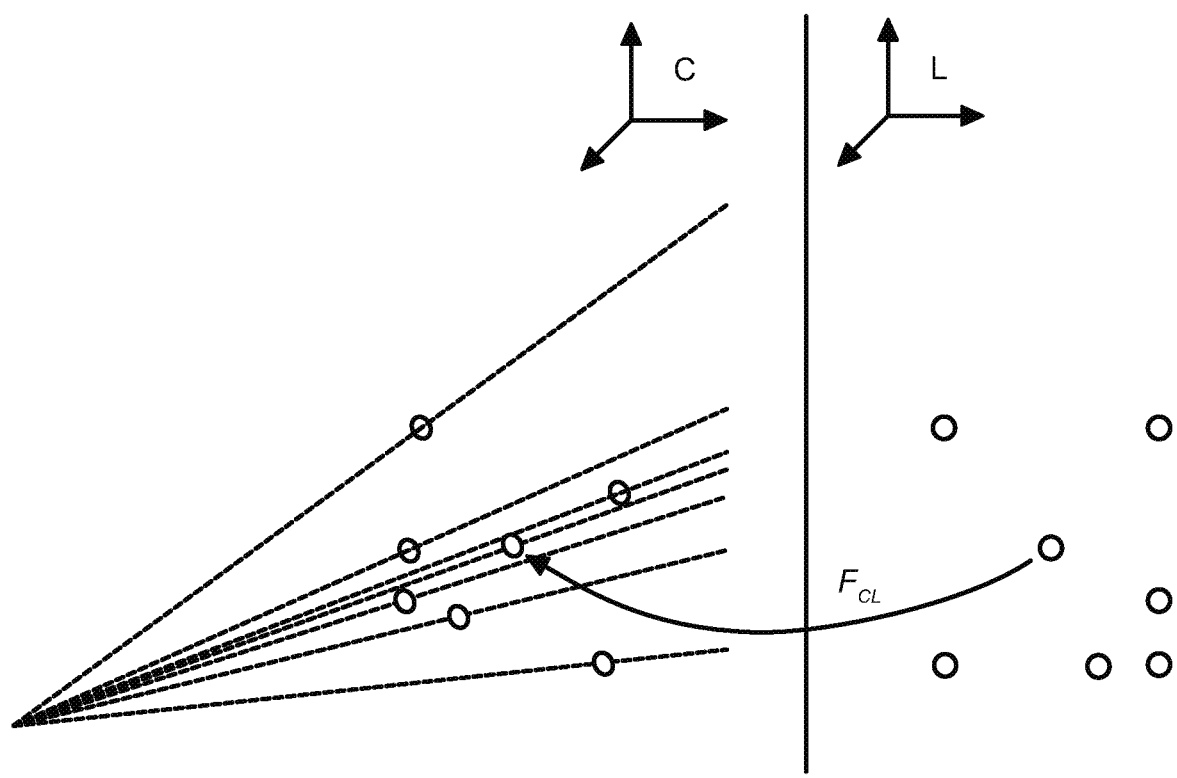
FIG. 21 illustrates a transformation of markers of a surgical tracker from a coordinate system specific to the tracker to a coordinate system specific to a camera of a surgical navigation system.

In block 552, tracker data may be retrieved. For each tracker 42, the navigation controller 22 may store, such in the non-volatile electronic storage 66, tracker model data indicating a virtual model for the tracker 42. The virtual model may define a plurality of points positioned in a three-dimensional coordinate system specific to the tracker 42. FIG. 21 illustrates such points in a coordinate system labeled L. Each of the points may correspond to one of the markers 56 of the tracker 42, and the positions of the points in the three-dimensional coordinate system L may correspond to the positions of the markers 56 of the tracker 42 relative to each other. The navigation controller 22 may also store, such as in the non-volatile electronic storage 66, assignment data indicating the image blob assigned to each marker 56 of the tracker 42, which may have been determined using the above assignment algorithm. The navigation controller 22 may be configured to retrieve this data in block 552.

In block 554, the world lines corresponding to the blobs of the image assigned to the markers 56 of the tracker 42 may be determined. As illustrated in FIG. 21, the determined world lines may be positioned in a three-dimensional coordinate system labeled C that is specific to the localizer camera 18. Because each marker 56 of the tracker 42 may be positioned somewhere on one of the determined world lines, the world lines may correspond to the positions of the markers 56 relative to each other and to the localizer camera 18.

To estimate a pose of the tracker 42 relative to the localizer camera 18, the navigation controller 22 may be configured to determine a transformation function $F_{CL}$ that transforms the positions of the markers 56 from the coordinate system L to the coordinate system C. More specifically, the navigation controller 22 may be configured to determine a transformation function $F_{CL}$ that, when applied to the coordinates of the markers 56 in the tracker coordinate system L, minimizes the distance between each marker 56 and the world line corresponding to the blob assigned to the marker 56 in the camera coordinate system C. The navigation controller 22 may then apply the determined transformation function $F_{CL}$ to the tracker model to estimate a pose of the markers 56 of the tracker 42 relative to the localizer camera 18. By determining a transformation function $F_{CL}$ for each tracker 42 in the surgical workspace, the navigation controller 22 may estimate the poses of the trackers 42 in the surgical workspace, and correspondingly the poses of the objects affixed to the trackers 42, in a common coordinate system, namely the camera coordinate system C, based on a single image generated by the localizer camera 18 and no additional images.

The transformation function $F_{CL}$ for a given surgical tracker 42 may be a function of a rotation matrix R and translation vector T. Given a set of straight lines $\alpha_i + s_i \cdot d_i$ with normalized direction vectors $d_i$, and a set of corresponding points $p_i$, with $i=1 \ldots N$, the navigation controller 22 may be configured to search for a rotation matrix R and translation vector T such that the sum of square distances (SSD) of the transformed points $R \cdot p_i + T$ to the straight lines is minimal. For each value of i, the point $p_i$ may be a position of a marker 56 of the tracker 42 in the coordinate system L, and the line $\alpha_i + s_i \cdot d_i$ may correspond to the world line for the blob assigned to the marker 56 represented by $p_i$ in the coordinate system C. The transformation function $F_{CL}$ may thus be defined by $y_i = R \cdot p_i + T$, where R and T are those items determined above, and $y_i$ is the estimated position of the marker 56 represented by $p_i$ in the coordinate system C.

The distance c of a point p to a straight line $\vec{\alpha} + s \cdot \vec{d}$ may be given by:

$$c = (\vec{h} - (\hat{d}^T \cdot \vec{h})) = |\vec{h} - (\hat{d} \cdot \hat{d}^T)| = |(E - \hat{d} \cdot \hat{d}^T) \cdot \vec{h}| \quad (1)$$

where $\vec{h} = \vec{p} - \vec{\alpha}$. Thus, to estimate the pose of a tracker 42 in the surgical workspace, the navigation controller 22 may be configured to determine a transformation that minimizes the following function:

$$f(R,T) = \Sigma_{i=1}^{N} |(E - d_i \cdot d_i^T) \cdot (R \cdot p_i + T - \alpha_i)|^2 \quad (2)$$

$$B(a, c) = \begin{pmatrix} a_x c_x + a_y c_y + a_z c_z & a_z c_y - a_y c_z & a_x c_z - a_z c_x & a_y c_x - a_x c_y \\ a_z c_y + a_y c_z & a_x c_x - a_y c_y - a_z c_z & a_x c_y + a_y c_x & a_x c_z + a_z c_x \\ a_x c_z + a_z c_x & a_x c_y + a_y c_x & a_y c_y - a_x c_x - a_z c_z & a_y c_z + a_z c_y \\ a_y c_x + a_x c_y & a_x c_z + a_z c_x & a_y c_z + a_z c_y & a_z c_z - a_x c_x - a_y c_y \end{pmatrix} \quad (10)$$

Substituting $c_i = R \cdot p_i - \alpha_i$ and $W_i = E - d_i \cdot d_i^T$ into equation (2) yields the following:

$$f(R,T) = \Sigma_{i=1}^{N} (c_i^T + T^T) \cdot W_i^T \cdot W_i \cdot (c_i + T) \quad (3)$$

Unlike R, T may not be subject to any boundary conditions. Because T may not have any constraints, the partial derivative $$\frac{\partial f}{\partial T}$$

may be zero. This yields the following relationship:

$$\frac{\partial f}{\partial T}(R,T) = \Sigma_{i=1}^{N} 2 \cdot (c_i^T + T^T) \cdot W_i^T = 0^T \quad (4)$$

Transposing equation (4) and solving for T yields:

$$\Sigma_{i=1}^{N} W_i \cdot T = -\Sigma_{i=1}^{N} W_i \cdot c_i \Leftrightarrow T = W^{-1} \cdot \Sigma_{i=1}^{N} W_i \cdot (\alpha_i - R \cdot p_i) \quad (5)$$

where $W = \Sigma_{i=1}^{N} W_i$. With $u_i = R \cdot p_i + T - \alpha_i$ and the identity $W_i^T \cdot W_i = W_i$, f(R, T) can be written as:

$$f(R,T) = \Sigma_{i=1}^{N} W_i \cdot u_i|^2 = \Sigma_{i=1}^{N} u_i^T \cdot W_i^T \cdot W_i \cdot u_i = \Sigma_{i=1}^{N} u_i^T \cdot W_i^T \cdot W_i \cdot u_i = \Sigma_{i=1}^{N} u_i^T \cdot W_i \cdot u_i \quad (6)$$

where $w_{i1}$, $w_{i1}$, and $w_{i1}$ are the columns of the matrices $W_i$. Using $d_{ix}^2 + d_{iy}^2 + d_{iz}^2 = 1$, it follows that $W_i = \Sigma_{j=1}^{3} w_{ij} \cdot w_{ij}^T$. Inserting this relationship into (6) yields:

$$f(R,T) = \Sigma_{i=1}^{N} \Sigma_{j=1}^{3} w_{ij}^T \cdot w_{ij}^T \cdot u_i = \Sigma_{i=1}^{N} \Sigma_{j=1}^{3} (W_{ij}^T \cdot u_i)^2 \quad (7)$$

Inserting T from equation (5) into equation (7) results in a function depending only on R:

$$f(R) = \Sigma_{i=1}^{N} \Sigma_{j=1}^{3} (w_{ij}^T \cdot (R \cdot p_i - \alpha_i + W^{-1} \cdot \Sigma_{k=1}^{N} W_k \cdot (\alpha_k - R \cdot p_k)))^2 \quad (8)$$

This can be written as:

$$f(R) = \Sigma_{i=1}^{N} \Sigma_{j=1}^{3} (w_{ij}^T \cdot R \cdot p_i - \Sigma_{k=1}^{N} v_{ij}^T \cdot R \cdot x_k + k_{ij})^2 \quad (9)$$

with the abbreviations $v_{ijk}^T = W_{ij}^T \cdot W^{-1} \cdot W_k$ and $k_{ij} = w_{ij}^T \cdot (W^{-1} \cdot \Sigma_{k=1}^{N} W_k \cdot \alpha_k - \alpha_i)$.

An arbitrary term in the form of $a^T \cdot R \cdot c$ can be rewritten as $q^T \cdot B(a, c) \cdot q$ with where $q^T = (q_0 \; q_1 \; q_2 \; q_3)$ is the unique quaternion corresponding to R:

$$R = \begin{pmatrix} q_0^2 + q_1^2 - q_2^2 - q_3^2 & 2 \cdot (q_1 q_2 - q_0 q_3) & 2 \cdot (q_1 q_3 + q_0 q_2) \\ 2 \cdot (q_1 q_2 + q_0 q_3) & q_0^2 - q_1^2 + q_2^2 - q_3^2 & 2 \cdot (q_2 q_3 - q_0 q_1) \\ 2 \cdot (q_1 q_3 - q_0 q_2) & 2 \cdot (q_2 q_3 + q_0 q_1) & q_0^2 - q_1^2 - q_2^2 + q_3^2 \end{pmatrix} \quad (11)$$

Equation (9) can therefore be written as:

$$f(q) = \Sigma_{i=1}^{N} \Sigma_{j=1}^{3} (q^T \cdot B_{ij} \cdot q + k_{ij})^2 \quad (12)$$

with the symmetric 4×4 matrices $B_{ij} = B(w_{ij}^T, x_i) - \Sigma_{k=1}^{N} B(v_{ijk}^T, x_k)$ and $k_{ij}$ being scalars depending on $p_i$, $\alpha_i$, and $d_i$. Equation (12) may present the distance function in a form that may be optimized by the navigation controller 22 to determine the pose estimating transformation function $F_{CT}$.

The navigation controller 22 may be configured to minimize Equation (12) under the constraint $q^T \cdot q = 1$ (because q is normalized) using the Lagrange formalism:

$$F(q,\lambda) = \Sigma_{i=1}^N \Sigma_{j=1}^3 (q^T \cdot B_{ij} \cdot q + k_{ij})^2 + \lambda \cdot (q^T \cdot q - 1) \tag{13}$$

The gradient of $F(q, \lambda)$ is zero. Accordingly:

$$\nabla F(q, \lambda) = \begin{pmatrix} 2\lambda \cdot q + \sum_{i=3}^N \sum_{j=1}^3 4 \cdot v_{ij} \cdot B_{ij} \cdot q \\ q_0^2 + q_1^2 + q_2^2 + q_3^2 - 1 \end{pmatrix} = \begin{pmatrix} 0 \\ 0 \end{pmatrix} \tag{14}$$

where $v_{ij} = q^T \cdot B_{ij} \cdot q + k_{ij}$. The navigation controller 22 may be configured to solve this nonlinear equation system using Lagrange-Newton-Iteration:

$$\begin{pmatrix} q_{new} \\ \lambda_{new} \end{pmatrix} = \begin{pmatrix} q_{old} \\ \lambda_{old} \end{pmatrix} - \begin{pmatrix} \Delta q \\ \Delta \lambda \end{pmatrix} \text{ with } H_F(q_{old}, \lambda_{old}) \cdot \begin{pmatrix} \Delta q \\ \Delta \lambda \end{pmatrix} = \nabla F(q_{old}, \lambda_{old}) \tag{15}$$

The Hesse-matrix $H_F(q, \lambda)$ of $F(q, \lambda)$ is symmetric and has the form:

$$H_F(q, \lambda) = \begin{pmatrix} H_{00} & * & * & * & * \\ H_{10} & H_{11} & * & * & * \\ H_{20} & H_{21} & H_{22} & * & * \\ H_{30} & H_{31} & H_{32} & H_{33} & * \\ 2q_0 & 2q_1 & 2q_3 & 2q_3 & 0.0 \end{pmatrix} \tag{16}$$

with $H_{kl} = 2\lambda \cdot \delta_{kl} + \Sigma_{i=1}^N \Sigma_{j=1}^3 4 \cdot (2 \cdot h_{ijl} \cdot h_{ijk} + v_{ij} \cdot B_{ijkl})$ for $0 \leq k$, $l \leq 3$, where $\delta_{kl}$ is the Kronecker-delta, $B_{ijkl}$ is the element of $B_{ij}$ at row k and column l, $h_{ij} = (h_{ij0} h_{ij1} h_{ij2} h_{ij3})^T = B_{ij} \cdot q$, $H_{4k} = H_{k4} = 2q_k$, and $H_{44}$ equals zero.

The above-described iterative optimization relies on selection of suitable starting candidate transformations, or more particularly, suitable starting candidate rotations, each which may be described as a quaternion q, for input into the algorithm. Utilizing previous calculations of transformations as starting values may lead to inefficient and/or erroneous navigation operations if the previous calculations are faulty. The navigation controller 22 may thus be configured to determine a sufficient number of uniformly distributed starting candidate rotations arranged on a four-dimensional unit hyperspace such that at least one of them converges to the global minimum within a few iterations. Such uniformly distributed rotations may be given by the vertices of a platonic solid. For instance, the navigation controller 22 may be configured to use the vertices of a 600-cell or hexacosichora, which is one of the six platonic solids in 4D and the equivalent of the icosahedron in 3D. The one hundred twenty vertices of the 600-cell are the eight permutations of ($\pm 1, 0, 0, 0$), the sixteen possible combinations of ($\pm \frac{1}{2}, \pm \frac{1}{2}, \pm \frac{1}{2}, \pm \frac{1}{2}$), and the ninety six even permutations of $$\left( \pm \frac{\tau}{2}, \pm \frac{1}{2}, \pm \frac{\tau}{2\tau}, 0 \right)$$

with $\tau = (1 + \sqrt{5})/2$. Because q and $-q$ define a same rotation, this results in sixty uniformly distributed quaternions for use as starting candidate rotations.

The navigation controller 22 may be configured to use each of these sixty rotations as starting candidates for the iterative optimization algorithm and select the solution with the minimal residual error as the global minimum of the optimization. Using these sixty rotations as the starting candidates, the above optimization algorithm may converge to a solution efficiently and extremely fast, such as after an average of ten iterations. Using these sixty rotations as the starting candidates may also enable the navigation controller 22 to estimate a pose of a given tracker 42 in the surgical workspace using the pose estimation algorithm extremely fast, such as in 5.5 ms or less, and to efficiently track a pose of two trackers 42 in the surgical workspace using the assignment and pose estimation algorithms described herein, such as in 18 ms or less. As an alternative example, the navigation controller 22 may be configured to use the vertices of a regular 24-cell or icositetrachoron as the starting candidate rotations for the iterative optimization described above.

Hence, referring still to FIG. 20, in block 556, starting candidate transformations for the optimization algorithm may be retrieved, such as those described above. Thereafter, in block 558, a distance function (e.g., Equation 12) applied to the retrieved tracker data may be optimized based on the starting candidate transformations, such as using Lagrange-Newton-Iteration.

Responsive to identifying the optimal rotation or quaternion q that minimizes the distance function, and correspondingly minimizes the distances between each marker 56 of the tracker 42 represented in the tracker model data and the world line corresponding to the blob assigned to the marker 56 according to the assignment data, the navigation controller 22 may be configured to identify the pose of the tracker 42 relative the localizer camera 18 based on the identified rotation. More specifically, in block 560, a transformation function $F_{CL}$ for the markers 56 of the tracker 42 may be determined based on the optimal rotation. As an example, the navigation controller 22 may be configured to calculate a rotation matrix R for the transformation function $F_{CL}$ based on the optimal quaternion q and the matrix (11), and to calculate a translation vector T for the transformation function $F_{CL}$ based on the determined rotation matrix R and Equation (5).

Thereafter, in block 562, the transformation function $F_{CL}$ may be applied to the tracker model data to determine a pose of the tracker 42 in the surgical workspace relative to the localizer camera 18 and, correspondingly, a pose of the object affixed to the tracker 42 relative to the localizer camera 18. More specifically, the navigation controller 22 may be configured to calculate $y_i = R \cdot p_i + T$ for each i to identify positions of the markers 56 of the tracker 42 relative to the localizer camera 18. The navigation controller 22 may then be configured to calculate the pose of the object to which the tracker 42 is affixed relative to the localizer camera 18 based on the positions of the markers 56 of the tracker 42 relative to the localizer camera 18 and the stored fixed spatial relationship between the markers 56 of the tracker 42 and the object, as described above.

Peer-to-Peer Network

Given the transient nature of a surgical workspace during a surgical procedure, such as due to surgical instruments and medical personnel often moving throughout, into, and out of the surgical workspace, a central localizer camera 18 may have difficulty maintaining an unobstructed view of each and every tracker 42 desired to be tracked. A peer-to-peer tracker network may relieve the localizer camera 18 from having to view each and every tracker 42, and enable localizing trackers 42 hidden from view of the localizer camera 18. A peer-to-peer tracker network may also provide redundancy to verify proper operation of the navigation system 12, and may enable provision of a de-centralized navigation system 12 in which a central localizer camera 18 is not required. Rather, each of the trackers 42 may include a tracker camera 78 (FIGS. 2-5) configured to generate data indicating the poses of other trackers 42 in view of the tracker camera 78 relative to the tracker 42, with such data being thereafter consolidated to determine the poses of the trackers 42, and correspondingly the objects affixed to the trackers 42, relative to one another in a common coordinate system.

Figure 22:
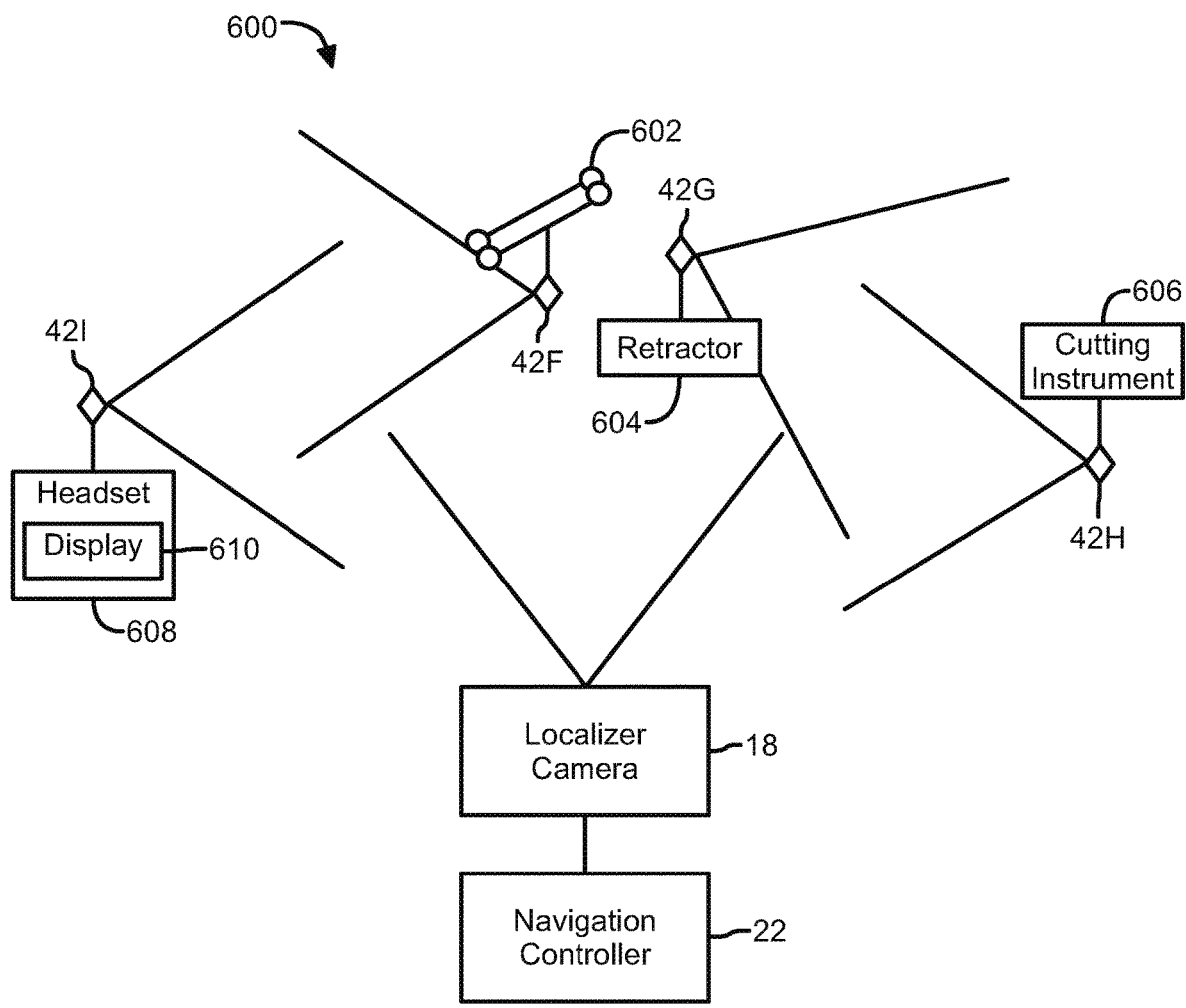
FIG. 22 illustrates a peer-to-peer tracker network.

As an example, FIG. 22 illustrates a peer-to-peer tracker network 600 that may be implemented by the navigation system 12. The peer-to-peer tracker network 600 may include several trackers 42, each disposed in the surgical workspace and affixed to an object to be tracked during a surgical procedure. For instance, the peer-to-peer tracker network 600 may include a tracker 42F affixed to a patient bone 602 being treated in a surgical procedure, a tracker 42G affixed to a retractor 604, a tracker 42H affixed to a cutting instrument 606, and a tracker 42I affixed to a physician's headset 608. The physician's headset 608 may include a display 610 for depicting tracked objects from the viewpoint of the physician, such as objects that are not fully visible to the physician (e.g., patient bone 602), through augmented reality. The peer-to-peer tracker network 600 may further include the localizer camera 18 and navigation controller 22. Alternatively, the localizer camera 18 and/or navigation controller 22 may be omitted. Each tracker 42 may be in communication, such as wireless communication via the communications unit 62 of the tracker 42, with the navigation controller 22 (if present) and the other trackers 42 in the surgical workspace.

At a given moment during a surgical procedure, a first tracker 42 for tracking an object in the surgical workspace may be within the field of view and thus localized through the localizer camera 18, and a second tracker 42 for tracking another object in the surgical workspace may be hidden from the field of view of the localizer camera 18, but within the field of view of the tracker camera 78 of the first tracker 42. This situation is illustrated in FIG. 22, in which the trackers 42F and 42G respectively affixed to the patient bone 602 and retractor 604 are within the field of view of the localizer camera 18, and the trackers 42H and 42I respectively affixed to the cutting instrument 606 and headset 608 are not within the field of view of the localizer camera 18. However, the tracker 42H is within the field of view of the tracker camera 78 of the tracker 42G, and the tracker 42I is within the field of view of the tracker camera 78 of the tracker 42F.

Because the respective markers 56 of the trackers 42H and 42I may be obstructed from the field of view of the localizer camera 18, the navigation controller 22 may be unable to directly track the trackers 42H and 42I using the localizer camera 18. However, the navigation controller 22 may track the pose of the tracker 42H using a daisy chain formed by the localizer camera 18, the tracker 42G, and the tracker 42H, and track the pose of the tracker 42I using a daisy chain formed by the localizer camera 18, the tracker 42F, and the tracker 42I. Moreover, the tracker 42G may be within a field of view of the localizer camera 18 and a field of view of the tracker camera 78 of the tracker 42I. Accordingly, the navigation controller 22 may verify proper operation of the navigation system 12 by tracking a pose of the tracker 42G directly through the localizer camera 18, tracking a pose of the tracker 42G through a daisy chain formed by the localizer camera 18, tracker 42F, tracker 42I, and tracker 42G, and comparing the determined poses. If they are not within a threshold distance of one another, the navigation controller 22 may be configured to determine that the navigation system 12 is not functioning properly, and to responsively disable providing navigation services.

Referring to FIGS. 2-5, the tracker camera 78 of each tracker 42 in the surgical workspace may be configured similar to the localizer camera 18 described above. Specifically, each tracker camera 78 may be a monocular camera system configured to generate a two-dimensional image of light signals, such as infrared light signals, within a field of view of the tracker camera 78. To this end, each tracker camera 78 may include a light source for transmitting light signals into the surgical workspace, and may include a two-dimensional optical sensor, which may be a CCD or CMOS device, that detects light signals in the surgical workspace. The light source and optical sensor of each tracker camera 78 may be configured to operate at a same wavelength or a same range of wavelengths, such as within the infrared light spectrum.

Each tracker camera 78 may also include a tracker camera controller similar to the camera controller 40 of the localizer camera 18 that receives optical based signals from the optical sensor and generates image data defining the two-dimensional image indicating the receiving directions of the light signals by the optical sensor. Like the images generated by the localizer camera 18, an image generated by a tracker camera 78 of a given tracker 42 may include several blobs corresponding to the detected light signals, with at least a subset of the blobs having been directly generated by the markers 56 of one or more other trackers 42 within a field of view of the tracker camera 78. In one example, the tracker controller 58 of each tracker 42 described above may also function as the tracker camera controller for the tracker camera 78 of the tracker 42.

As described above, each tracker 42 may include non-volatile electronic storage 74 storing a calibration profile 76 specific to the tracker 42. The calibration profile 76 may define a virtual model specific to the tracker 42. For instance, the calibration profile 76 may include data defining a coordinate system L specific to the predefined geometry of markers 56 of the tracker 42, and data indicating coordinates in the coordinate system L that corresponds to the relative positions of the markers 56 on the tracker 42. Furthermore, assuming the tracker 42 includes a tracker camera 78, the calibration profile 76 may include data defining a coordinate system C specific to the tracker camera 78, data indicating a calibration area for the tracker camera 78 relative to the coordinate system C, such as that illustrated in FIG. 13, and data indicating a world line relative to the coordinate system C for each pixel coordinate in an image generated by the tracker camera 78.

The calibration profile 76 may also include data defining a tracker transformation function for converting coordinates in the coordinate system C to coordinates in the coordinate system L specific to the tracker 42, and vice versa. Thus, responsive to determining the position of markers 56 of another tracker 42 relative to the tracker camera 78 of a given tracker 42, or more particularly, the position of the markers 56 of the other tracker 42 in the coordinate system C, the tracker transformation function may be used to determine the position of the markers 56 of the other tracker 42 relative to the markers 56 of the given tracker 42, or more particularly, the position of the markers 56 of the other tracker 42 in the coordinate system L. Correspondingly, the pose of the object affixed to the other tracker 42 relative to the pose of the object fixed to the given tracker 42 may be determined, and a daisy chain may be formed using the given tracker 42 as an intermediary node to track the object affixed to the other tracker 42.

In one example, a given tracker 42 may include multiple predefined marker geometries facing different directions, and/or may include multiple tracker cameras 78 facing different directions. In this case, the calibration profile 76 of the given tracker 42 may include data defining a different coordinate system L for each predefined marker geometry of the given tracker 42, data defining a different coordinate system C for each tracker camera 78 of the tracker 42, and data defining transformation functions for transforming coordinates in each defined coordinate system to each other coordinate system. Consequently, responsive to determining the position of markers 56 of another tracker 42 relative to one of the tracker cameras 78 of the given tracker 42, the tracker transformation functions may be used to determine the position of these markers 56 relative to each predefined geometry of markers 56 and each other tracker camera 78 of the given tracker 42. Correspondingly, a daisy chain may be formed to track the object affixed to the other tracker 42 if any of the predefined marker geometries of the given tracker 42 are visible to an upstream camera in the chain.

Figure 23:
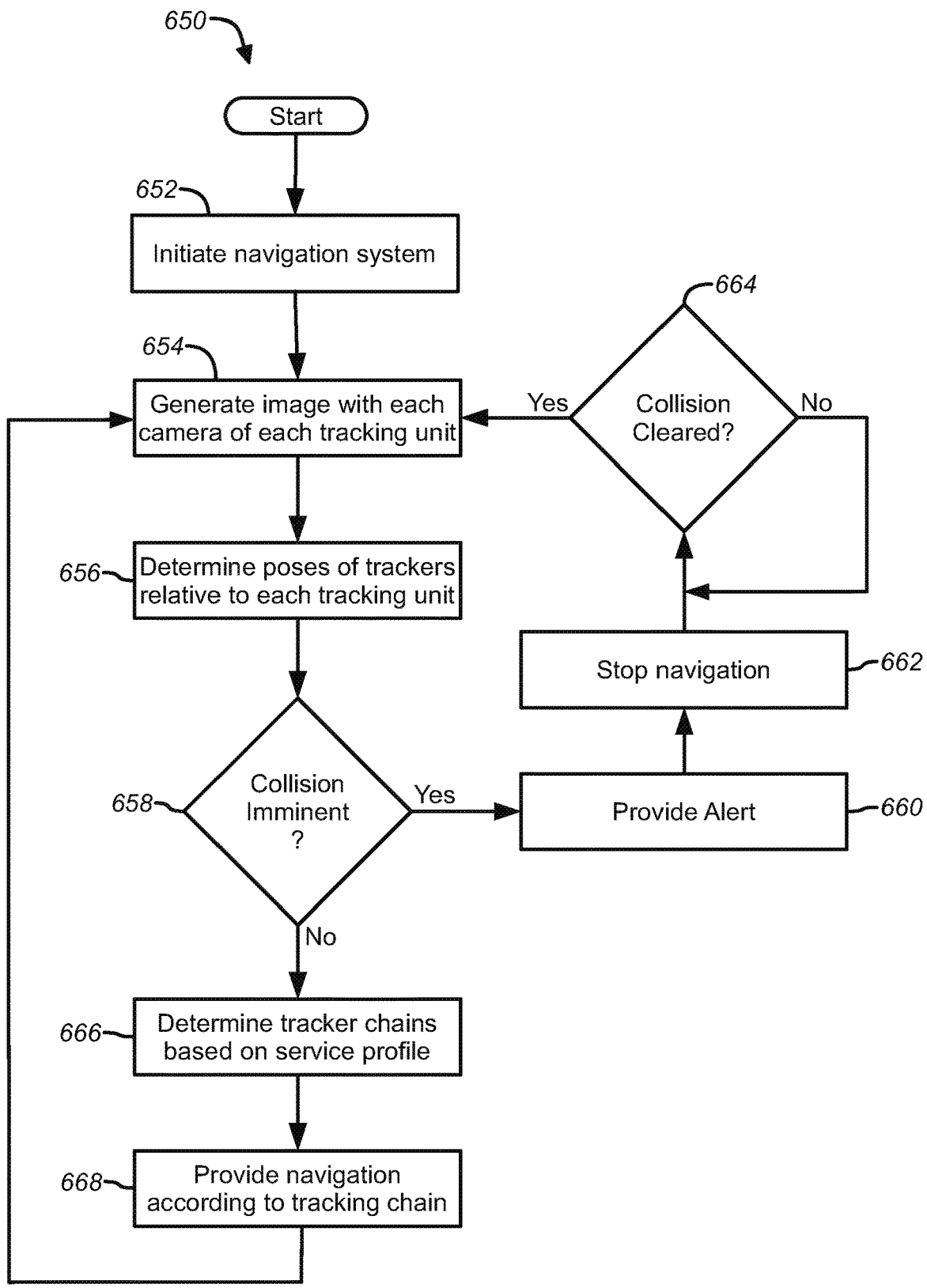
FIG. 23 illustrates a process for implementing a peer-to-peer tracker network.

FIG. 23 illustrates a process 650 for implementing a dynamic peer-to-peer tracker network, such as the peer-to-peer tracker network 600. The process 650 may be implemented by one or more controllers of the navigation system 12, such as the navigation controller 22 and/or the tracker controllers 58. Different controllers may perform different parts of the process 650.

In block 652, the navigation system 12 may be initiated. For instance, responsive to each tracker 42 being positioned in the surgical workspace and being powered on, the tracker 42 may be configured to transmit its calibration profile 76 to the navigation controller 22 and/or other trackers 42 in the workspace, and may be configured to receive the calibration profiles 76 of the other trackers 42 in the surgical workspace. This transmission may inform the navigation controller 22 and/or other trackers 42 of the tracker's 42 use in the surgical workspace, and may enable the navigation controller 22 and/or other trackers 42 to form chains using the tracker 42.

In block 654, an image may be generated by each tracker camera 78 of each surgical tracker 42. An image may also be generated by the localizer camera 18, if present. The imaging trackers 42 and the localizer camera 18 (if present) may each be referred to herein as a "tracking unit" of the navigation system 12.

In block 656, a pose of each tracker 42 within a field of view of each tracking unit may be determined relative to the tracking unit. In one example, each imaging tracker 42 may be configured to transmit its image to the navigation controller 22, which may then be configured to determine, based on the image, a pose of each tracker 42 within a field of view of the tracker camera 78 of the imaging tracker 42 relative to the tracker camera 78 of the imaging tracker 42 using the marker assignment and pose estimation algorithms described above. Alternatively, each imaging tracker 42 may be configured to determine the pose of each tracker 42 within a field of view of the tracker camera 78 of the imaging tracker 42 relative to the tracker camera 78 of the imaging tracker 42 using the marker assignment and pose estimation algorithms described above, and to thereafter transmit such pose data to the navigation controller 22. In this latter case, transmission of images is avoided, which may improve tracking speed and reduce communication bandwidth usage of the navigation system 12. If the localizer camera 18 is present, then the navigation controller 22 may be configured, based on the image generated by and received from the localizer camera 18, to determine a pose of each tracker 42 within a field of view of the localizer camera 18 relative to the localizer camera 18 using the marker assignment and pose estimation algorithms described above.

In block 658, a determination may be made of whether a collision between two tracked objects is imminent based on the determined pose data. Whether a collision is imminent may be determined before consolidating the pose data of the tracking units to detect the imminent collision as soon as possible.

For instance, assuming each imaging tracker 42 is configured to determine its own pose data, each imaging tracker 42 may be configured to determine whether a collision is imminent based on its determined pose data. As previously described, upon being positioned in the surgical workspace and powered on, each imaging tracker 42 may be configured to receive the fixed spatial relationships between the other trackers 42 and the objects affixed to the other trackers 42, such as from the other trackers 42 directly or via the navigation controller 22. Thus, responsive to determining pose data, each imaging tracker 42 may be configured to determine the pose of each object affixed to each other tracker 42 in the field of view of the tracker camera 78 of the imaging tracker 42 relative to the object affixed to the imaging tracker 42 based on the pose data, such as using the transformation functions stored in the calibration profile 76 of the imaging tracker 42 and the fixed spatial relationships received for the other trackers 42. Each imaging tracker 42 may then be configured to determine whether one of the objects localized by the imaging tracker 42 is within a predetermined distance of another one of the objects localized by the imaging tracker 42, and if so, to detect an imminent collision.

In some instances, each imaging tracker 42 may also be configured to store historical poses of the objects localized by the imaging tracker 42 to determine a moving direction of each object, and determine whether an object is about to collide with another object based on whether the object is within a predetermined distance of the another object and moving towards the object. In a further example, upon being positioned in the surgical workspace and powered on, each imaging tracker 42 may receive and store surgical plan data indicating tracked objects allowed to contact one another (e.g., cutting instrument and treated tissue), and objects in which contact is prohibited. In this case, the imaging tracker 42 may be configured to determine that a collision is imminent if two objects in which contact is prohibited are within a predetermined distance of each other and, optionally, moving towards one another.

The navigation controller 22 may be configured to implement similar collision detection functionality for the localizer camera 18, if present. As an alternative example, rather than the tracking units being configured to detect imminent collisions, the navigation controller 22 may be configured to determine if a collision is imminent for each tracking unit. More particularly, responsive to receiving pose data or image data from each tracking unit, the navigation controller 22 may be configured to determine whether a collision is imminent based on the pose data for each tracking unit, such as using any one or more of the methodologies described above.

Responsive to determining that a collision is imminent ("Yes" branch of block 658), in block 660, an alert may be provided. For instance, assuming the tracking units are configured to detect the imminent collisions, each tracking unit may include an alarm in the form of a display for showing an alert and/or a speaker for sounding an alert. In this way, the practitioner may be informed of the particular tracking unit that detected the collision. In addition or alternatively, responsive to detecting an imminent collision, a tracking unit may be configured to communicate a notification signal to the navigation controller 22, which may then display and/or sound an alert via the user interface 26 identifying the objects involved in the imminent collision, and/or to the trackers 42 affixed to the objects involved in the imminent collision, which may then indicate the imminent collision by providing a visual indicator or sound. In this way, the practitioner may be informed of the particular objects involved in the imminent collision.

If the navigation controller 22 is configured to detect the imminent collisions, then the navigation controller 22 may also be configured to display and/or sound an alert via the user interface 26 identifying the objects involved in the imminent collision, to communicate a notification to the tracking unit whose pose data indicated the imminent collision, and to communicate a notification to the tracking units affixed to the objects involved in the imminent collision. The tracking units receiving the notification may then also display and/or sound an alert to indicate to the practitioner the basis for the alert.

Responsive to providing an alert, in block 662, navigation services may be suspended until a determination is made in block 664 that the imminent collision condition has been cleared. In some instances, the navigation system 12 may be configured to continue performing the operations of blocks 654 to block 658 until an imminent collision is not detected, and responsively ("Yes" branch of block 664), the process 650 may return to block 654 to resume navigation services. As another example, a user may interact with the user interface 26 to indicate that the imminent collision condition has been cleared or should be ignored. Responsive to receiving this indication from the user interface 26 ("Yes" branch of block 664), the process 650 may return to block 654 to resume navigation services.

Responsive to determining that a collision is not imminent ("No" branch of block 658), in block 666, one or more tracker chains for tracking the tracked objects may be determined, such as based on a quality of service (QoS) profile received for the surgical procedure. The navigation controller 22 may receive and store a QoS profile prior to the surgical operation. The QoS profile may define a quality heuristic for determining optimal tracking paths, which may depend on the current application. For example, the QoS profile may define a quality heuristic indicating to determine tracker chains having a shortest distance, tracker chains in which the angles between the tracking units and trackers 42 are minimized, tracker chains in which the number of tracking units is minimized, or a combination of any of these heuristics. The QoS profile may also indicate which coordinate system defined in the surgical workspace to use as a common coordinate system for the tracked objects.

For instance, responsive to receiving or determining the pose data for the tracking units, the navigation controller 22 may be configured to build and update a dynamic transformation table based on the pose data. The dynamic transformation table may be a two dimensional table indicating each coordinate system defined in the surgical workspace, and indicating a status of a transformation function for transforming each coordinate system to each other coordinate system defined in the surgical workspace. For instance, considering a surgical workspace including a first and second tracker 42 each including a predefined geometry of markers 56 and a tracker camera 78, and including a third and fourth tracker 42 each including a predefined geometry of markers 56 but no tracker camera 78, the navigation controller 22 may define the following transformation table:

|    | L1     | C1        | L2        | C2        | L3        | L4     |
|----|--------|-----------|-----------|-----------|-----------|--------|
| L1 | E      | Static Fn | NaN       | Dyn Fn    | Nan       | Nan    |
| C1 | Static | E         | Dyn Fn    | Nan       | Dyn Fn    | Dyn Fn |
| L2 | Nan    | Dyn Fn    | E         | Static Fn | Nan       | Nan    |
| C2 | Dyn Fn | Nan       | Static Fn | E         | Dyn Fn    | Dyn Fn |
| L3 | Nan    | Dyn Fn    | Nan       | Dyn Fn    | E         | Nan    |
| L4 | Nan    | Dyn Fn    | Nan       | Dyn Fn    | Nan       | E      | where L1 and C1 are coordinate systems respectively corresponding to the predefined geometry of markers 56 and tracker camera 78 of the first tracker 42, L2 and C2 are coordinate systems respectively corresponding to the predefined geometry of markers 56 and tracker camera 78 of the second tracker 42, and L3 and L4 are coordinate systems respectively corresponding to the predefined geometry of markers 56 of the third and fourth trackers 42. The navigation controller 22 may store data indicating one or more coordinates in each coordinate system listed in the table that correspond to positions of interest in the coordinate system relative to the component for which the coordinate system is defined. For instance, for each coordinate system L, the data may indicate coordinates corresponding to the relative positions of the markers 56 of the predefined marker geometry associated with the coordinate system L, and for each coordinate system C, the data may indicate coordinates corresponding to the calibration area of the camera associated with the coordinate C relative to the camera, and may indicate coordinates corresponding to the world line for each pixel coordinate of an image generated by the camera.

The above transformation table may indicate a status of direct transformations between the listed coordinate systems. The table may include the following status indicators: "E" may represent an identity transformation function (e.g., from L1 to L1), "Nan" may represent that a transformation function between the coordinate systems is unknown, "Static Fn" may represent that a fixed transformation function has been determined for the associated coordinate systems, such as from a calibration profile 76 received from a tracker 42, and "Dyn Fn" may represent that a dynamic transformation function has been determined for the associated coordinate systems, such as from the received pose data as described above.

Because the pose of a predefined marker geometry may be tracked through a camera, transformations between coordinate systems L of each tracker 42 and transformations between coordinate systems C of each tracker 42 may be represented as unknowns in the transformation table. Transformations between a coordinate system C of a tracker 42 and a coordinate system L of that tracker 42 may be represented by a static transformation function received from the tracker 42, such as in the calibration profile 76. Assuming a predefined marker geometry a given tracker 42 is within a field of view of a tracking unit, the transformation between the coordinate system L for the predefined marker geometry and the coordinate system C for the camera of the tracking unit may be represented by a dynamic function that is updated with each iteration of the process 650. All other transformations may be represented as unknown or identity within the table.

The navigation controller 22 may also be configured to assign a quality measure to each known transformation function indicated in the table, such as based on the quality heuristic indicated in the QoS profile. For instance, when the quality heuristic relates to minimizing distance, the greater the distance between coordinates of interest in the two coordinate systems of a transformation function as indicated by the transformation function, the worst the quality measure that may be assigned to the transformation function. As a further example, when the quality heuristic relates to minimizing angle, the greater the angle between coordinates of interest in the two coordinate systems of a transformation function as indicated by the transformation function, the worst the quality measure that may be assigned to the transformation function. As another example, when the quality heuristic relates to minimizing intermediate trackers 42, each transformation function may be assigned a same quality measure, such as one. In some examples, because the static transformations are predetermined and may generally not affect the quality of the tracking, the navigation controller may be configured to only assign quality measures to dynamic transformation functions, that is, transformations between separate tracking units.

Responsive to a current state of the above transformation table being determined, the navigation controller 22 may be configured to determine tracker chains to track the objects in the surgical workspace based on the transformation table and the QoS profile. In particular, the navigation controller 22 may be configured to determine a common coordinate system from those listed in the table, and to determine which transformations to use to determine the pose of each tracked object in the determined common coordinate system. In other words, for each of one or more of the available tracking units in the surgical workspace, the navigation controller 22 may assign the tracking unit to track one or more trackers 42, and correspondingly the objects affixed to the trackers 42, that are within a field of view of the tracking unit according to the determined tracker chains. If a tracking unit is not being used in the determined tracker chains, then the navigation controller 22 may communicate a control signal to the tracking unit that causes the tracking unit to disable its camera until the tracker chains are updated.

In one instance, the QoS profile may designate a coordinate system to use as the common coordinate system. For instance, the QoS profile may designate that the coordinate system of a tracker 42 affixed to a particular object be used as the common coordinate system, such as the tracker 42I affixed to the surgical headset 608 to facilitate the provision of augmented reality via the display 610 of the headset 608. The navigation controller 22 may then be configured to implement a best path algorithm (e.g., Dijkstra) to determine best paths from the common coordinate system to each tracked object based on the assigned quality measures. As another example, the navigation controller 22 may be configured to select each of one or more of the coordinate systems defined in the surgical workspace, such as each defined coordinate system or each defined coordinate system C, as candidates for being the common coordinate system, and to then implement a best path algorithm based on the assigned quality measures to determine the best paths for each candidate coordinate system. The navigation controller 22 may then select the common coordinate system from the candidates based on which candidate best satisfies the quality heuristic according to the quality measures of the transformations used in the best paths determined for each candidate common coordinate system, and use the best paths determined for the selected coordinate system to track the objects in the surgical workspace.

In examples in which the quality heuristic is not a function of the determined transformation functions, such as when the quality heuristic relates to minimizing intermediate trackers 42 in the tracker chains, the navigation controller 22 may be configured to determine which trackers 42 are in a field of view of each tracking unit, such as using the above-described marker assignment algorithm, and to determine the tracker chains that minimizes the use of intermediary trackers 42 based on this data. Responsive to determining the tracker chains, the navigation controller 22 may be configured to execute the pose estimation algorithm to determine only those transformations needed to implement the determined tracker chains. In this way, the navigation controller 22 may avoid executing the pose estimation algorithm to determine transformation functions not needed to implement the determined tracker chains.

In block 668, navigation may be provided according to the determined tracker chains. In particular, the navigation controller 22 may determine the pose of each tracked object in the identified common coordinate system, and thus relative to each other, using the determined tracker chains. Referring to the situation illustrated in FIG. 22, for example, the navigation controller 22 may set the coordinate system C corresponding to the tracker camera 78 of the tracker 42I connected to the headset 608 as the common coordinate system, and may determine tracker chains in which the tracker 42I directly tracks the poses of the tracker 42F affixed to the patient bone 602 and of the tracker 42G affixed to the retractor 604, and in which the tracker 42I tracks the pose of the tracker 42H affixed to the cutting instrument 606 through the tracker 42G affixed to the retractor 604.

Accordingly, the navigation controller 22 may determine the pose of the tracker 42F relative to the tracker camera 78 of the tracker 42I using the determined dynamic transformation function between the coordinate system C corresponding to the tracker camera 78 of the tracker 42I and the coordinate system L corresponding to the predefined geometry of markers 56 on the tracker 42F. The navigation controller 22 may then determine the position of the patient bone 602 in the coordinate system C corresponding to the tracker camera 78 of the tracker 42I based on the fixed spatial relationship between the patient bone 602 and the predefined geometry of markers 56 on the tracker 42F, and the determined pose of the predefined geometry of markers 56 of the tracker 42F in the coordinate system C corresponding to the tracker camera 78 of the tracker 42I. The navigation controller 22 may determine the pose of the retractor 604 in the coordinate system C corresponding to the tracker camera 78 of the tracker 42I in a similar manner.

To determine a pose of the cutting instrument 606 in the coordinate system C corresponding to the tracker camera 78 of the tracker 42I, the navigation controller 22 may determine the position of the predefined geometry of markers 56 of the tracker 42H in the coordinate system L corresponding to the predefined geometry of markers 56 of the tracker 42G by applying the transformation from the coordinate system L corresponding to the predefined geometry of markers 56 of the tracker 42H to the coordinate system C corresponding to the tracker camera 78 of the tracker 42G, and thereafter applying the transformation from the coordinate system C corresponding to the tracker camera 78 of the tracker 42G to the coordinate system L corresponding to the predefined geometry of markers 56 of the tracker 42G. The navigation controller 22 may then determine a pose of the predefined geometry of markers 56 of the tracker 42H in the common coordinate system C corresponding to the tracker camera 78 of the tracker 42I by applying the transformation from the coordinate system L corresponding to the predefined geometry of markers 56 of the tracker 42G to the coordinate system C corresponding to the tracker camera 78 of the tracker 42I. The navigation controller 22 may subsequently determine a pose of the cutting instrument 606 in the coordinate system C corresponding to the tracker camera 78 of the tracker 42I based on the fixed spatial relationship between the markers 56 of the tracker 42H and the cutting instrument 606.

Responsive to determining the pose of each tracked object in the common coordinate system C specific to the tracker camera 78 of the tracker 42I, the navigation controller 22 may provide navigation services, such as transmitting appropriate navigation instructions to the manipulator controller 52 and/or displaying the objects relative to each other via the user interface 26. For example, the navigation controller 22 may determine the pose of the tracked objects relative to the display 610 of the headset 608 based on a stored fixed spatial relationship between the display 610 and the common coordinate C corresponding to the tracker camera 78 of the tracker 42I, and display the objects on the display 610 of the headset 608 to provide the physician with an augmented reality including digitized versions of the tracked objects overlaid on the physician's view of the surgical workspace.

Responsive to providing navigation services in block 668, the process 650 may return to block 654 to perform additional iterations of generating images of the surgical workspace, providing updated poses of the tracked objects in the surgical workspace relative to each other based on the images, and updating the tracker chains to maintain optimal performance according to the QoS profile. Various conditions may cause changes to the tracker chains determined in block 666 during the subsequent iterations. For instance, during a surgical procedure, a tracker 42 may leave or become occluded from the field of view of a tracking unit previously assigned to track the tracker 42, and may move into the field of view of another tracking unit. As another example, the distance or angle between a tracker 42 and a tracking unit in the surgical workspace may become less than the distance or angle between the tracker 42 and the tracking unit previously assigned to track the tracker 42.

In some examples, a given set of tracker chains determined in block 666 may be maintained until detection of a predefined condition, which may be monitored for by the navigation controller 22 based on the pose data. The predefined condition may generally indicate that the tracking accuracy of a tracking unit used in the previously determined tracker chains may have been compromised, such as relative to the QoS profile. For instance, the predefined condition may include, without limitation, the pose of a given tracker 42 relative to the tracking unit previously assigned to track the given tracker 42 changing by more than a defined threshold, a given tracker 42 leaving or becoming obstructed from the field of view of a tracking unit previously assigned to track the given tracker 42, the distance or angle between a given tracker 42 and the tracking unit previously assigned to track the given tracker 42 becoming greater than a threshold distance or angle, the distance or angle between a given tracker 42 and a tracking unit previously assigned to track the given tracker 42 becoming greater than the distance or angle between the given tracker 42 and another tracking unit with a field of view of the given tracker 42, a new tracker 42 entering the surgical workspace, or a combination of any of the above. Responsive to detection of the predefined condition, the navigation controller 22 may be configured to update the tracker chains in block 666, such as based on the current QoS profile as described above.

In some examples, if a camera of a given tracking unit is not being used in the current tracker chains, the camera of the tracking unit may be deactivated to save power. Responsive to detection of the predefined condition, the navigation controller 22 may be configured to send a control signal to the controller for the camera of the tracking unit (e.g., tracker controller 58, camera controller 40) to cause activation of the deactivated camera and thereby take into account the field of view of the camera when determining the updated tracker chains. Responsive to determining the updated tracker chains, the navigation controller 22 may be configured to communicate a control signal to each camera controller operating a camera not being used in one of the tracker chains to save power.

In the examples described above relative to the process 650, the navigation controller 22 receives the pose data for each tracker 42 and determines the tracker chains based thereon. In alternative examples, the trackers 42 may negotiate the tracker chains amongst themselves without the navigation controller 22. In other words, the trackers 42 may be smart trackers configured to determine the tracker chains in block 666 of the process 650, and implement navigation services according to the determined tracker chains.

For instance, prior to a surgical procedure, each tracker 42 may receive and store, such as in its non-volatile electronic storage 74, the QoS profile for the operation. Each tracker 42 may also communicate its calibration profile 76 to the other trackers 42 in the surgical workspace, such as via the communications units 62 of the trackers 42. Thereafter, responsive to each tracker 42 determining pose data in block 656, the tracker 42 may be configured to communicate the pose data to the other trackers 42 in the surgical workspace. In block 666, each tracker 42 may then build a transformation table and determine the tracker chains according to the QoS profile, as described above. Each tracker 42 may thereafter share its determined tracker chains with the other trackers 42, and if the tracker chains determined by each tracker 42 match, then the trackers 42 may be configured to provide navigation services based on the determined tracker chains in block 668.

For instance, as one non-limiting example, the tracker controller 58 of the tracker 42 that defines the common coordinate system according to the determined tracker chains may determine the poses of the tracked objects relative to each other in the common coordinate system based on the pose data received from the other trackers 42, the fixed spatial relationships between the trackers 42 and the objects affixed to the trackers 42, and the determined tracker chains. Thereafter, this tracker controller 58 may be configured to communicate appropriate control signals to the manipulator controller 52, either directly or via the navigation controller 22, and/or cause the navigation controller 22 to display the tracked objects relative to each other on the user interface 26.

In subsequent iterations of the process 650, each given imaging tracker 42 in the previously determined tracker chains may be configured to determine and communicate its pose data only to the imaging tracker 42 immediately upstream the given imaging tracker 42 according to the previously determined tracker chains, with the immediately upstream tracker 42 being configured to consolidate its pose data with the received pose data and to communicate the consolidated pose data to its immediately upstream imaging tracker 42, if any, according to the previously determined tracker chains. In this way, all pose data needed to implement the determined tracker chains may be communicated to the imaging tracker 42 defining the common coordinate system while avoiding extraneous data generation and/or communication.

Prior to communicating pose data to its immediately upstream imaging tracker 42 according to the previously determined tracker chains, however, each imaging tracker 42 may be configured to determine whether the pose data indicates occurrence of a predefined condition, such as one or more of the predefined conditions described above, relative to a tracker 42 downstream of the imaging tracker 42, such as a tracker 42 that the imaging tracker 42 has been assigned to track according to the previously determined tracker chains. As before, the predefined condition may generally indicate that the tracking accuracy of a tracking unit used in the previously determined tracker chains may have been compromised, such as relative to the QoS profile. For instance, each imaging tracker 42 may be configured to determine whether the pose of any immediately downstream tracker 42 relative to the imaging tracker 42 has changed by more than a predefined threshold, whether an immediately downstream tracker 42 has left or become obstructed from the field of view of the imaging tracker 42, or whether the distance or angle between the imaging tracker 42 and an immediately downstream tracker 42 has become greater than a predefined threshold. If none of the imaging trackers 42 determine occurrence of such predefined condition, then the trackers 42 may be configured to continue utilizing the previously determined tracker chains to track the objects. If any one of the imaging trackers 42 detects occurrence of the predefined condition, then the imaging tracker 42 may be configured to communicate a signal to each of the other trackers 42 indicating for the trackers 42 to rebuild the tracker chains, as described above.

In some examples, if a tracker camera 78 of a tracker 42 is not being used in the current tracker chains, the tracker camera 78 may be deactivated. Responsive to an imaging tracker 42 according to the current tracker chains determining occurrence of a predefined condition, the imaging tracker 42 may be configured to communicate a signal to each tracker 42, including any trackers 42 with a deactivated tracker camera 78, which may cause these trackers 42 to activate their tracker cameras 78 and generate and communicate pose data to the other trackers 42. In this way, the fields of view of the previously deactivated tracker cameras 78 may be taken into account when rebuilding the tracker chains. Responsive to a given tracker 42 not being selected as an upstream imaging tracker 42 in the subsequently determined tracker chains, the tracker 42 may be configured to deactivate its tracker camera 78 until the predefined condition is again detected.

Several example implementations have been discussed in the foregoing description. However, the examples discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Embodiments of the disclosure can be described with reference to the following numbered CLAUSES, with specific features laid out in dependent clauses: CLAUSES 1. A navigation system for tracking an object in a workspace, the navigation system comprising: a tracker including a predefined geometry of markers and being disposed relative to the object; a camera having a field of view including the tracker; and a controller operatively coupled to the camera and configured to: receive, from the camera, an image comprising blobs, each of the blobs corresponding to a different one of the markers of the tracker; estimate a pose of the tracker in the workspace based on the blobs; and track the object based on the estimated pose of the tracker in the workspace. 2. The navigation system of clause 1, wherein the camera is a monocular camera. 3. The navigation system of clauses 1 or 2, wherein the controller is configured to estimate the pose of the tracker in the workspace based on the received image and no additional images. 4. The navigation system of any one of clauses 1 to 3, wherein the controller is configured to estimate the pose of the tracker in the workspace based on the blobs by being configured to: receive data indicating the predefined geometry of markers of the tracker; identify a transformation for the predefined geometry of markers based on the blobs of the image; and apply the transformation to the data. 5. The navigation system of clause 4, wherein the transformation comprises a rotation matrix. 6. The navigation system of clauses 4 or 5, wherein the controller is configured to identify the transformation by being configured to: identify a world line for each of the blobs of the image, each blob being assigned to a different one of the markers of the tracker; and determine the transformation that minimizes a distance between each marker of the tracker and the world line for the blob assigned to the marker. 7. The navigation system of clause 6, wherein the controller is configured to determine the transformation that minimizes the distance between each marker of the tracker and the world line for the blob assigned to the marker by being configured to determine the transformation that minimizes a sum of squared distances between the markers of the tracker and the world lines. 8. The navigation system of clause 6, wherein the controller is configured to determine the transformation that minimizes a distance between each marker of the tracker and the world line for the blob assigned to the marker by being configured to: identify candidate transformations for the predefined geometry of markers; and determine the transformation based on the candidate transformations and the world lines. 9. The navigation system of clause 8, wherein the candidate transformations comprise vertices of a 600-cell. 10. The navigation system of clause 8, wherein the controller is configured to determine the transformation based on the candidate transformations and the world lines by being configured to optimize a function corresponding to computing a distance between a point and a line using the candidate transformations, the received data, and the world lines. 11. The navigation system of clause 10, wherein the controller is configuration optimize the function corresponding to computing a distance between a point and a line using newton's method in optimization for each of the candidate transformations. 12. A navigation system for tracking a first object in a workspace, the navigation system comprising: a first tracker disposed relative to the first object including markers; first and second cameras each having a different field of view; and at least one controller operatively coupled to the first and second cameras and configured to, responsive to the first tracker entering the field of view of the first camera: receive, from the first camera, an image comprising blobs, each of the blobs corresponding to a different one of the markers on the first tracker; determine a pose of the first tracker relative to the first camera based on the blobs; determine a pose of the first camera relative to the second camera for which the field of view includes the first camera based on an image received from the second camera; and track the first object relative to the second camera based on the pose of the first tracker relative to the first camera and the pose of the first camera relative to the second camera. 13. The navigation system of clause 12, further comprising second trackers disposed relative to second objects for tracking the second objects, wherein each of the cameras is disposed in a different one of the second trackers. 14. The navigation system of clauses 12 or 13, wherein the at least one controller is configured to, prior to determining the pose of the first tracker relative to the first camera: identify a predefined condition; and responsive to identification of the predefined condition, determine whether the first tracker is in the field of view of the second camera. 15. The navigation system of clause 14, wherein the at least one controller is configured to activate the first camera responsive to identification of the predefined condition. 16. The navigation system of clause 14, wherein the predefined condition comprises: the first tracker exiting a field of view of a third camera previously tracking the first tracker; a distance between the first tracker and the first camera becomes less than a distance between the first tracker and the third tracker; the distance between the first tracker and the third tracker becomes greater than a threshold distance; or the distance between the first camera and the second camera becomes less than a threshold distance. 17. A de-centralized navigation system comprising: a first tracking device coupled to a first object and comprising detectable markers, a camera, a controller, and a communications module; and a second tracking device coupled to a second object and comprising detectable markers, a camera, a controller, and a communications module, wherein the controllers of the first tracking device and the second tracking device are configured to communicate using the communication modules to coordinate tracking operation of the first and second tracking devices, whereby: the first tracking device is assigned to track a state of a target object using the camera of the first tracking device; and the second tracking device is assigned to track a state of the first tracking device by detecting the detectable markers of the first tracking device using the camera of the second tracking device. 18. The de-centralized navigation system of clause 17, wherein each of the cameras of the first and second tracking devices is a monocular camera. 19. The de-centralized navigation system of clauses 17 or 18, wherein a state of the second tracking device is determined based on a known relationship between the second tracking device and the second object to which the second tracking device is coupled. 20. The de-centralized navigation system of any one of clauses 17 to 19, wherein the controllers of the first tracking device and the second tracking device are configured to communicate using the communication modules to coordinate tracking operation of the first and second tracking devices whereby: the controller of at least one of the first and second tracking devices determines which of the first and second tracking devices is closest to the target object; the one of the first and second tracking devices that is closest to the target object is assigned to track the state of the target object; and the other one of the first and second tracking devices that is not closest to the target object is assigned to track the state of the one of the first and second tracking devices that is closest to the target object. 21. The de-centralized navigation system of any one of clauses 17-20, wherein the controllers of the first tracking device and the second tracking device are configured to communicate using the communication modules to coordinate tracking operation of the first and second tracking devices whereby: the controller of at least one of the first and second tracking devices determines whether the detectable markers of the first tracking device are obstructed from being tracked; and in response to determining that the detectable markers of the first tracking device are obstructed from being tracked, assign the second tracking device to track the state of the target object. 22. The de-centralized navigation system of any one of clauses 17-21, wherein the controllers of the first tracking device and the second tracking device are configured to communicate using the communication modules to coordinate tracking operation of the first and second tracking devices whereby: the controller of at least one of the first and second tracking devices determines whether a tracking accuracy of the first tracking device is compromised; and in response to determining that the tracking accuracy of the first tracking device is compromised, assign the second tracking device to track the state of the target object. 23. The de-centralized navigation system of any one of clauses 17-22, further comprising a third tracking device coupled to a third object and comprising detectable markers, a camera, a controller, and a communication module; wherein, the controllers of the first, second, and third tracking devices are configured to communicate using the communication modules to coordinate tracking operation of the first, second, and third tracking devices whereby: the third tracking device is assigned to track the state of the second tracking device by detecting the detectable markers of the second tracking device using the camera of the third tracking device. 24. The de-centralized navigation system of clause 23, wherein, the controllers of the first, second, and third tracking devices are configured to communicate using the communication modules to coordinate tracking operation of the first, second, and third tracking devices whereby: the controller of at least one of the first, second and third tracking devices determines which one of the first, second, and third tracking devices is closest to the target object; the one of the first, second, and third tracking devices that is closest to the target object is assigned to track the state of the target object; another one of the first, second, and third tracking devices that is next closest to the target object is assigned to track the state of the one of the first, second, and third tracking devices that is closest to the target object; and another one of the first, second, and third tracking devices that is furthest from the target object is assigned to track the state of the another one of the first, second, and third tracking devices that is next closest to the target object. 24. The de-centralized navigation system of clause 23, wherein, the controllers of the first, second, and third tracking devices are configured to communicate using the communication modules to coordinate tracking operation of the first, second, and third tracking devices whereby: the controller of at least one of the first, second and third tracking devices determines which one of the first, second, and third tracking devices has the detectable markers obstructed from being tracked; and in response to determining that the one of the first, second, and third tracking devices has the detectable markers obstructed from being tracked, re-assign the tracking operation of another one or more of the first, second, and third tracking devices to bypass the one of the first, second, and third tracking devices having the detectable markers obstructed from being tracked. 25. The de-centralized navigation system of clause 23, wherein, the controllers of the first, second, and third tracking devices are configured to communicate using the communication modules to coordinate tracking operation of the first, second, and third tracking devices whereby: the controller of at least one of the first, second and third tracking devices determines which one of the first, second, and third tracking devices has a tracking accuracy that has been compromised; and in response to determining that the one of the first, second, and third tracking devices has the tracking accuracy that has been compromised, re-assign the tracking operation of another one or more of the first, second, and third tracking devices to bypass the one of the first, second, and third tracking devices having the tracking accuracy that has been compromised. 26. The de-centralized navigation system of any one of clauses 17-25, further comprising N tracking devices, wherein N is greater than three, and wherein each of the N tracking devices comprises detectable markers, a camera, a controller, and a communication module, and each of the N tracking devices is coupled to a different object from one another, and wherein the controllers of the N tracking devices are configured to communicate using the communication modules to coordinate tracking operation of the N tracking devices. 27. The de-centralized navigation system of any one of clauses 17-26, wherein the first object or second object are further defined as one of: a hand-held surgical tool, a robotic manipulator arm, a robotic manipulator end effector, a tissue retractor, and a head mounted device. 28. A method of operating the navigation system of any one of clauses 1-27.

What is claimed is:

1. A navigation system for tracking an object in a surgical workspace, comprising:
   a tracker attached to a surgical instrument in a surgical workspace and comprising a predefined geometry of markers, the predefined geometry of markers comprising a first marker arrangement and a second marker arrangement each including a pair of outer markers and a middle tagging marker arranged in a collinear relationship in which the middle tagging marker tags one of the outer markers by being closer to the one of the outer markers, wherein the first marker arrangement and the second marker arrangement are noncollinear and one of the outer markers of the first marker arrangement is one of the outer markers of the second marker arrangement;
   a camera having a view of the surgical workspace and the tracker in the surgical workspace and configured to generate an image comprising blobs, wherein a subset of the blobs are generated from light signals in the surgical workspace that are directly from the markers of the tracker, and a remainder of the blobs are generated from light signals in the surgical workspace that are not directly from the markers of the tracker; and
   a controller operatively coupled to the camera and configured to:
     identify, from the blobs of the image, first and second blob groups each including two outer blobs and a middle blob positioned between the outer blobs, wherein one of the blobs of the image is shared among the outer blobs of the first and second blob groups;
     for each of the first and second blob groups, determine that the middle blob of the blob group tags one and not the other of the outer blobs of the blob group based on an angle between a viewing direction vector of the camera relative to the middle blob and a viewing direction vector of the camera relative to the one of the outer blobs being less than an angle between the viewing direction vector of the camera relative to the middle blob and a viewing direction vector of the camera relative to the other of the outer blobs;
     assign the blobs of the first and second blob groups to the markers of the tracker based on the determined tagged outer blobs of the first and second blob groups corresponding to the tagged outer markers of the first and second marker arrangements;
     determine a pose of the tracker based on positions of the assigned blobs within the image; and
     control operation or movement of the surgical instrument based on the determined pose of the tracker.

2. The navigation system of claim 1, wherein the remainder of the blobs that are generated from the light signals in the surgical workspace that are not directly from the markers of the tracker include one or more blobs generated from light signals in the surgical workspace that are directly from markers of another tracker in the surgical workspace and/or include one or more blobs generated from reflections of the light signals in the surgical workspace that are directly from the markers of the tracker.

3. The navigation system of claim 1, wherein the controller is configured to:
   receive calibration data for the camera, the calibration data defining a proximal plane and a distal plane relative to the camera in a known coordinate system and indicating, for each pixel coordinate of the image, a point in the proximal plane and a point in the distal plane that project onto the pixel coordinate, wherein the tracker is disposed between the proximal and distal planes;
   identify, from the blobs of the image, a plurality of blob groups each including three of the blobs of the image as candidates for having been generated from the light signals in the surgical workspace that are directly from the markers of the first or second marker arrangement based on, for each of the blobs of the image, the point in the distal plane and the point in the proximal plane indicated by the calibration data for a pixel coordinate of the blob within the image; and
   identify the first blob group and the second blob group from the candidate blob groups.

4. The navigation system of claim 3, wherein the controller is configured to identify the blob groups each including three of the blobs of the image as candidates for having been generated from the light signals in the surgical workspace that are directly from the markers of the first or second marker arrangement by being configured to, for each possible combination of three of the blobs of the image:
   calculate a regression plane based on the points in the proximal plane and the points in distal plane indicated by the calibration data for the blobs of the possible combination;
   determine whether a sum of squared distances of the points in the proximal plane and the points in distal plane indicated by the calibration data for the blobs of the possible combination to the regression plane is less than a threshold value; and
   responsive to determining that the sum of squared distances of the points in the proximal plane and the points in the distal plane indicated by the calibration data for the blobs of the possible combination to the regression plane is less than the threshold value, set the possible combination as one of the candidate blob groups.

5. The navigation system of claim 1, wherein the controller is configured to:
   determine, from the blobs of the image, initial blob groups each including two outer blobs and a middle blob according to the image;
   select, from the initial blob groups, blob groups as candidates for having been generated from the light signals in the surgical workspace that are directly from the markers of the first or second marker arrangement based on a position of the middle blob of each initial blob group relative to positions of the outer blobs of the initial blob group from a viewpoint of the camera; and identify the first blob group and the second blob group from the candidate blob groups.

6. The navigation system of claim 5, wherein the controller is configured to select the candidate blob groups based on a position of the middle blob of each initial blob group relative to positions of the outer blobs of the initial blob group from a viewpoint of the camera by being configured to, for each initial blob group:

determine whether a ratio of an angle between a viewing direction vector of the camera relative to the middle blob and a viewing direction vector of the camera relative to one of the outer blobs to an angle between the viewing direction vector of the camera relative to the middle blob and a viewing direction vector of the camera relative to the other of the outer blobs is within a predefined range; and responsive to determining that the ratio is within the predefined range, set the initial blob group as one of the candidate blob groups.

7. The navigation system of claim 1, wherein the controller is configured to identify the first blob group and the second blob group by being configured to:

assign a unique individual identifier to each blob in the image, the unique individual identifiers assigned to the blobs in the image having an increasing order;

identify, from the blobs of the image, blob groups each including three of the blobs of the image as candidates for having been generated from the light signals in the surgical workspace that are directly from the markers of the first or second marker arrangement;

select one of the candidate blob groups as the first blob group; and identify as the second blob group one of the candidate blob groups other than the first blob group such that the lowest unique individual identifier assigned to the blobs of the second blob group matches the highest unique individual identifier assigned to the blobs of the first blob group.

8. The navigation system of claim 7, wherein the predefined geometry of markers forms a triangle, and the controller is configured to:

identify as a third blob group one of the candidate blob groups other than the first and second blob groups such that the lowest unique individual identifier assigned to the blobs of the third blob group matches the lowest unique individual identifier assigned to the blobs of the first blob group and the highest unique individual identifier assigned to the blobs of the third blob group matches the highest unique individual identifier assigned to the blobs of the second blob group; and assign the blobs of the first, second, and third blob groups to the markers of the tracker based on the identification of the third blob group.

9. The navigation system of claim 8, wherein the controller is configured to:

for each of the first, second, and third blob groups, determine that a middle unique individual identifier assigned to the blobs of the respective blob group does not match any of the unique individual identifiers assigned to the blobs of the other of the first, second, and third blob groups; and assign the blobs of the first, second, and third blob groups to the markers of the tracker based on the determination for each of the first, second, and third blob groups that a middle unique individual identifier assigned to the blobs of the respective blob group does not match any of the unique individual identifiers assigned to the blobs of the other of the first, second, and third blob groups.

10. The navigation system of claim 1, wherein the predefined geometry of markers forms a square, and the controller is configured to:

select a blob in the image not included in the first and second blob groups;

determine a viewing direction vector of the camera relative to the selected blob;

calculate a mean vector based on the viewing direction vector of the camera relative to the selected blob and the viewing direction vectors of the camera relative to the outer blobs of the first and second blob groups;

determine an expected viewing direction vector based on the viewing direction vector of the camera relative to the shared outer blob of the first and second blob groups and the mean vector;

compare the expected viewing direction vector with the viewing direction vector of the camera relative to the selected blob; and assign the blobs of the first and second blob groups and the selected blob to the markers of the tracker based on the comparison.

11. The navigation system of claim 1, wherein the controller is configured to:

calculate a determinant of a matrix including the viewing direction vectors of the camera relative to the outer blobs of the first and second blob groups; and assign the blobs of the first and second blob groups to the markers of the tracker based on a sign of the determinant.

12. The navigation system of claim 1, wherein the tracker is a first tracker including a first predefined geometry of markers forming a shape, the navigation system further comprises a second tracker including a second predefined geometry of markers forming the same shape as the first predefined geometry of markers, and the controller is configured to assign the blobs of the first and second blob groups to the first predefined geometry of markers of the first tracker and not the second predefined geometry of markers of the second tracker based on the determination of the tagged outer blob of each of the first and second blob groups.

13. A method for tracking an object in a surgical workspace, the method comprising:

attaching a tracker to a surgical instrument in a surgical workspace, the tracker comprising a predefined geometry of markers, the predefined geometry of markers comprising a first marker arrangement and a second marker arrangement each including a pair of outer markers and a middle tagging marker arranged in a collinear relationship in which the middle tagging marker tags one of the outer markers by being closer to the one of the outer markers, wherein the first marker arrangement and the second marker arrangement are noncollinear and one of the outer markers of the first marker arrangement is one of the outer markers of the second marker arrangement;

generating, with a camera having a view of the surgical workspace and the tracker in the surgical workspace, an image comprising blobs, wherein a subset of the blobs are generated from light signals in the surgical workspace that are directly from the markers of the tracker, and a remainder of the blobs are generated from light signals in the surgical workspace that are not directly from the markers of the tracker;

identifying, by a controller operatively coupled to the camera and from the blobs of the image, first and second blob groups each including two outer blobs and a middle blob positioned between the outer blobs, wherein one of the blobs of the image is shared among the outer blobs of the first and second blob groups;

for each of the first and second blob groups, determining, by the controller, that the middle blob of the blob group tags one and not the other of the outer blobs of the blob group based on an angle between a viewing direction vector of the camera relative to the middle blob and a viewing direction vector of the camera relative to the one of the outer blobs being less than an angle between the viewing direction vector of the camera relative to the middle blob and a viewing direction vector of the camera relative to the other of the outer blobs;

assigning, by the controller, the blobs of the first and second blob groups to the markers of the tracker based on the determined tagged outer blobs of the first and second blob groups corresponding to the tagged outer markers of the first and second marker arrangements;

determining, by the controller, a pose of the tracker based on positions of the assigned blobs within the image; and controlling, by the controller, operation or movement of the surgical instrument based on the determined pose of the tracker.

14. The method of claim 13, wherein the remainder of the blobs that are generated from the light signals in the surgical workspace that are not directly from the markers of the tracker include one or more blobs generated from light signals in the surgical workspace that are directly from markers of another tracker in the surgical workspace and/or include one or more blobs generated from reflections of the light signals in the surgical workspace that are directly from the markers of the tracker.

15. The method of claim 13, comprising the controller:
receiving calibration data for the camera, the calibration data defining a proximal plane and a distal plane relative to the camera in a known coordinate system and indicating, for each pixel coordinate of the image, a point in the proximal plane and a point in the distal plane that project onto the pixel coordinate, wherein the tracker is disposed between the proximal and distal planes;

identifying, from the blobs of the image, a plurality of blob groups each including three of the blobs of the image as candidates for having been generated from the light signals in the surgical workspace that are directly from the markers of the first or second marker arrangement based on, for each of the blobs of the image, the point in the distal plane and the point in the proximal plane indicated by the calibration data for a pixel coordinate of the blob within the image; and identifying the first blob group and the second blob group from the candidate blob groups.

16. The method of claim 15, wherein identifying the blob groups each including three of the blobs as candidates for having been generated from the light signals in the surgical workspace that are directly from the markers of the first or second marker arrangement comprises, for each possible combination of three of the blobs in the image, the controller:

calculating a regression plane based on the points in the proximal plane and the points in distal plane indicated by the calibration data for the blobs of the possible combination;

determining whether a sum of squared distances of the points in the proximal plane and the points in distal plane indicated by the calibration data for the blobs of the possible combination to the regression plane is less than a threshold value; and responsive to determining that the sum of squared distances of the points in the proximal plane and the points in distal plane indicated by the calibration data for the blobs of the possible combination to the regression plane is less than the threshold value, setting the possible combination as one of the candidate blob groups.

17. The method of claim 13, comprising the controller:
determining, from the blobs or the image, initial blob groups each including two outer blobs and a middle blob according to the image;

selecting, from the initial blob groups, blob groups as candidates for having been generated from the light signals in the surgical workspace that are directly from the markers of the first or second marker arrangement based on a position of the middle blob of each initial blob group relative to positions of the outer blobs of the initial blob group from a viewpoint of the camera; and identifying the first blob group and the second blob group from the candidate blob groups.

18. The method of claim 17, wherein selecting the candidate blob groups based on a position of the middle blob of each initial blob group relative to positions of the outer blobs of the initial blob group from a viewpoint of the camera comprises, for each of two or more of the initial blob groups, the controller:

determining that a ratio of an angle between a viewing direction vector of the camera relative to the middle blob and a viewing direction vector of the camera relative to one of the outer blobs to an angle between the viewing direction vector of the camera relative to the middle blob and a viewing direction vector of the camera relative to the other of the outer blobs is within a predefined range; and responsive to determining that the ratio is within the predefined range, setting the initial blob group as one of the candidate blob groups.

19. The method of claim 13, wherein identifying the first blob group and the second blob group comprises the controller:

assigning a unique individual identifier to each blob in the image, the unique individual identifiers assigned to the blobs in the image having an increasing order;

identify, from the blobs of the image, blob groups each including three of the blobs of the image as candidates for having been generated from the light signals in the surgical workspace that are directly from the markers of the first or second marker arrangement;

selecting one of the candidate blob groups as the first blob group; and identifying as the second blob group one of the candidate blob groups other than the first blob group such that the lowest unique individual identifier assigned to the blobs of the second blob group matches the highest unique individual identifier assigned to the blobs of the first blob group.

20. The method of claim 19, wherein the predefined geometry of markers forms a triangle, and comprising the controller:

identifying as a third blob group one of the candidate blob groups other than the first and second blob groups such that the lowest unique individual identifier assigned to the blobs of the third blob group matches the lowest unique individual identifier assigned to the blobs of the first blob group and the highest unique individual identifier assigned to the blobs of the third blob group matches the highest unique individual identifier assigned to the blobs of the second blob group; and assigning the blobs of the first, second, and third blob groups to the markers of the tracker based on the identification of the third blob group.

21. The method of claim 20, comprising the controller:

for each of the first, second, and third blob groups, determining that a middle unique individual identifier assigned to the blobs of the respective blob group does not match any of the unique individual identifiers assigned to the blobs of the other of the first, second, and third blob groups; and assigning the blobs of the first, second, and third blob groups to the markers of the tracker based on the determination for each of the first, second, and third blob groups that a middle unique individual identifier assigned to the blobs of the respective blob group does not match any of the unique individual identifiers assigned to the blobs of the other of the first, second, and third blob groups.

22. The method of claim 13, wherein the predefined geometry of markers forms a square, and comprising the controller:

selecting a blob in the image not included in the first and second blob groups;

determining a viewing direction vector of the camera relative to the selected blob;

calculating a mean vector based on the viewing direction vector of the camera relative to the selected blob and the viewing direction vectors of the camera relative to the outer blobs of the first and second blob groups;

determining an expected viewing direction vector based on the viewing direction vector of the camera relative to the shared outer blob of the first and second blob groups and the mean vector;

comparing the expected viewing direction vector with the viewing direction vector of the camera relative to the selected blob; and assigning the blobs of the first and second blob groups and the selected blob to the markers of the tracker based on the comparison.

23. The method of claim 13, comprising the controller:

calculating a determinant of a matrix including the viewing direction vectors of the camera relative to the outer blobs of the first and second blob groups; and assigning the blobs of the first and second blob groups to the markers of the tracker based on a sign of the determinant.

24. The method of claim 13, wherein the tracker is a first tracker including a first predefined geometry of markers forming a shape, and further comprising a second tracker including a second predefined geometry of markers forming the same shape as the first predefined geometry of markers, and comprising the controller assigning the blobs of the first and second blob groups to the first predefined geometry of markers of the first tracker and not the second predefined geometry of markers of the second tracker based on the determination of the tagged outer blob of each of the first and second blob groups.

25. The navigation system of claim 1, wherein the camera is a monocular camera configured to generate the image from a single viewpoint of the surgical workspace and the tracker in the surgical workspace, and the controller is configured to determine the pose of the tracker based on the single viewpoint image and no additional images.

* * * * *